US009223456B2

United States Patent
Mokhtarzada et al.

(10) Patent No.: US 9,223,456 B2
(45) Date of Patent: Dec. 29, 2015

(54) DIGITAL IMAGE EDITING

(71) Applicant: VISTAPRINT LIMITED, Hamilton (BM)

(72) Inventors: Idris Saleh Mokhtarzada, Silver Spring, MD (US); Justin Michael Nurse, Abingdon, MD (US); Dominick Khanh Pham, Laurel, MD (US); Danyal Haroon Mokhtarzada, Silver Spring, MD (US)

(73) Assignee: Cimpress Schweiz GmbH, Winterthur (CH)

( * ) Notice: Subject to any disclaimer, the term of this patent is extended or adjusted under 35 U.S.C. 154(b) by 406 days.

(21) Appl. No.: 13/745,485

(22) Filed: Jan. 18, 2013

(65) Prior Publication Data

US 2013/0198609 A1 Aug. 1, 2013

Related U.S. Application Data

(60) Provisional application No. 61/589,205, filed on Jan. 20, 2012.

(51) Int. Cl.
*G09G 5/00* (2006.01)
*G06F 3/048* (2013.01)
(Continued)

(52) U.S. Cl.
CPC ............ *G06F 3/048* (2013.01); *G06F 3/0484* (2013.01); *G06F 3/04817* (2013.01); *G06F 3/04845* (2013.01); *G06F 8/34* (2013.01); *G06F 8/38* (2013.01); *G06F 9/4443* (2013.01); *G06F 17/2247* (2013.01); *H04N 5/91* (2013.01)

(58) Field of Classification Search
None
See application file for complete search history.

(56) References Cited

U.S. PATENT DOCUMENTS

| 6,940,526 | B2 * | 9/2005 | Noda et al. ................... 345/629 |
| 8,144,171 | B2 * | 3/2012 | Perani et al. ................. 345/660 |

(Continued)

FOREIGN PATENT DOCUMENTS

WO 2006/126999 11/2006

OTHER PUBLICATIONS

Apple Support, "iWeb '09: Undoing Your Most Recent Changes," 1 page, retrieved from the Internet on Jun. 17, 2013, support.apple.com/kb/PH5311.

(Continued)

*Primary Examiner* — Ryan R Yang

(57) ABSTRACT

A website construction tool allows website construction via an interactive graphical user interface (GUI) using containers and modules defining predetermined website constructs from a robust assortment of common and popular rendering formats and content source definition for individual webpages, and arranges the individual pages for navigation. A user selects from the predefined constructs by selecting modules for generating code, corresponding to the desired content, source and rendering format. Pointing device positioning locates the on-screen location by generating a container dedicated to the desired content. Webpage structure, or page flow, is generated by insertion of navigation controls and page insertions for navigating between pages in the deployed site, The predetermined constructs, therefore, provide templates of complex rendering formats allowing for content insertion without burdening the user with development of the constructs so rendered. Constructed websites may be hosted by the development entity, further relieving the user from website maintenance.

13 Claims, 57 Drawing Sheets

(51) Int. Cl.
*G06F 9/44* (2006.01)
*G06F 3/0484* (2013.01)
*H04N 5/91* (2006.01)
*G06F 17/22* (2006.01)
*G06F 3/0481* (2013.01)

(56) References Cited

U.S. PATENT DOCUMENTS

| | | | | |
|---|---|---|---|---|
| 8,659,622 | B2* | 2/2014 | Dhawan | 345/626 |
| 2006/0206391 | A1 | 9/2006 | Delson et al. | |
| 2007/0109323 | A1* | 5/2007 | Nakashima | 345/661 |
| 2007/0234274 | A1 | 10/2007 | Ross et al. | |
| 2010/0107056 | A1 | 4/2010 | Underhill et al. | |
| 2010/0257270 | A1 | 10/2010 | Hsu | |
| 2010/0328352 | A1* | 12/2010 | Shamir et al. | 345/661 |
| 2013/0198609 | A1* | 8/2013 | Mokhtarzada et al. | 715/234 |
| 2013/0198610 | A1 | 8/2013 | Mokhtarzada et al. | |
| 2013/0198658 | A1 | 8/2013 | Mokharzada et al. | |
| 2013/0198659 | A1 | 8/2013 | Swider et al. | |
| 2013/0198679 | A1 | 8/2013 | Nurse et al. | |
| 2013/0212524 | A1 | 8/2013 | Nurse et al. | |
| 2013/0263024 | A1 | 10/2013 | Solove et al. | |
| 2014/0040790 | A1 | 2/2014 | Nurse et al. | |

OTHER PUBLICATIONS

European Patent Office, "Notification of Transmittal of the International Search Report and the Written Opinion of the International Searching Authority, or the Declaration," mailed Aug. 28, 2013, for International Application No. PCT/US2013/022291.

European Patent Office, "Notification of Transmittal of the International Search Report and the Written Opinion of the International Searching Authority, or the Declaration," mailed Nov. 25, 2013, for International Application No. PCT/IB2013/000546.

Google, "Edit your site-Sites Help, Beginner's Guide," 3 pages, retrieved from the Internet on Jun. 17, 2013, https://support.google.com/sites/answers/153196?jl=en.

How—To Geek: "Condense the Bookmarks in the Firefox Bookmarks Toolbar," XP-002712549, 1 page, www.howtogeek.com/howto/10123/condense-the-bookmarks-in-the-firefox-bookmarks-toolbar/, Feb. 8, 2010.

Kasper Skarhoj, "Der Einstieg," XP-002715471, 122 pages, http://www.typo3-anbieter.de/uploads/media/quickstart_de.pdf, Jan. 1, 2003; p. 20, line 1—p. 25, last line, and p. 72, line 1—p. 88, last line. (English translation of those pages provided).

The International Bureau of WIPO, "Notification Concerning Transmittal of the International Preliminary Report on Patentability (Chapter I of the Patent Cooperation Treaty)," mailed on Jul. 31, 2014 for International Application No. PCT/IB2013/000546).

Weebly, "Edit Text-Support Articles," 3 pages, retrieved from the Internet on Jun. 17, 2013, kb.weebly.com/edit-text.html.

WYSIWYG Web Builder 9, "An Introduction to the Basic Functionality of Web Builder," 2 pages, retrieved from the Internet on Jun. 17, 2013, www.wysiwygwebbuilder.com/introduction.html.

* cited by examiner

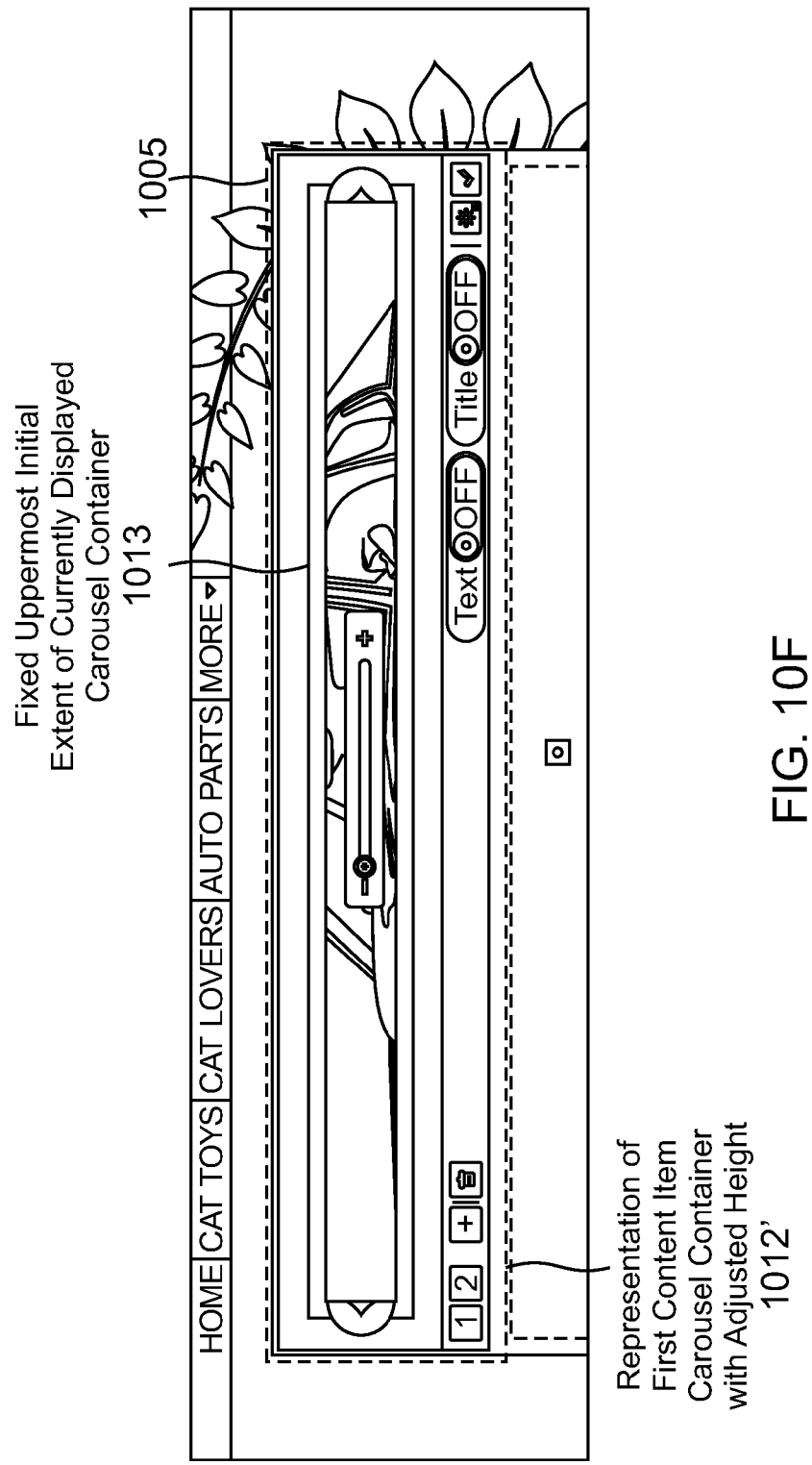

DIGITAL IMAGE EDITING

CROSS REFERENCE TO RELATED APPLICATIONS

This application claims priority under 35 U.S.C. §119(e) of U.S. Provisional Patent Application No. 61/589,205, filed Jan. 20, 2012, entitled "SYSTEMS, METHODS, AND COMPUTER PROGRAM PRODUCTS FOR WEBSITE AND ELECTRONIC DOCUMENT CONSTRUCTION," incorporated herein by reference.

BACKGROUND

A "website" is a known Internet-accessible computer system that provides content provided by a website creator and operator. This content is made available to Internet users via known computer programs called "browsers" that run on a user's computer such as a laptop (ultrabook, netbook) computer, desktop computer, pad computer, smart phone, personal digital assistant (PDA) (e.g. iPods), and the like. Websites provide many different forms of content to users such as textual information, images, videos, audio and sounds, and the like.

A website often contains components such as a header, a footer, a body, columns of textual information, sidebars, image carousels, animated images and many other types of components. These components in some cases are called "content containers" or "content items", because they serve as distinct regions in a website for holding and displaying specific types of content, which is sometimes dynamically updated by a computer system associated with the website. A website is often hosted on a remote computer system using a web hosting service, sometimes referred to as "in the cloud." The notion of the "cloud:" may be subject to broad interpretation, however typically refers to practice of using a network of remote servers hosted on a public access network such as the Internet to store, manage, and process data, rather than the user's local system. Thus, cloud computing has been gaining popularity as a business practice of invoking computing resources that are delivered as a service over a network, typically on a fee-for-services basis, which relieves a user from the expense and effort of maintaining the computing resource. In the case of website hosting, this may refer to a computer system that is accessed by users via an Internet connection, and that the computer system itself is operated by a third party separately from the website's creator, owner, or operator.

A number of business entities provide website construction and hosting services. These services allow their customers (website owners) to access a cloud-based computer system, create a basic website, introduce content into the website, and maintain the website so that it remains active and relevant to users of the website, typically consumers of some sort that are interested in (or in business cases, required to access) a particular website. Known website construction services include those available at the website webs .com, which is owned by the assignee of the present application at the time of its filing.

Many known website construction services have certain limitations in their convenience and ease of operation. Because of the complexity of many websites, extensive skills are often required in order to create and maintain a professional appearing website. In addition to aesthetic skills such as design, color coordination, arrangement of elements, and the like, skills are often needed in complex programming, scripting, and mark-up languages such as HTML (HyperText Markup Language), XML (Extensible Markup Language), HTML5 (a later $5^{th}$ revision), CSS (Cascading Style Sheets), Javascript and others known in the art. Due to such complexities, more user-friendly website construction sites, which are websites themselves, have been provided by some entities.

Some of these more user-friendly website construction sites allow users (website creators or editors) to access a graphical user interface (GUI) for interactions with a hosting site, so as to select components for the website, arrange the components in a pleasing manner, and introduce specific content into the components. A well-designed GUI for website construction would reduce or eliminate the need for complex programming and aesthetic layout skills, so that more people having less capable skill sets can create and maintain impressive and professional-appearing websites.

SUMMARY

A website construction tool allows website construction via an interactive graphical user interface using containers and modules defining predetermined website constructs from a robust assortment of common and popular rendering formats and content source definition for individual webpages, and arranges the individual pages according to a page structure for navigation. A novice user selects from the predefined constructs by selecting modules for generating code, or website instructions, corresponding to the desired content, source and rendering format. Pointing device positioning locates the on-screen location by generating a container dedicated to the desired content. Webpage structure, or page flow, is generated by insertion of navigation controls and page insertions for navigating between pages in the deployed site. The predetermined constructs, therefore, provide templates of complex rendering formats allowing for content insertion without burdening the user with development of the constructs so rendered.

However, there are still a number of shortcomings with existing website construction sites, even those with more modern GUI type interfaces. For example, website creators often create multiple logically connected pages within a website, and making connections between pages can be complicated. It may be desirable to introduce (or repeat) content from one web page on a website to another web page on the same website. It may be desirable to change the entire appearance of a website from one aesthetic scheme or theme (having certain shapes, fonts, and colors) to an entirely different aesthetic scheme or theme, due to a need to rebrand or update the appearance of a dated-looking website. It may be desirable to provide a user interface that presents a number of website construction content items for inclusion in a website under construction, in a manner that facilitates the selection of an appropriate item for inclusion but does not interfere or obscure the user's view of the website under construction.

Many of the foregoing shortcoming with existing website construction systems apply equally to systems for the creation and editing of electronic documents. After all, a website may be considered a form of electronic document that is not necessarily provided in a hard copy (printed) form. Some known electronic document assembly systems could also be improved in ease of use and user-friendliness.

There is a need to improve various aspects of GUI-type website construction sites and electronic document assembly systems so as to improve the user-friendliness, speed of construction, and facilitation of changes when necessary. The various disclosed inventions(s) described herein address a number of such improvements to website construction sites or systems, as well as electronic document assembly systems.

Various aspects of improved user interface features for website construction systems and site are disclosed. Many of such improved features are also applicable to electronic document assembly systems.

One aspect of the present invention(s) relates to providing a buffer region on a website builder display to indicate the "end" of a page on the website, together with user controls in the form of selectable tiles that dynamically retract (disappear) under certain circumstances to reveal area of the workspace of the website. These selectable tiles are used to indicate to the website construction system that a particular website content item is to be inserted at a particular location in a website workspace region of a developmental website that is under construction by the user. According to this aspect, the size of the developmental website dynamically enlarges to accommodate additional content in response to user selection and movement of one of the selectable tiles into the developmental website, in the vicinity of the buffer region. This allows the user to readily perceive that he or she is at or near the end of the page, and to discern that the size of the web page increases to accommodate any newly inserted content.

Various aspects of the invention(s) are provided in a system, which effects various computer-implemented processes or methods, including provision as an article of manufacture of a computer-readable medium containing a computer program that effects various disclosed processes. In particular the disclosed aspects are for use by a computer user in construction of a website or electronic document. The disclosed system provides a developmental website or electronic document, a viewable display region for viewing content items added to the website, and user controls for adding, editing, and manipulating the content items of various types, e.g. images, text, videos, embellishments, etc. Various disclosed methods relate to particular aspects of a graphical user interface for user controls, including an expandable website workspace, a retractable user control dock, selecting and manipulating content items such as images, text, etc., resizing of content without distortion, providing selectable themes, updating content items in response to theme changes, dynamic updating of content from affiliated computing operations, timer-based undo/redo functionality, autoadjustment of control items in a toolbar, content carousel management and creation, and content-specific toolbars within content item containers.

In further detail, configurations herein provide novice website developers with capabilities for website construction by generating data constructs and computer readable instructions by providing visual editing tools for editing an on-screen image, including a workspace for rendering an edit document, the edit document responsive to editing modules for modification according to an edit function performed by each of the editing modules. Each of the editing modules is rendered as an editing icon displayed in an overlay in front of the workspace, and a rendering area defined by a physical visual display surface includes the on-screen image, such that the rendering area displays at least a portion of the edit document. A buffer region adjacent to the edit document on the workspace allows unimpeded viewing of the edit document by occupying a background area behind the editing icons, the overlay such that none of the editing icons overlay the edit document on the workspace.

In the website construction tool, the method for generating window based content for insertion in the website includes receiving, from a plurality of modules corresponding to types of window based screen elements, a selection of a module for defining a container responsive to a type of the screen element, such that the type determines the data displayable in the screen element. A user positions the container by placing the corresponding module on the screen, and specifies a selection of a source of the data for populating the container, the source based on the type of the screen element. The website construction tool activates a toolbar of content specific tool icons, in which the tool icons are based on the type for modifying the data from the selected source, each toolbar corresponding to a specific one of the plurality of modules.

In particular arrangements, website construction involving editing a digital video image is facilitated by identifying aspects (height, width, pixelation, horizontal to vertical ratio), such that the aspects define translation of a raw image to the rendered image on the website under construction. The user invokes an edit function for modifying at least one of the aspects, and the edit function simultaneously performs a corresponding modification to aspects responsive to other edit functions to maintain a proportional image, and renders the modified digital image such that the corresponding aspects maintain an undistorted appearance of the rendered digital image.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Overview and Environment

Figure 1:
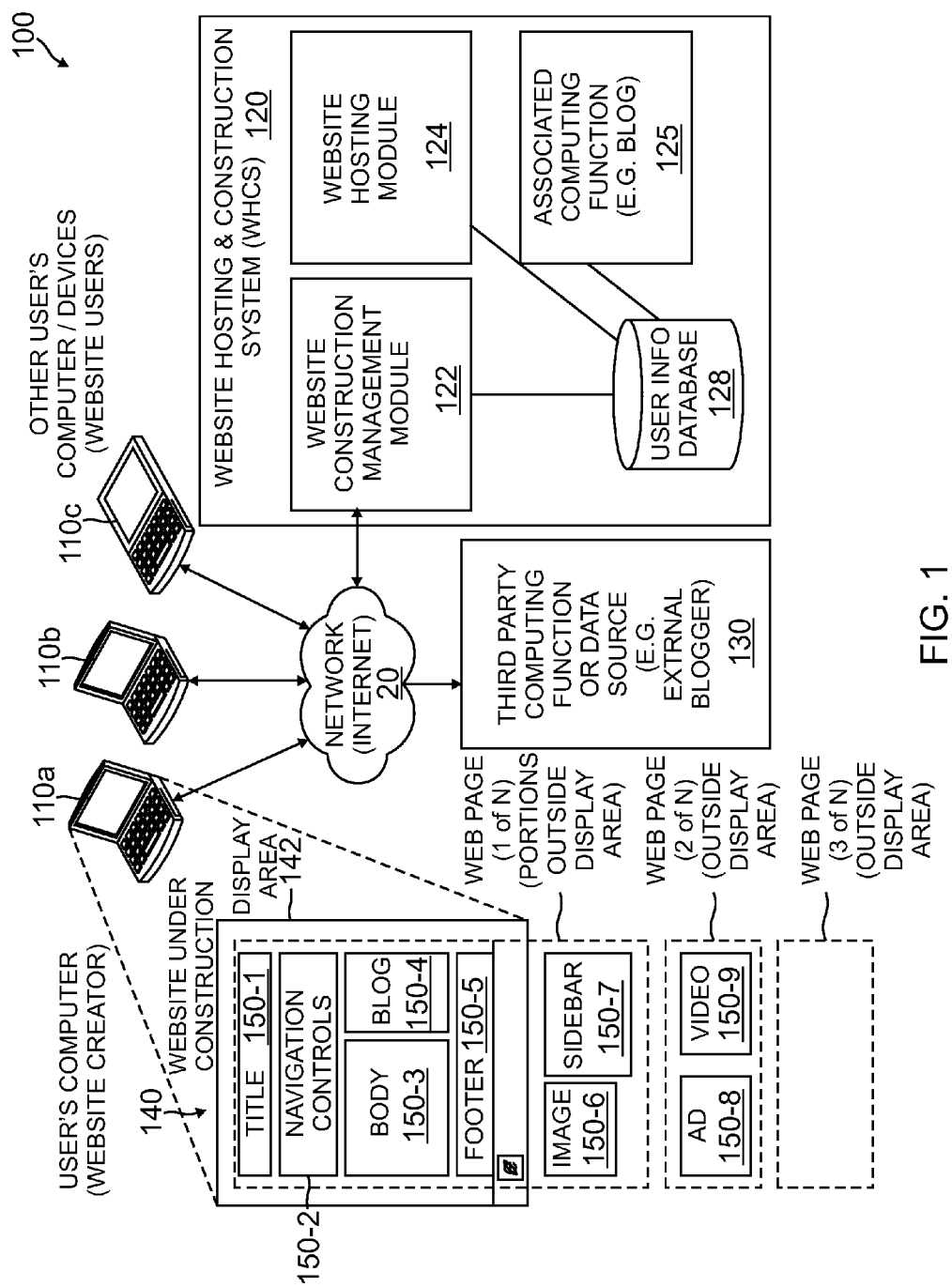
FIG. 1 is a block diagram illustrating components or elements of a website construction system that facilitates the construction and maintenance of a website, in accordance with aspects of the present disclosure.

From the outset, it will be understood that various embodiments of the present system, methods, and articles described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable nonvolatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions, for example, carry out computer-implemented method steps.

Those skilled in the art will understand the features and aspects of a suitable computing environment in which aspects of the invention may be implemented. Although not required, the inventions are described in the general context of computer executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, smartphones, multi-processor systems, microprocessor-based or programmable consumer electronics, networked PCs, minicomputers, mainframe computers, and the like. Many of the described invention(s) are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the disclosed approach will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the configurations are embodied. The logical connections between computers include a local area network (LAN), a wide area network (WAN), and wireless LANs (WLAN) that are presented here for providing a networking environment by way of example and not limitation. Such networking environments are commonplace in office-wide or enterprisewide computer networks, intranets and the Internet.

When used in a networking environment, the main computer system implementing server-based (or cloud-based) aspects is connected to the local network through a network interface or adapter. Typically, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of particular embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

Furthermore, it will be appreciated that systems and methods disclosed herein may be implemented in digital electronic circuitry, in computer hardware, firmware, software, or in combinations of them. Apparatus (systems) of the claimed invention can be implemented in a computer program product tangibly embodied in a machine-readable storage device for execution by a programmable processor. Method steps according to the claimed invention can be performed by a programmable processor executing a program of instructions to perform functions (method steps) of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (Application-Specific Integrated Circuits).

Details of Website and/or Document Construction System, Methods and Articles

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Turning now to the drawings, in which like reference numerals and legends indicate like elements throughout the several views, FIG. 1 is a block schematic diagram illustrating a computing environment 100 in which is provided a website (or document) construction system, methods, and articles according to aspects of the disclosed inventions. The environment is provided for purposes of user's computers 100 to create, edit, update, and access websites of a particular user, for example the user of computer 110*a*. For purposes of the discussion, the computer 110*a* will be considered the computer of the website (or document) creator and/or editor, while the computers 110*b*, 110*c* are considered computers of other users who may wish to access and view the website or document created via the user's computer 110*a*.

For purposes of this disclosure, it will also be understood that the term "website" herein can also mean an "electronic document," in the sense that many of the functionalities described herein for creating, editing, and maintaining websites apply to systems for creating, editing, and maintaining electronic documents. In one particular application, electronic documents created in accordance with the aspects of this disclosure can be printed into hard copy. It will nonetheless be understood that the primary aspects of this disclosure relate to creation, editing, and maintaining websites and electronic documents for viewing and other forms of distribution such as printing.

Hereinafter, although the term "website" is primarily used, unless the context is such that the discussion and description can only apply to a website, we mean that the described aspects may also apply to electronic documents.

The website owner's computer 110*a* accesses a website hosting and construction system (WHCS) 120 in order to create, edit, and/or maintain a website. The computer 110*a* accesses the system 120 via the Internet 20 in the known manner. Similarly, the other users' computers access the system 120 via the Internet. The WHCS 120 includes a website construction management module 122, a website hosting module 124, and, optionally, an associated computing function 125 such as a blog ("web log"). In the illustration of FIG. 1, the associated computing function 125 could be a blogging engine that is utilized by the user, for purposes of independently creating blog content either for independent dissemination or for purposes, as considered herein, of incorporation of such content into the website of the user.

The website hosting and construction system 120 further comprises a user information database 128 that is employed to store data associated with the user's website, including identification data, content items, links to content items stored in other computer systems, website templates, and other data items associated with website construction and deployment.

Each of the primary website hosting and construction system components, i.e. website construction management module (logged-in server) 122, a website hosting module (site server) 124, and, optionally, an associated computing function 125, are implemented as computer program modules that operate in the manner as described herein, and access and store data in the user information database 128.

Also shown in FIG. 1 is a third party computing function or data source 130. In certain applications, a user may desire to incorporate, embed, link to, associate with, invoke an application program interface (API), etc., some third party data source or computing function elsewhere on the Internet. For example, the user may desire to include the content of a blog that is not hosted on the system 120. Functionality of a third party data source is independent of the associated computing function 125, although the access mechanisms and methods for incorporation of data from both of such computing functions is technically similar. For purposes of this disclosure, it will be understood that other computing and/or data functions can be provided in a user's website either internally to the system 120 or from an external source 130.

Still referring to FIG. 1, the website owner's computer 110*a* is shown displaying an exemplary simplified website under construction 140. This website under construction may be referred to as a "developmental website". The developmental website includes a developmental workspace region with which the user interacts to add content or edit previously added content. The developmental website may comprise one or more separate "pages", which are merely organizational techniques for separating content into different areas or regions. For example, the developmental website in FIG. 1 includes a first page 1 of N, as well as a second page 2 of N, and a third page 3 of N (where N can be any number of additional pages). Each of the pages includes some content items.

As shown in FIG. 1, the website under construction or developmental website includes a number of different components, or containers 150-1 ... 150-9, (150 generally) discussed further below, which can be of various types and sizes and layout arrangements. For example, FIG. 1 shows a title 150-1, a navigation controls area 150-2, a body 150-3, a blog column 150-4, a footer 150-5, an image 150-6, a sidebar 150-7, an advertisement (ad) 150-8, and a video 150-9. Only a limited number of these components or elements are typically viewed by the website owner at one time. The containers 150 each define a particular renderable content item, and are the "building blocks" by which a user/developer constructs the website, as will be discussed further below.

Due to the limited area of a computer screen, such as the user's computer 110*a*, only a limited view of the website under construction is visible to the user at one time. This is shown as the display area 142, which is shown as currently visible on the user's computer 110*a*. As shown in FIG. 1, on the first web page 1 of N, the title, navigation controls, body, blog, and footer are visible in the display are 142. However, this first page 1 of N also includes an image and a sidebar, which are not in view of the display are 142, but are nonetheless a part of the first page 1 of N. As will be appreciated, in order for the user to view and interact with the portions of the first page 1 of N, he or she must scroll the webpage up into the display area 142 to expose areas of the page 1 of N for viewing and interaction that cannot be simultaneously displayed because the page under construction is larger in dimension (e.g. the length of the web page) than the length of the viewing of display area 142.

Similarly, no components of the other pages 2 of N or 3 of N are visible in the display area 142. The user must select another page for editing through a user command (not shown) in order to cause these other workspace regions to be exposed in the display area 142 for inclusion or editing of content.

In accordance with aspects of the invention, as will be described in more detail below, a system constructed as described herein allows a user (website owner or creator) to view other portions of the developmental website, invoke various user controls for inclusion of additional content and editing of existing content, in a convenient and intuitive manner.

Figure 2:
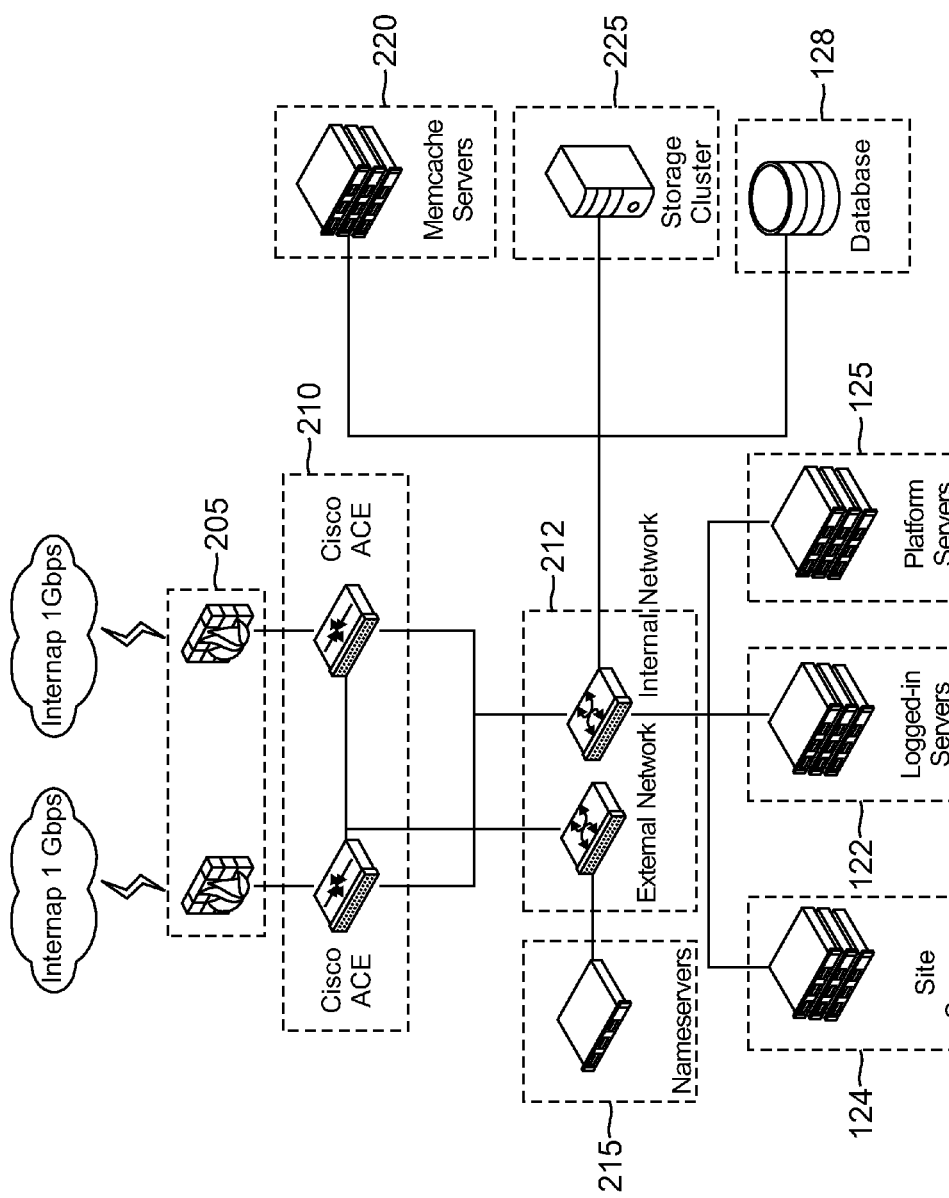
FIG. 2 is a block schematic diagram of a computer system and network components utilized to implement aspects of the present disclosure.

Before turning to a description of specific website creation functionality according to aspects of the invention(s), turn next to FIG. 2 for a brief description of the 5 computing environment for the website hosting and construction system 120.

FIG. 2 is a block diagram of the physical components of the system 120, on which program modules execute to effect the functions and features of the website construction management module (logged-in server) 122, a website hosting module (site server) 124, and when provided, an associated computing function 125, as generally shown in FIG. 1. The physical components illustrated in FIG. 2 include a firewall 205, which prevents unauthorized users from accessing the system 120 and prevents malicious traffic floods in the known manner.

The physical components also include network devices such as Cisco ACE servers 210, which serve as load balancers for incoming network traffic in the known manner. Routers 212 route network traffic within the system in the known manner for internal (i.e. intranet) and external networks. Further, nameservers 215 resolve interne domain names to correct IP addresses in the known manner. Site servers 124 displayed in FIG. 2 generate and send rendered websites created by users of the website construction system (WHCS) 120 to site visitors, i.e., users of websites created by users of the website construction system 100, in the known manner. Logged-in servers 122 host the WHCS 120 and are responsible for updating the database 128 with changes initiated during the creating and editing sessions of users of the website construction system 100, in the known manner. Platform servers 125 house platform applications, i.e., dynamic webpages created by users of the WHCS 120 that do not utilize the drag-and-drop interface, in the known manner.

FIG. 2 also includes memcache servers 220, which store data frequently accessed by users creating developmental websites through use of the WHCS 120. Memcache servers 220 help to improve performance of the system 120 in the known manner. The storage cluster 225 shown in FIG. 2 is used to store static assets, e.g., images, used in websites created by users of the WHCS 120 in the known manner. Finally, the database 128 shown in FIG. 2 stores all data associated with the websites created with the WHCS 120 in the known manner.

Figure 3A:
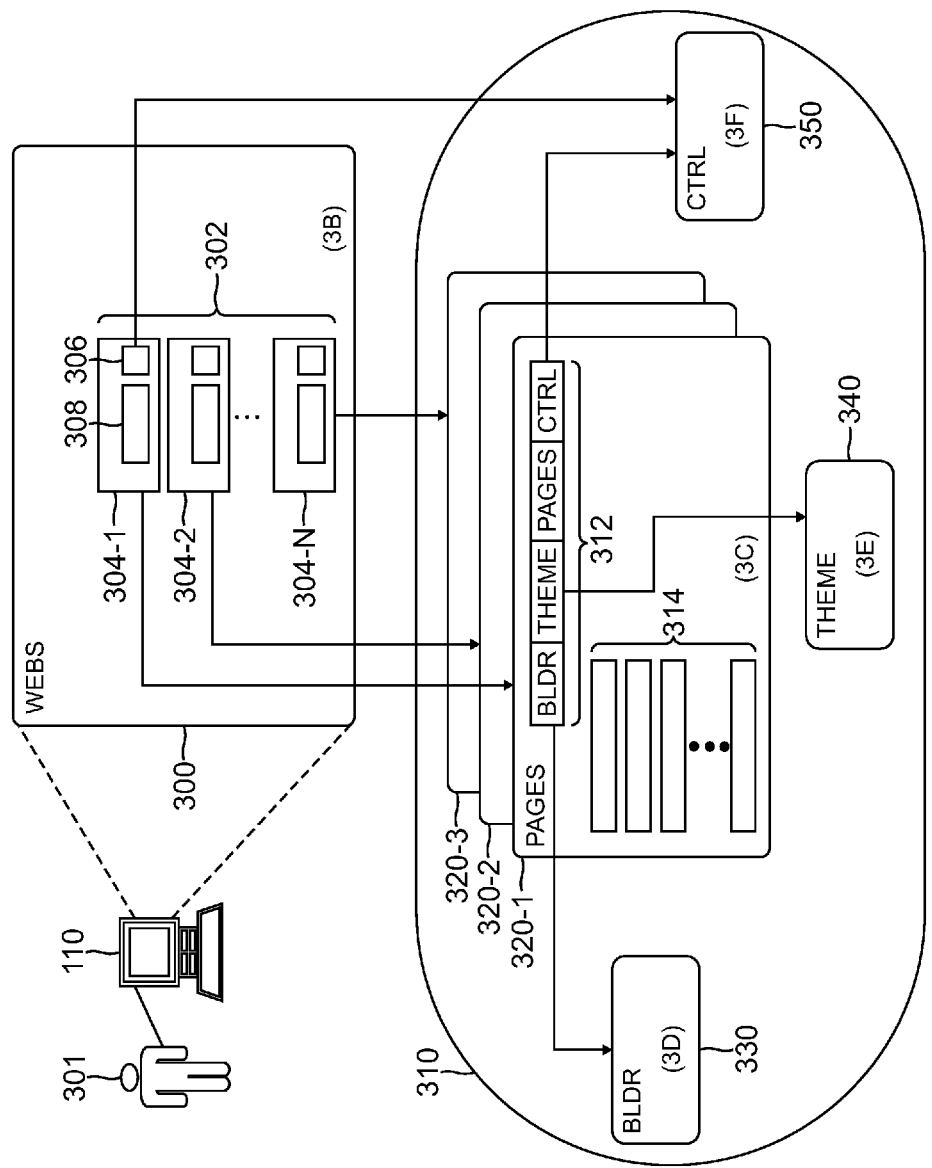
FIGS. 3A-3F show a hierarchical menu structure for website construction.
Figure 3B:
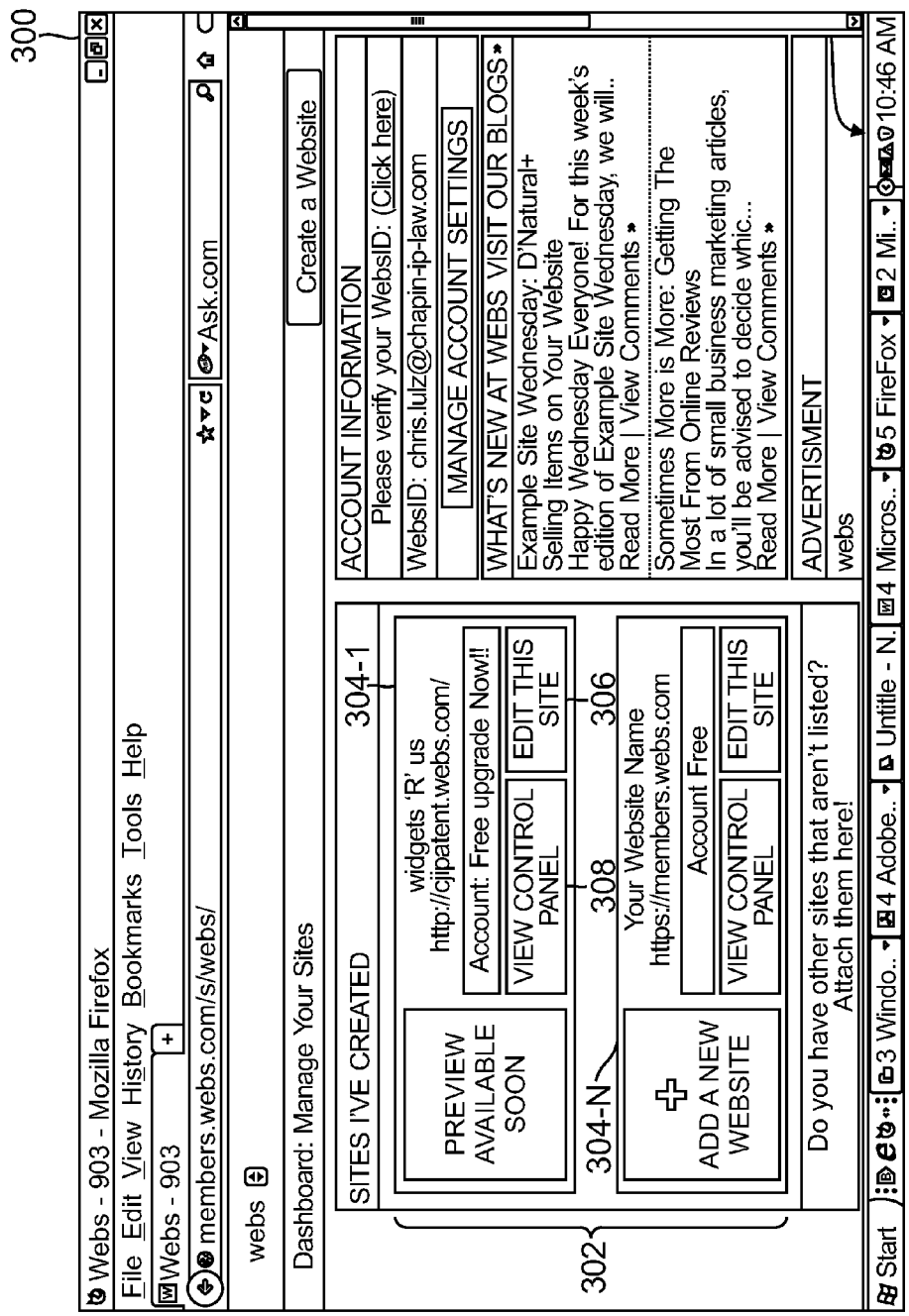
Figure 3C:
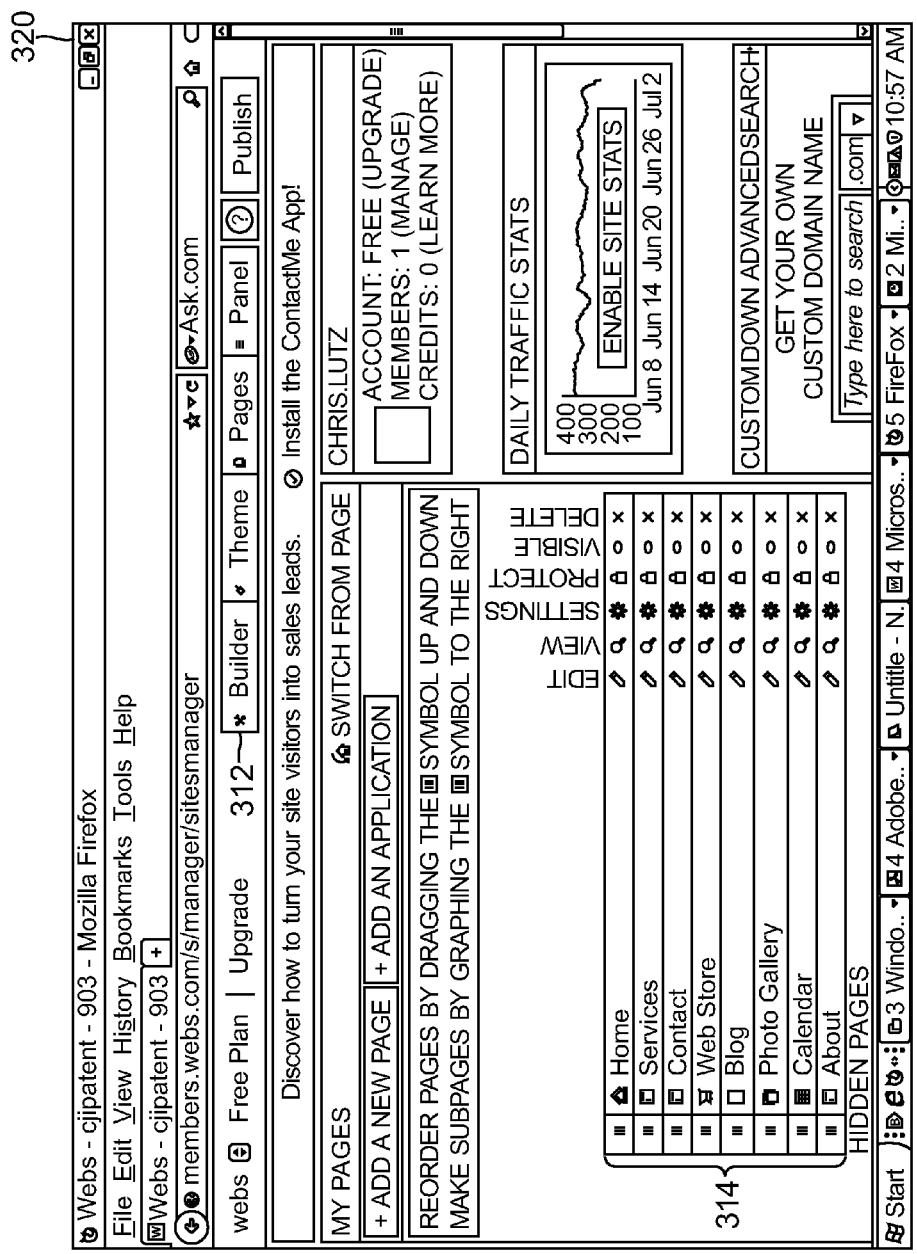
Figure 3D:
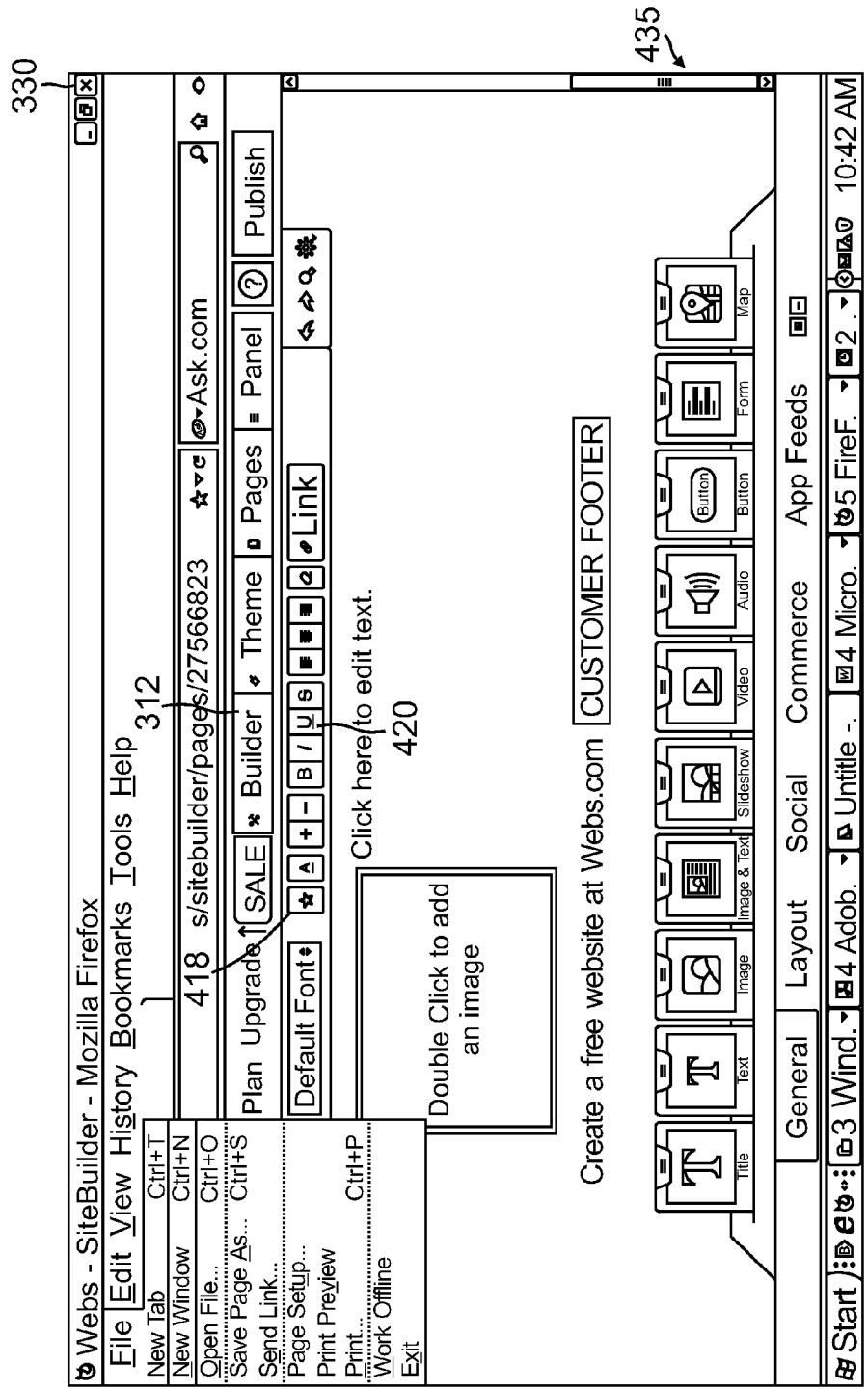
Figure 3E:
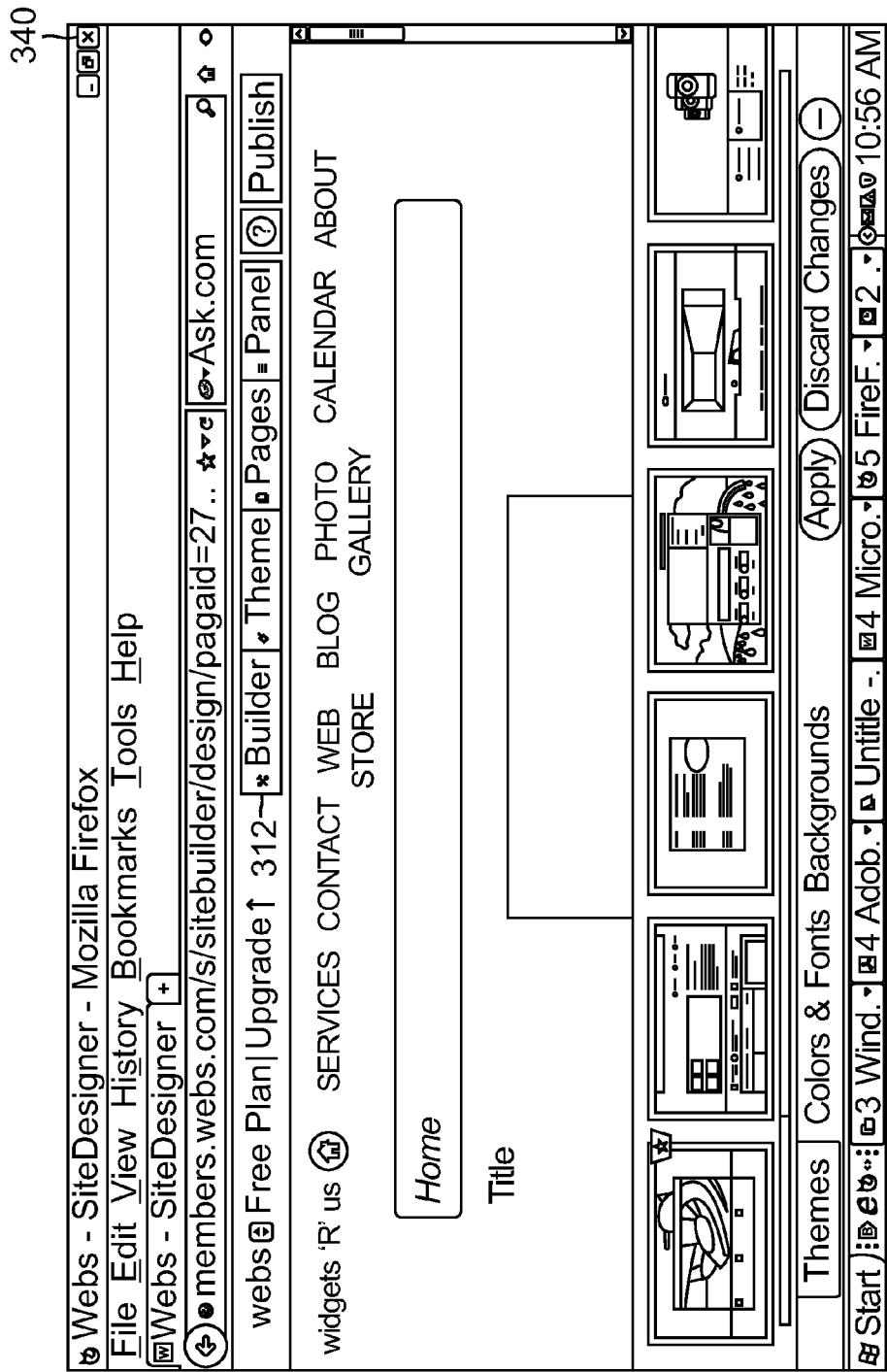

FIGS. 3A-3F show a top level development window 300 viewable by a user 301 shortly after login. This development window 300 is the top of a hierarchical GUI (Graphical User Interface) described by the screen views (screen shots) following in FIGS. 3B-3F. The development window 300 includes a site selection container (window) 302 including selections 304-1 . . . 304-N for each website created by the user. FIG. 3A shows the control flow from the development window 300 to the windows of FIGS. 3B-3F. Selection of a website 304 leads to a development display sequence 310, having a plurality of screens 320-1 . . . 320-N each corresponding to a specific website 304 of the user. The development display sequence 310 has display modes 312 selectable from user controls depicted as tool icons 420. The display modes 312 include webpages 314 existing in the website, shown in FIG. 3C, a builder display 330 for modifying a page, shown in FIG. 3D, a theme display 340, as shown in FIG. 3E, corresponding to colors and styles of all pages in the website, and a control display 350 in FIG. 3F, for administrative controls, which is also available directly from the site edit button 306. Each of the display modes 312 is also selectable from within the other modes.

Figure 4:
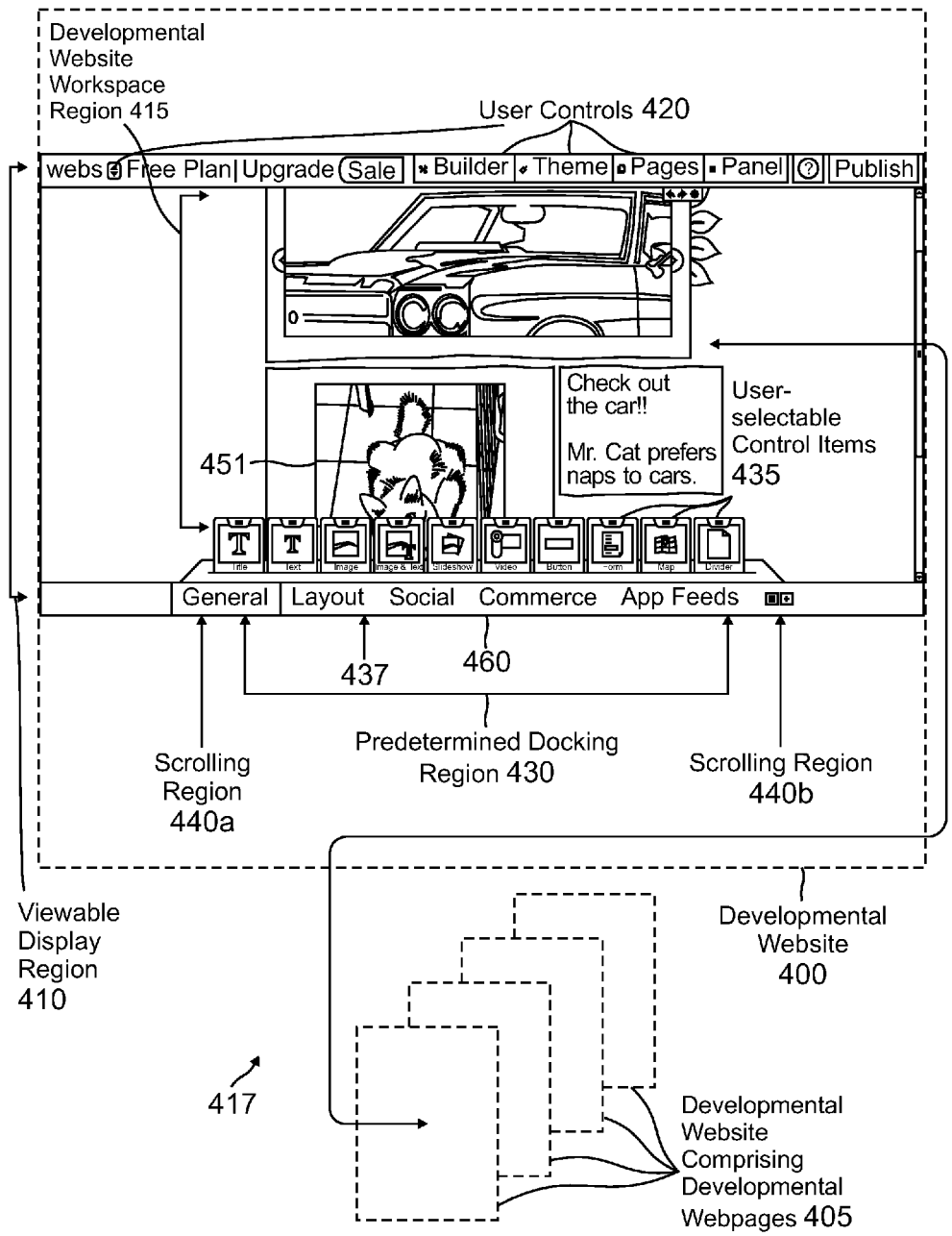
FIGS. 4-4E are screen depictions of a user interface of user control modules for a developmental website in accordance with aspects of the disclosed invention(s).

Selection of the builder 330 allows generation of window based content for insertion in the website 400 (FIG. 4). Referring to FIG. 3D and also to FIG. 4, in the builder display mode, user selectable controls 435, or modules, allow insertion of containers. Each user selectable control 435 has a corresponding toolbar 418 of user controls shown as tool icons 420 specific to the selected module 435. The builder screen 330 receives, from one of the plurality of modules 435, which are user selectable control items, corresponding to types of window based screen elements, a selection of a module 435 for defining a container 150 responsive to a type of the screen element, in which the type determines the data displayable in the screen element (text, image, video, etc.). Typically, each container 150 corresponds to a display window on the screen for rendering the corresponding content. Pointer commands (e.g. mouse drag and click) position the container 150 by placing the corresponding module 435 on the screen, and a selection is received indicative of a source of the data for populating the container 150, such that the source based on the type of the screen element. Typically, a file selection based on a file browser window appears, however may differ based on the type of data expected to populate the container. The screen activates a toolbar 418 of content specific tool icons 420, such that the tool icons 420 are based on the type of container (e.g. screen window) for modifying the data from the selected source. Upon selection, the display area 142 displays an interface responsive to each of the activated tool icons 420, and receives a selection of at least one of the tool icons 420.

Selection therefore presents a hierarchical screen arrangement in the display sequence 310 for constructing the website under construction 400 (the "developmental website"), in which the screen arrangement includes the site selection window 300 for selecting the website under construction 400 from a plurality of available stored websites 304-1 . . . 304-N (304 generally), and a display mode 312 for identifying a set of features for modification, such that each display mode 312 has a corresponding screen 320, 330, 340 and 350. Each display mode 312 is selectable from any of the other display modes by activating the user controls to enter another mode 312.

Figure 3F:
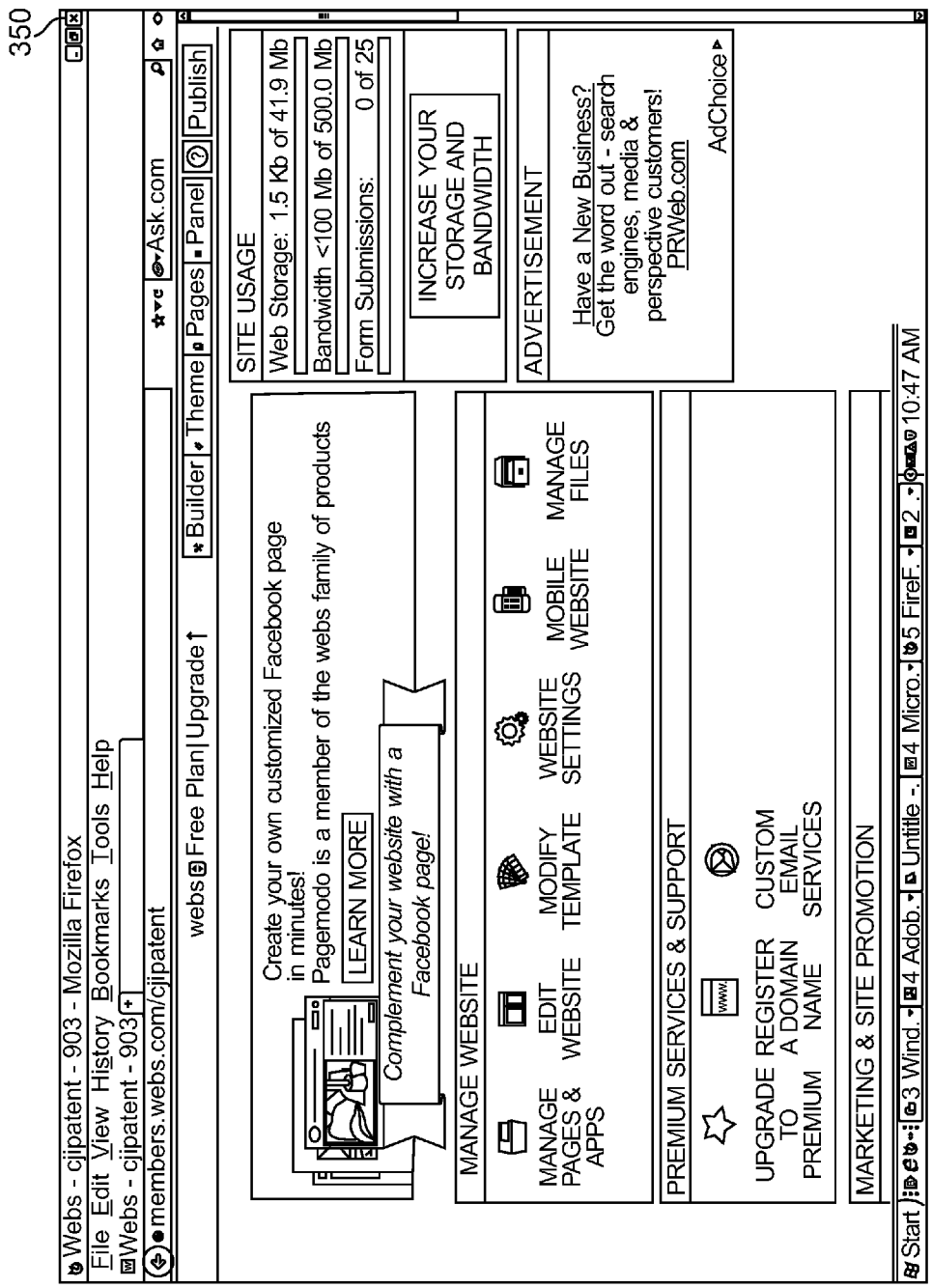

The display modes 312 and corresponding screens include a webpage selection mode 320 for selecting pages 314 of the website under construction 400 for modification, as shown in FIG. 3c, and a builder selection mode 330, as shown in FIG. 3d, for adding and modifying content of the selected website 304 and webpage 314. A theme selection mode 340, shown in FIG. 3e, is for modifying common colors and styles of all pages in the website 314, and a control panel selection mode 350, as shown in FIG. 3f, is for managing administrative details. The builder mode 330 is the primary conduit for defining the appearance and content of the website under construction 400, discussed in greater detail below in FIGS. 4-4E below.

User Interface for Developmental Website

FIG. 4 illustrates an exemplary embodiment of a developmental website according to aspects of the various invention(s). The developmental website 400 is generated and displayed to a website developer (user) using a Website Development Platform (WDP or "platform") such as is shown generally in FIG. 1. According to one aspect of the present system, the platform generates a developmental website 400, one or more developmental webpages 405, and a viewable display region 410 allowing a user to view a developmental website workspace region 415, and various user-selectable tool icons 420. The platform further comprises a predetermined docking region 430, user selectable controls 435 in the docking region, and one or more scrolling region(s) 440. As referred to herein, "developmental website" generally refers to a website or other online page that is in development or under construction by a system user (e.g., developer). As shown in FIG. 4, a developmental website 400 generally comprises multiple developmental webpages 405, such developmental webpages typically allowing a user to construct and customize a website by adding website content items such as text, titles, images, or similar items that will occur to one of ordinary skill in the art.

As shown in the exemplary embodiment of FIG. 4, a viewable display region 410 provides a display to a user interacting with the website development platform (WDP) of the functionalities available for constructing a developmental website. The viewable display region 410 generally allows a user to view a developmental website's segment of a developmental website with which a user is currently interacting in order to construct a developmental website. The viewable display region 410 is typically the viewable area of the developmental website, as displayed on the user's computer monitor. As will be appreciated, and in accordance with aspects of the invention, the viewable 5 display region is generally smaller than the developmental website 400 or a typical page thereof.

The viewable display region 410 likewise displays user-selectable tool icons 420 (toolbar and display mode), 435 (modules) and 460 (module selection). According to one aspect, the user-selectable control items 435 in the docking region 430 are selectable and draggable. Initially, such items are positioned along the predetermined docking region 430 to provide a fixed location for user convenience and familiarity. When selected and dragged, a user-selectable control item 435 assumes a different appearance to the user, to indicate that the item is being dragged from the docking region 430. Preferably, a blank space (not shown in FIG. 4) appears on the docking region at the location of the selected control item while it is being dragged by the user, to indicate to the user of the selection of the item and reinforce the type of item, and provide a visual cue that the control item will reappear (re-populate in the docking region) upon release of the item or other similar user command. The module controls 460 allow selection between different sets of modules 435, discussed below.

The user-selectable control items 435 provide the user with access to website construction functionalities represented by the control items. Generally, website construction functionalities represented by the user-selectable control items allow a user to incorporate a plurality of website construction content items into a developmental website. Website construction content items typically allow a user to add website content to a developmental website, such content including text, images, videos, buttons, slideshows, maps, and similar items for constructing a website as will occur to one of ordinary skill in the art. For example, if a developer wanted to add a picture of a car or a cat to a developmental website, as is shown in FIG. 4, the developer would select an image-specific user-selectable control item 435 from the docking region and drag and release the user-selectable representation of the user-selectable control item into the developmental website workspace region 415 to place an image representation at a desired location. This control item 435 therefore allows addition of the image-specific website construction content item corresponding to the control item 435 to the workspace region 415.

As will now be understood, the viewable display region 410 provides a predetermined docking region 430 that provides a user with a convenient location for accessing a plurality of user-selectable control items 435 while constructing a developmental website 400. Additionally, the viewable display region 410 displays other user control tool icons 420 (aside from the control items in the docking region) that allow a user to make alterations to a developmental website. Alterations to a developmental website may include adding new webpages to the developmental website, renaming developmental webpages, or similar actions that will occur to one of ordinary skill in the art.

According to another aspect, the viewable display region 410 displays scrolling regions 440, shown as a pair of separate scrolling regions 440a, 440b, positioned to either side of the docking region in FIG. 4, as one example of placement. Scrolling regions 440 allow a user to select a control item 435 while viewing one area of the developmental website 400, represented by a developmental website workspace region 415 in the viewable display region 410, and navigate (e.g. drag) the user-selectable representation of a user selectable control item to a different portion of the developmental website, thus allowing the user to select a website construction functionality prior to deciding the location of the developmental website into which the functionality should be incorporated. For example, a developer may select the image-specific user-selectable control item (e.g. item 437), or module, from the docking region 430 in order to place an image of a cat 451 at the top of the developmental webpage. If the user then decides that the image would be better suited for the bottom of the webpage, the scrolling region 440 allows the user to navigate (drag the control item) to the bottom of the webpage to the scroll region, to expose additional area of the developmental website 400 previously hidden from view, without placing the control item back in the docking region and manually scrolling to the bottom of the webpage using a standard scrollbar, as will be understood by one of ordinary skill in the art.

In the builder display 330, a set of module controls 460 navigates between different sets of available modules (user selectable control items 435) depending on the type of container being entered by the developer/user. Thus, the various user controls for generating website content include the previously discussed display modes 312 corresponding to a type and granularity of modifications to perform to a website under construction 400, modules (user selectable control items) 435 corresponding to containers 150 based on types of window based display mediums, such each module 435 is specific to a particular display medium, and toolbars (user controls) 418 specific to each of the modules 435, in which each of the toolbars 418 has a set of tool icons 420 for manipulating the content of display medium of the module 435 to which it corresponds. The module control 460 selects between different sets of modules 435 (general, layout, social, commerce and app feeds) available, as discussed with respect to FIGS. 4A-4E.

Figure 4A:
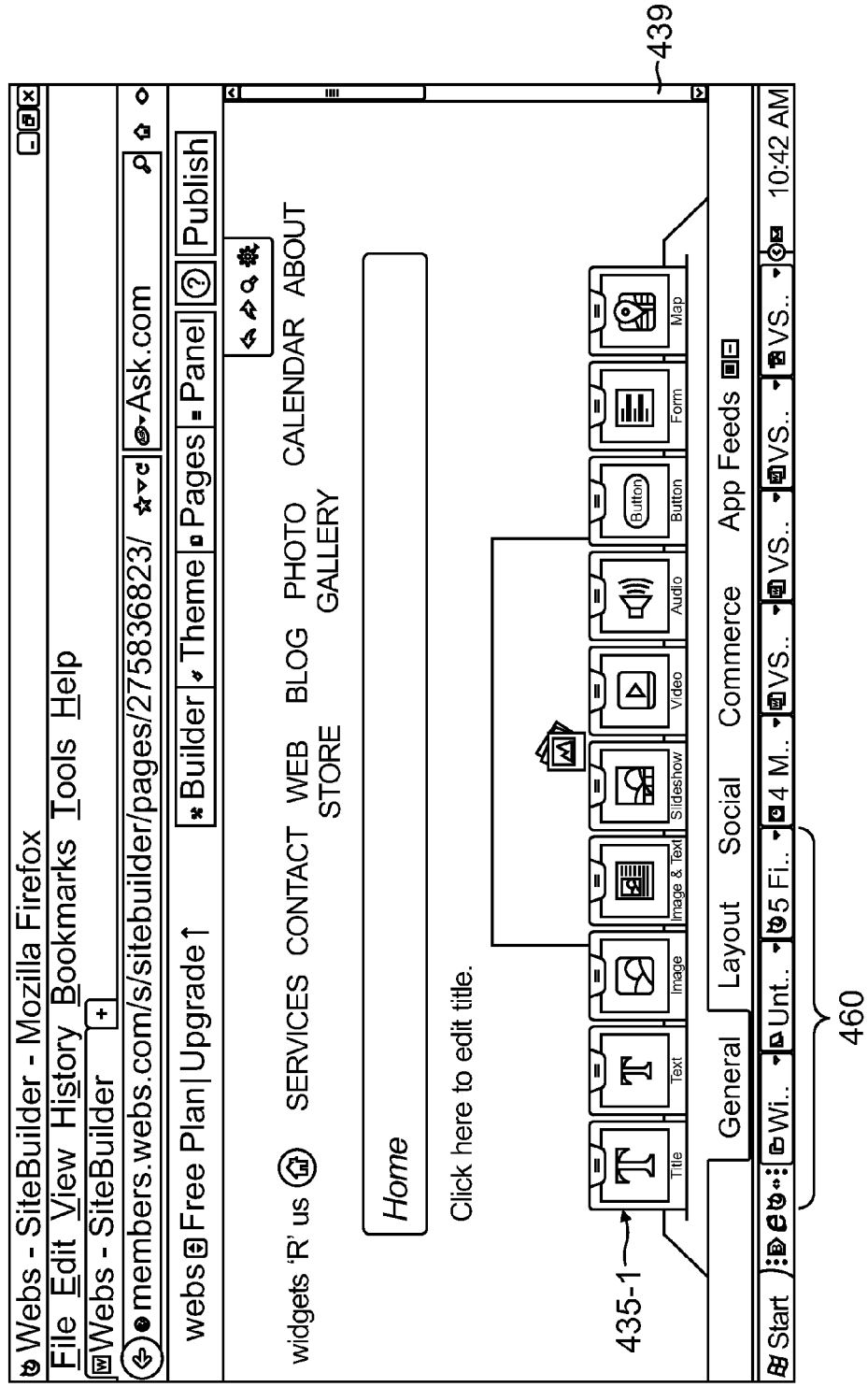
Figure 4B:
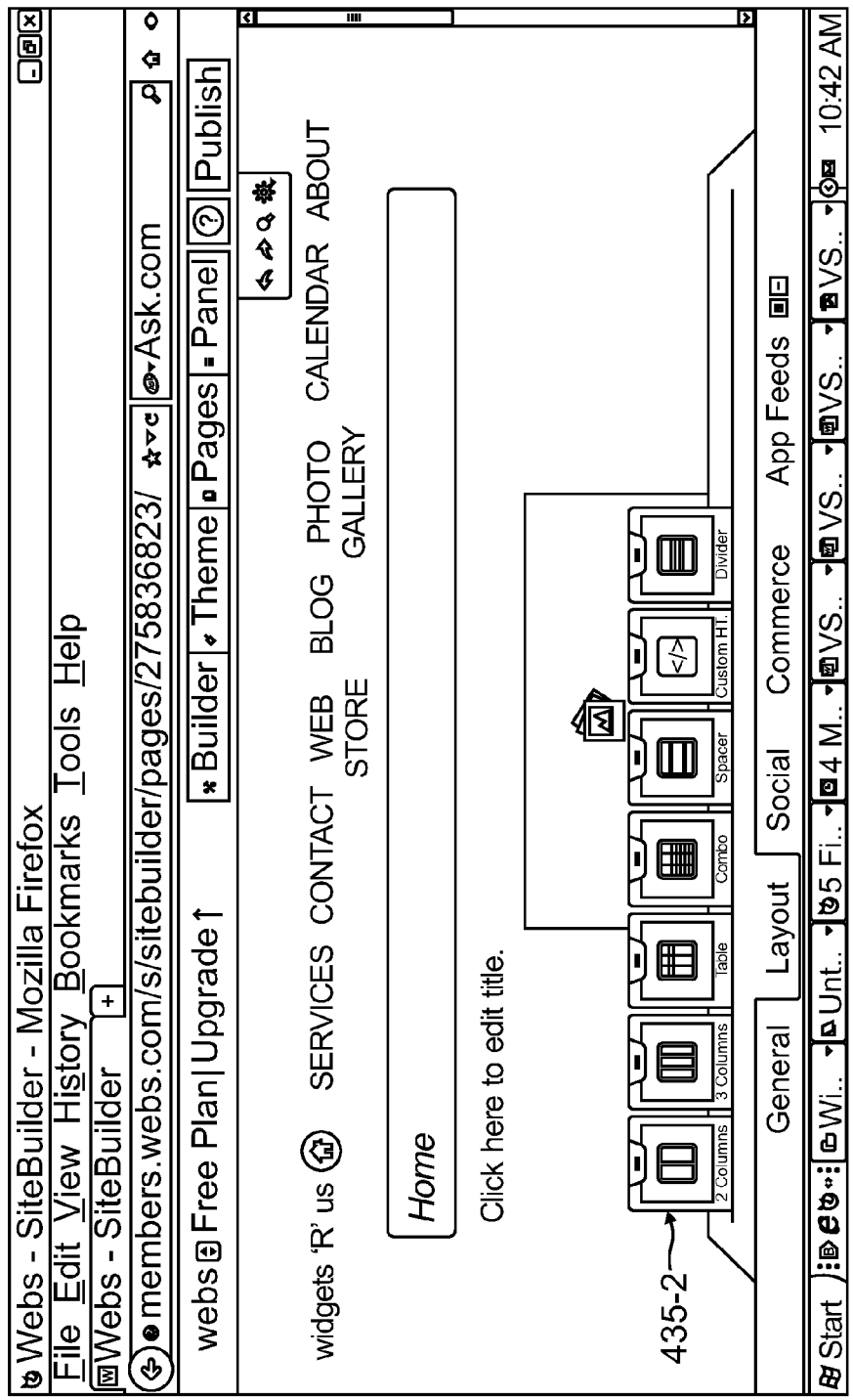
Figure 4C:
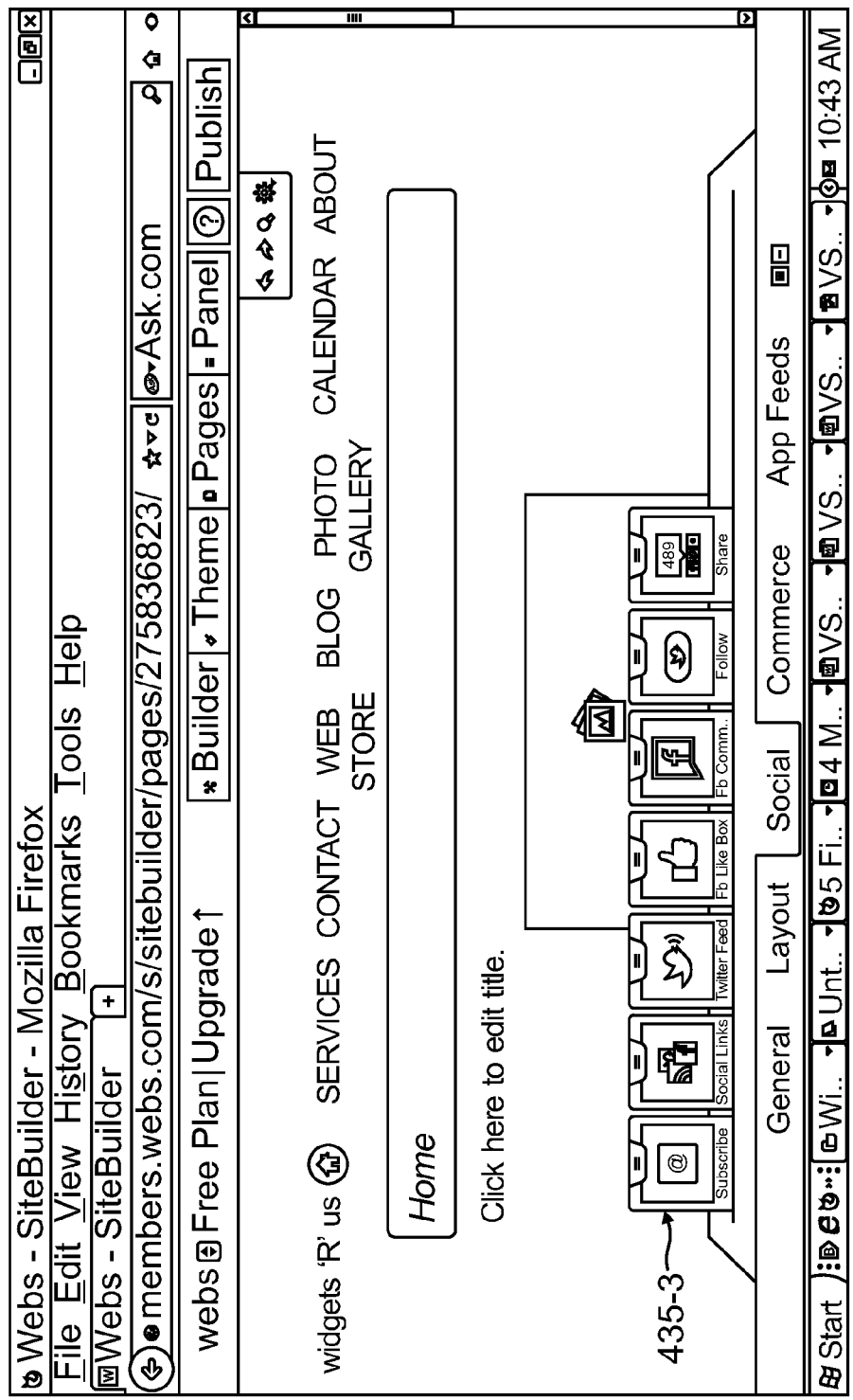
Figure 4D:
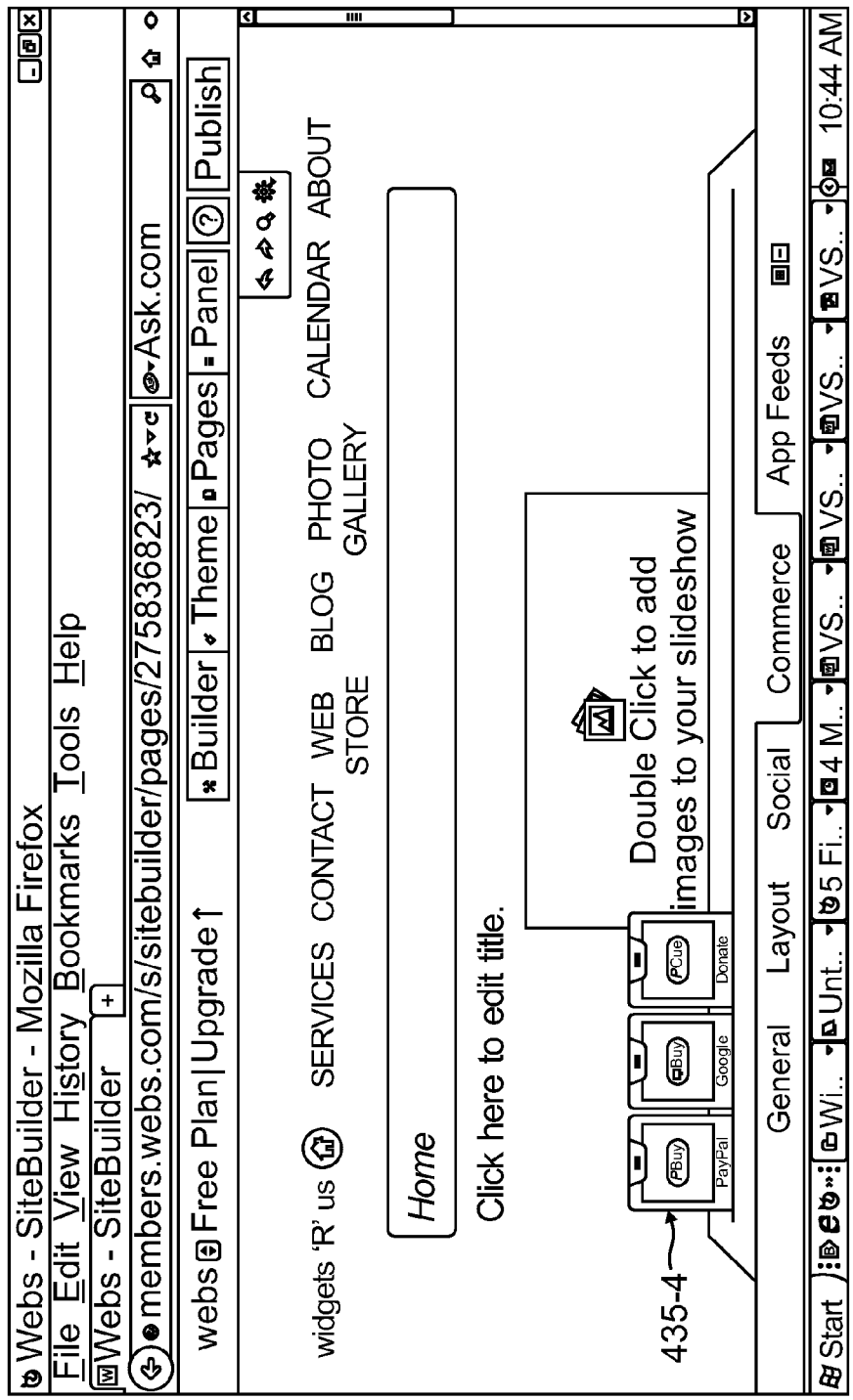
Figure 4E:
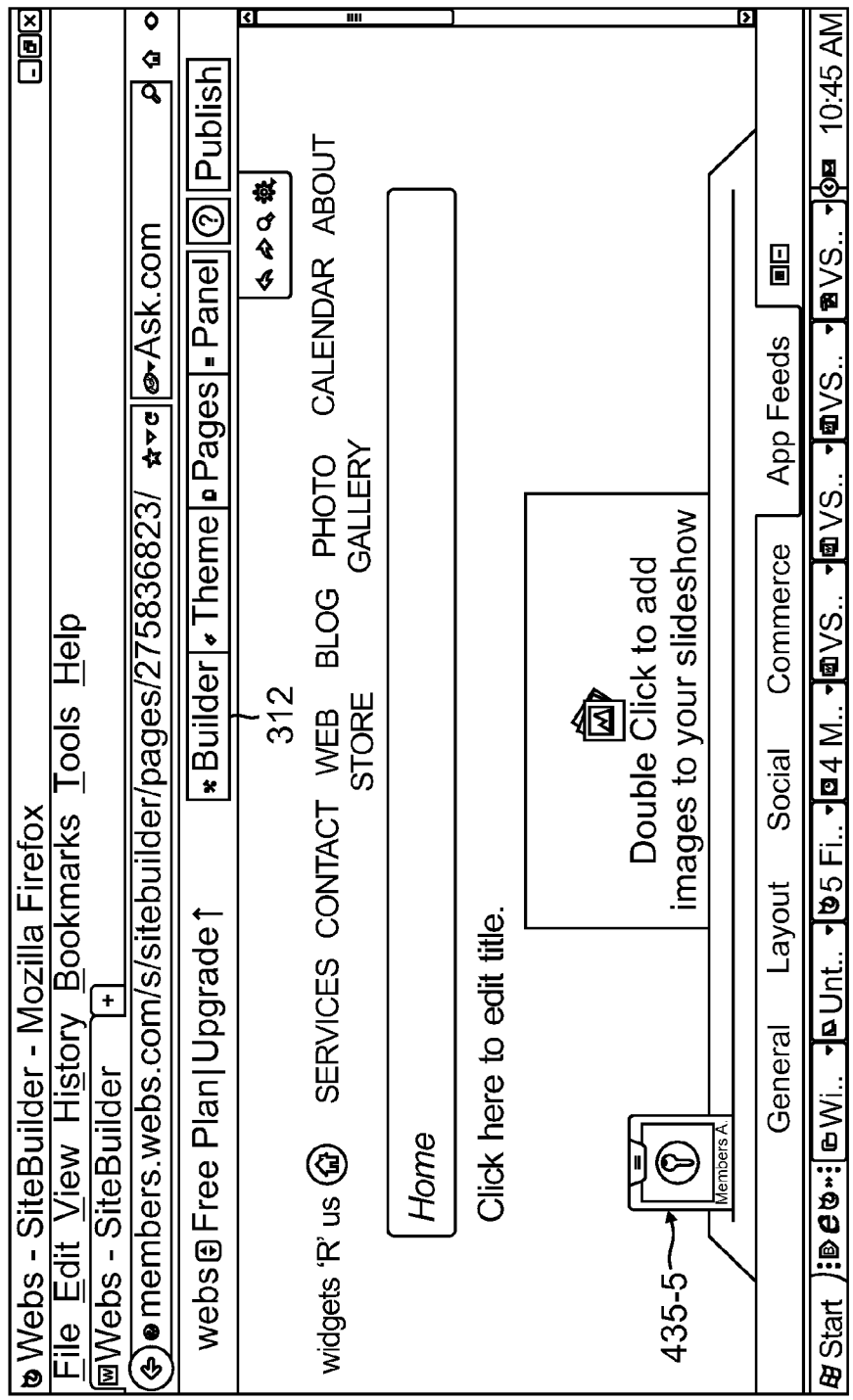

FIG. 4A shows a general set of modules 435-1 for inserting or modifying containers in the workspace 415. The general modules 435-1 correspond to different types of media available for placement in containers 150 on the webpage 405. FIG. 4B shows layout modules 435-2 for arranging the containers on the webpage 405. FIG. 4C shows social media modules 435-3 for defining interfaces to external social media sites. FIG. 4D shows commerce modules 435-4 for interfacing with third party payment authorities for enabling monetary transactions in the website under construction 400. FIG. 4E presents application modules 435-5 for enabling application feeds and control from launched applications.

Retractable Dock for Control Items

Figure 5A:
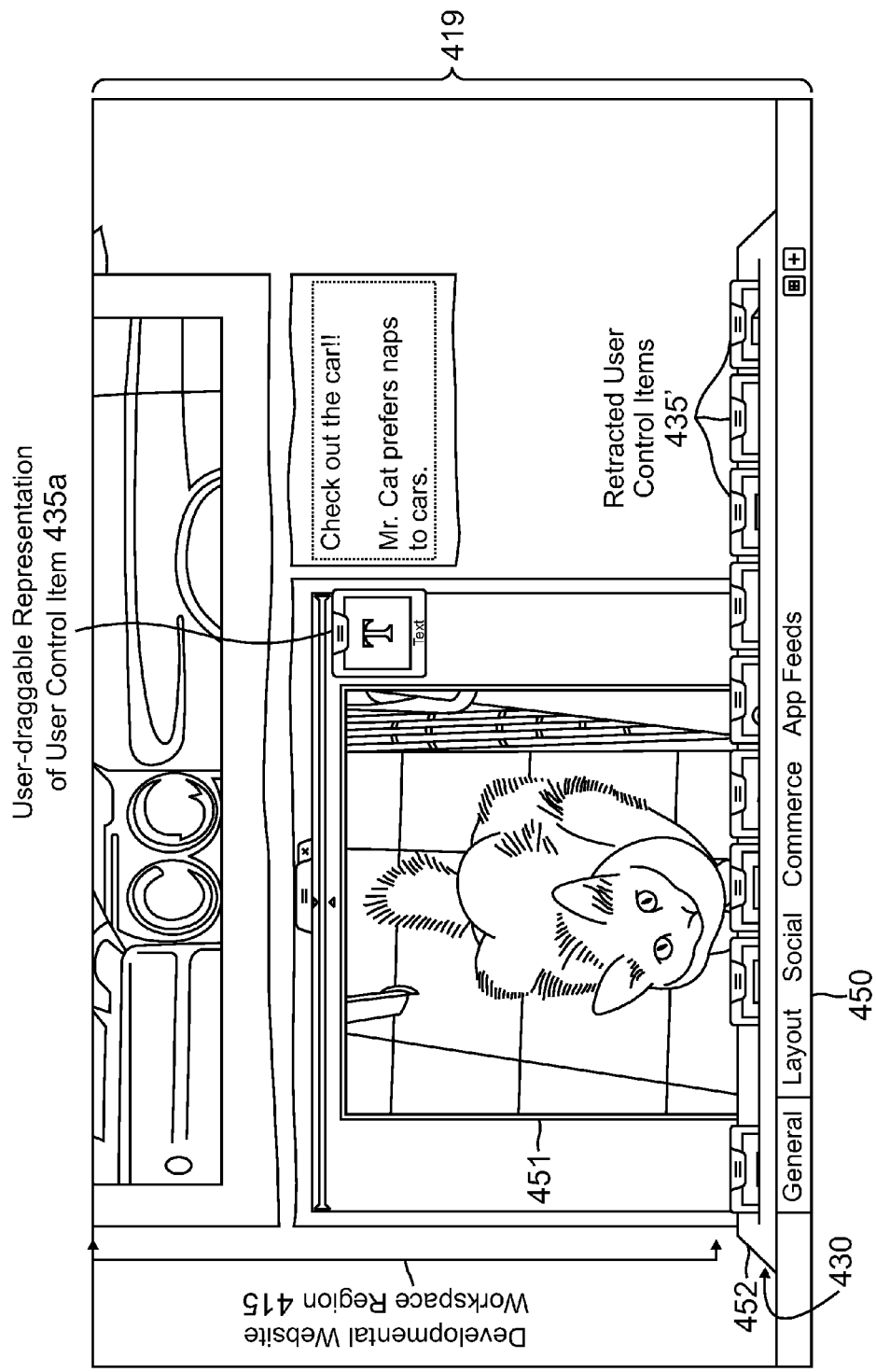
FIG. 5, consisting of FIGS. 5A-5C, illustrate aspects of a retractable dock for control items.
Figure 5B:
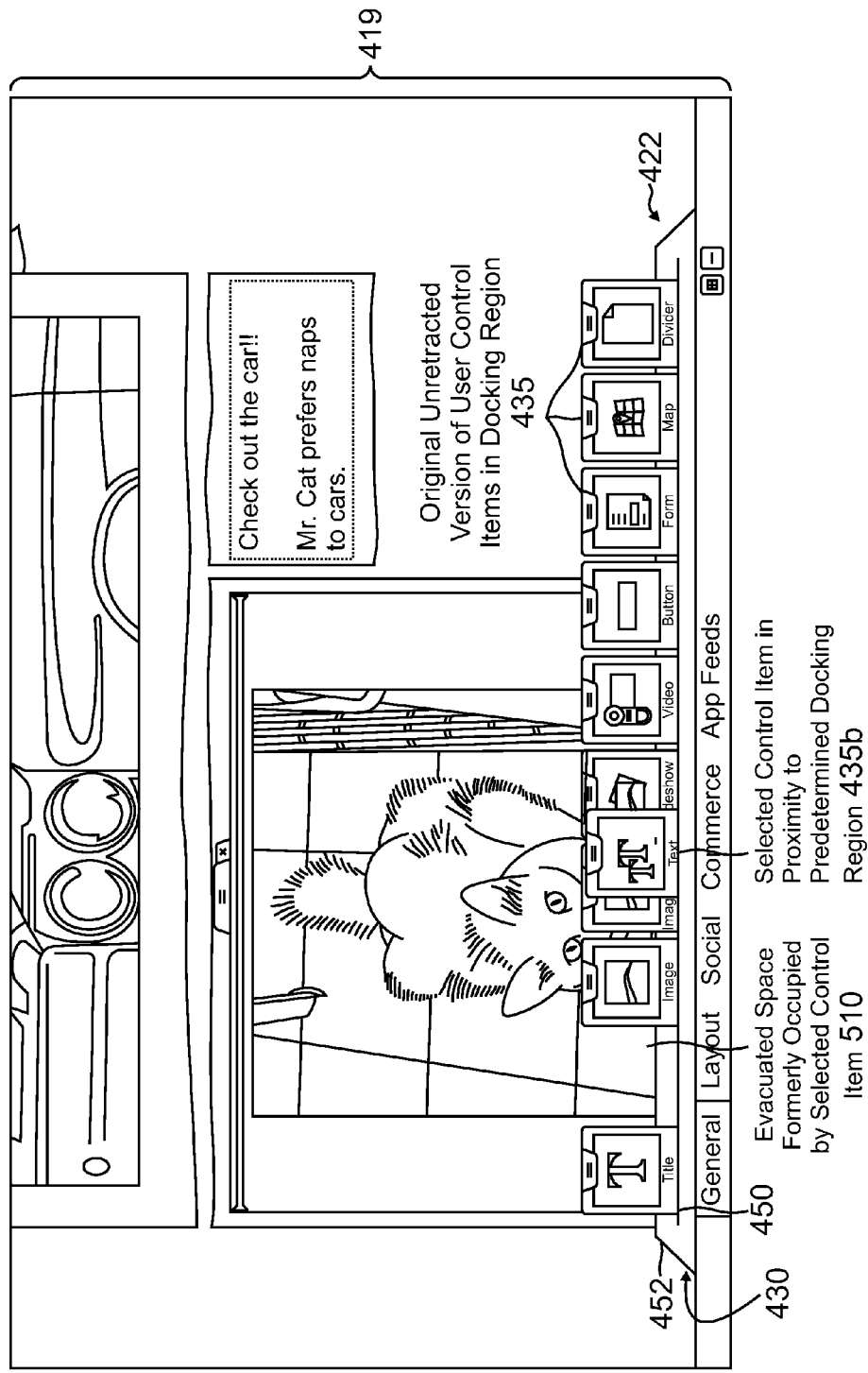
Figure 5C:
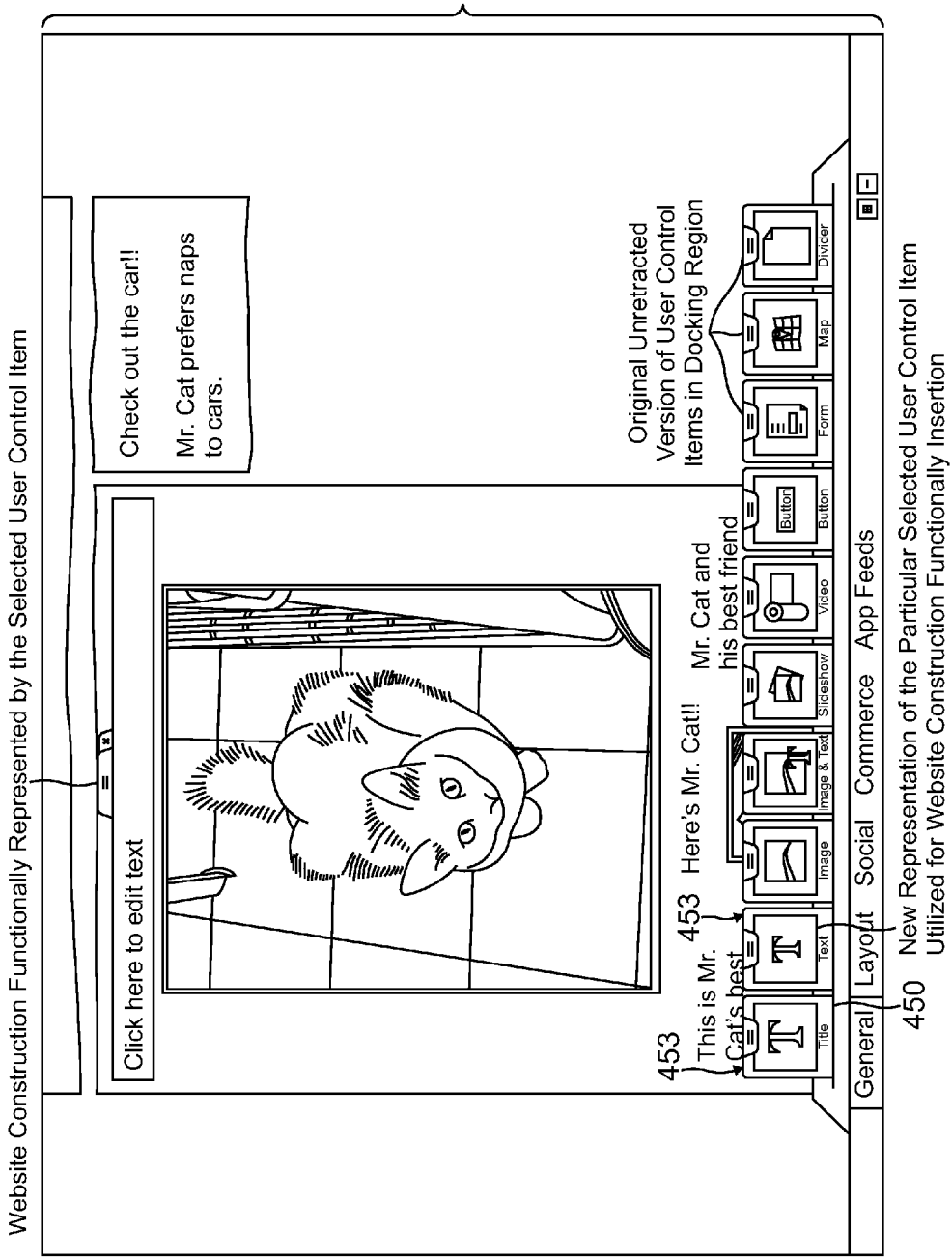

FIG. 5, consisting of FIGS. 5A-5C, are exemplary screenshots of the developmental website workspace region 415 at two different instances of time to illustrate aspects of retraction of the docking region 430. As shown in FIG. 5A, a developmental workspace region 415 provides a region for constructing a developmental website 400. As shown in the developmental workspace region 415, a user is able to manipulate a user-draggable representation 435a of a selected user-draggable control item out of the predetermined docking region 430 for purposes of adding website construction functionality to a developmental website. When a user removes (drags) a representation of a user-selectable control item (e.g. 435a) from the predetermined docking region, the remaining user control items on the docking region 430 retract in appearance to assume the view as shown at 435', thus providing the user with a maximized developmental website workspace region. The remaining retracted user selectable control items thereby form a retracted image version of the control items in the docking region, as shown in FIG. 5A.

As shown FIG. 4 and FIG. 5, visual representations of user-selected control items 435 are illustrated as movable tiles or icons; however, as will be understood by one of ordinary skill in the art, a visual representation of a control item may comprise a variety of other representations of control items such as boxes, icons, selectable buttons, or similar items that will occur to one of ordinary skill in the art. Embodiments of the present system and methods are not intended to be limited in any way by the shown representations of the user-draggable representation of the user-draggable control item. FIG. 5B is a screenshot similar to that of FIG. 5A, at a different point in tune, showing a developmental website workspace region 415 with the user-selectable control item 435b having been relocated (returned by the user) to the proximity of the docking region 430. FIG. 5B is intended to demonstrate a scenario in which a user has returned the selected user-draggable control item 435b to the proximity of the docking region, perhaps after the user has decided not to place the website construction functionality associated with the selected control item into the developmental website workspace region. Upon returning the control item 435b to the proximity of the docking region 430, the plurality of unselected control items unretract (emerge, ascend) from the docking region, thereby forming an unretracted image version of the unselected control items 435 in the docking region 430 while also providing an evacuated space 510 formerly occupied by the currently selected control item 435b. The evacuated space 510 signifies to the user the location for returning the particular type of control item to the docking region 430, thus allowing the user to select a different user-draggable control item or otherwise manipulate the developmental website.

Although the user may return the selected control item 435b to the exact location that the control item originally appeared (represented in FIG. 5B as the evacuated space 510), in accordance with aspects of the disclosure, merely bringing the control item 435b to the vicinity (a predetermined distance) of the docking region 430 and releasing the mouse indicates that the control item is to be returned to the evacuated region. The return of the control item 435b is thus automatic whether the item is returned to the evacuated region or merely to the vicinity of the docking region. Because each control item 435 is of a distinct type and originally resides in a predetermined location, and only one control item may be selected at a time, it will be appreciated that the control item automatically and consistently returns to its predetermined location so as to reinforce location association of the control item in the user's mind.

Referring now to FIG. 5C, once a user drops or releases a selected control item such as 435a in FIG. 5A into the developmental website workspace region, all control items 435 reappear in the docking region 430, i.e. the docking region ascends or reemerges from its retracted view and reassumes the original view of the docking region 430 and associated control items 435. The user-selectable control items 435 that reappear in the docking region form an unretracted image version of the plurality of user control items in the docking region, thus providing a user with convenient access to the control items for making another selection of functionality for modifying the developmental website.

Scrolling Region for Exposing Additional Workspace/Buffer Region

Figure 6A:
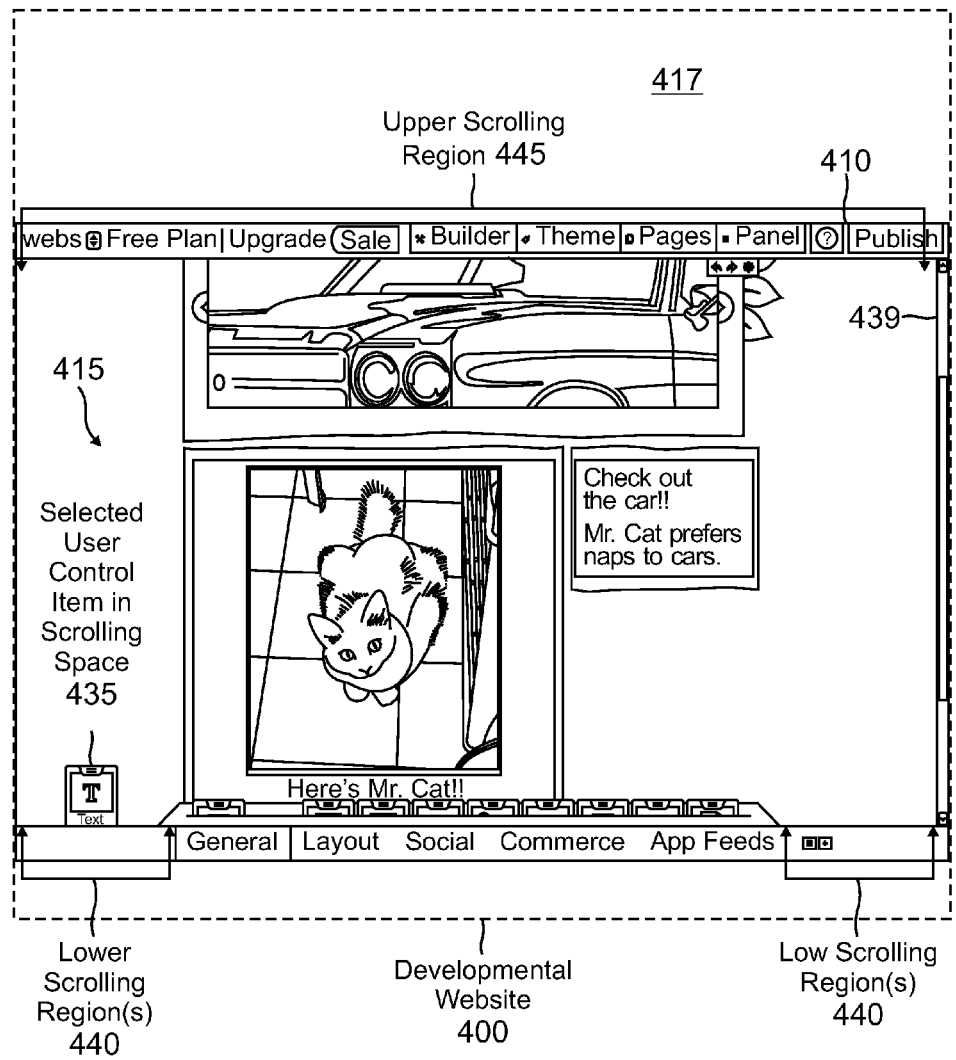
FIG. 6, consisting of FIGS. 6A-6B, illustrate aspects of operation of a scrolling region for exposing additional space or a buffer region of a developmental website.
Figure 6B:
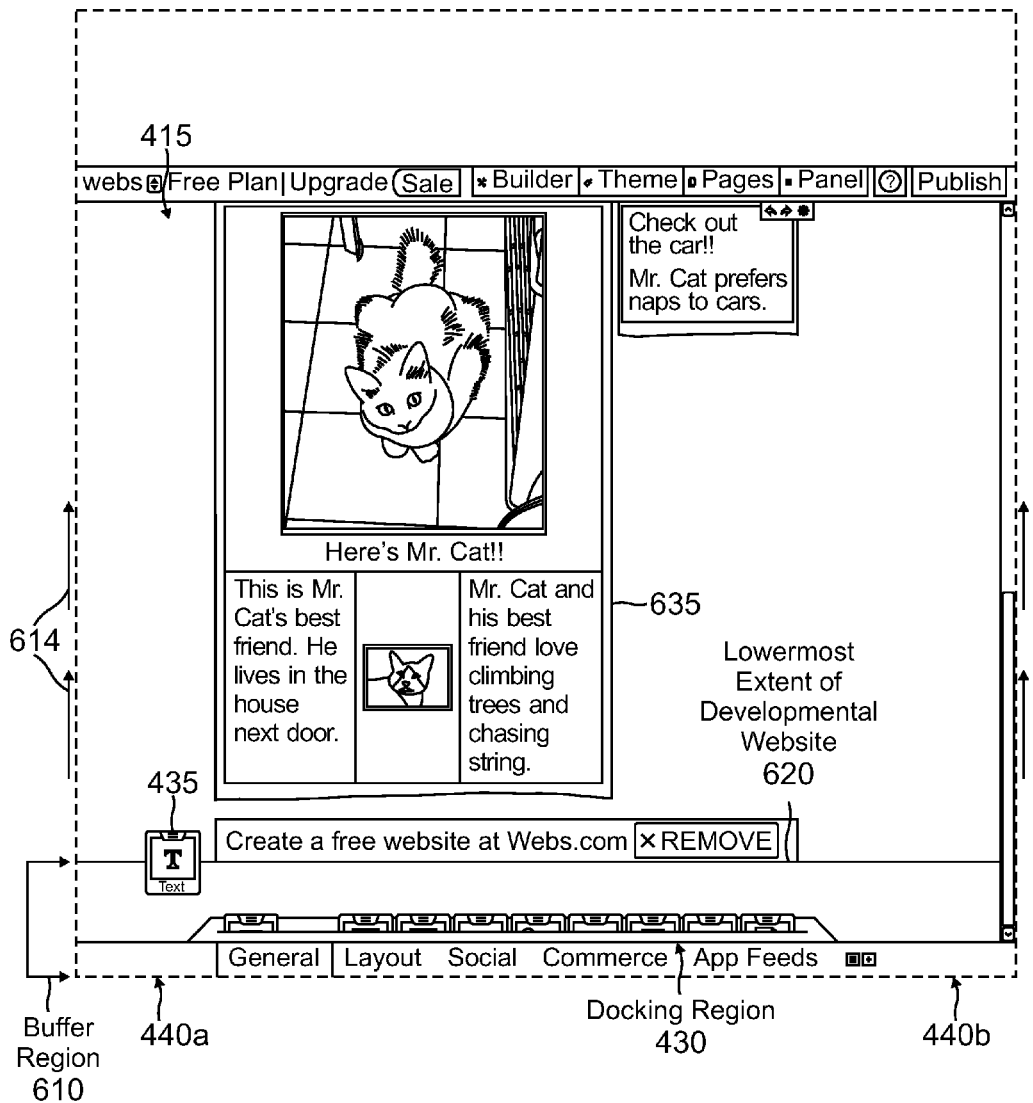

FIG. 6, consisting of FIGS. 6A-6B, is a screenshot illustrating aspects of a developmental website workspace region 415 at two different points in time to illustrate the generation of additional space in the form of a buffer region 610 for a developmental website. At a first time, as shown in FIG. 6A, a user has dragged a representation of a user-selectable control item 435 into a scrolling region 440 in order to access a region of the developmental website 400 not currently shown in the display region 410. As shown in FIG. 6A, the developmental website 400 may include additional space (allocated in memory) below the viewing area of the display region 410 that is not presently visible to 10 the user.

Although FIG. 6 shows lower scrolling regions 440 on either side of the docking region 430, it will be understood that the scrolling region 440 could encompass the entire lower boundary of the developmental website workspace region. Also, it will be understood that an upper scrolling region 445 may be provided to allow for scrolling the developmental website 400 downwardly.

FIG. 6B illustrates the additional space or a buffer region 610 for the developmental website 400 that is accessed by movement of a selected control item 435 to a scrolling region 440 in FIG. 6A. As shown in FIG. 6B, the user drags the selected control item 435 into the scroll region 440, which causes the system to scroll the developmental website 400 upwardly in the direction of arrows 614, thereby exposing additional areas of the developmental website that once were "off screen" below the lowermost boundary of the display region 410. The user provides a command for scrolling by dragging the control item 435 to the scrolling region and holding the control item in the scrolling region. Once the user scrolls to the lowermost extent of the developmental website 400, the scrolling ceases and an "end line" or lowermost extent or boundary 620 of the developmental website is displayed. The cessation of scrolling indicates to the user that the end of the developmental website has been reached. Still referring to FIG. 6B, when the scrolling ceases, with display of the buffer region 610 and lowermost extent 620 of the developmental website, the user may, if desired, release the drag operation to insert the functionality represented by the selected control item 435. As seen in this figure, the buffer region 610 is displayed in the display region below the lowermost extent 620 of the developmental website. This buffer region allows the user access to the developmental website that is unobstructed by the docking region or the user-draggable control items. Therefore, the user is able to place the currently selected user-draggable representation of the user-draggable control item and resultant website construction functionality in any location within the workspace region capable of accepting website content items.

According to an aspect of the system and methods, release of the control item 435 after scrolling has ceased in any space above the docking region 430, generally beneath the last content item such as the image container 635, causes insertion of the functionality within the developmental workspace after the last content item 635. In this aspect, a representation of the inserted functionality (such as another image or a text item) is displayed to the user and the lowermost extent 620 of the developmental website is no longer displayed (i.e. the lower boundary line is no longer displayed), and the workspace region 415 expands to accommodate insertion of the new functionality. For example, a new content item container appears. The workspace region 415 expands to fill the space to the lowermost portion of the display region 410, with a representation of the inserted content visible, in a manner similar to that in FIG. 6A.

In further detail, continuing referring to FIGS. 5A-5C and 6A-6B, the docking region 430 and buffer region 610 are complementary for providing a visual editing tool for editing an on-screen image, and, includes a workspace 415 for rendering an edit document 417. The edit document 417 is responsive to editing modules, selected by control items 435, for modification according to an edit function performed by each of the editing modules 435. Each of the editing modules 435 is rendered as an editing icon 435a displayed in an overlay 422 in front of the workspace 415. In the example arrangement, a user invokes the editing modules in response to the webpage design tool, such that the workspace further comprising a webpage under development 400 adapted for a graphical user interface (GUI) responsive to a browser.

A video screen or other rendering device 110 provides a rendering area 419 in the workspace region 415 defined by a physical visual display surface 142 (FIG. 1), including the on-screen image, in which the rendering area 419 displays at least a portion of the edit document 417 of the current page 405 of the website 400. The buffer region 610 is adjacent to the edit document 417 on the workspace, and allows unimpeded viewing of the edit document 417 by occupying a background area behind the editing icons, in which the overlay effectively extends the background such that none of the editing icons 435a overlays or obscures the edit document 417 on the workspace 415. In the example arrangement, the buffer region 610 may be thought of as occupying the lowermost region of the workspace 415 and the edit document 417 occupies the area above the buffer region 610.

In the example arrangement, the buffer region 610 is activated by a vertical window slider 439 (FIG. 4A) responsive to a pointing device (i.e. mouse) for scrolling the workspace across the rendering area 419, in which the buffer region 610 is disposed at a lower edge of the workspace 415 and is drawn into the rendering area at an extreme range of the window slider 439. The editing icons 435a initially reside in a dock 450 in the docking region 430, such that the dock 450 groups the editing icons in the buffer region 610 when the rendering area extends beyond the edit document. The rendering area 419 is therefore adapted to display at least a portion of the editing icons 435a representing the editing modules 435. The editing icons 435 have a retracted rendering (435') and a full rendering, such that the retracted rendering 435' is contained within the buffer zone 610 providing that the workspace 415 is unimpeded.

As best seen in FIGS. 5A-5C, the dock 450 includes a retraction slot 452 for retracting at least a portion of the editing icons 435, such that the retracted portion is not visible in the rendering area and an area occupied by the editing icons 435 is thus available for rendering the edit document 417. The dock 450 appears visually as a slot 452 in a box into which the editing icons retract, and has the colloquial appearance of a "slice" in a "toaster." The editing icons 435a are responsive to the dock 450 for rendering in a sequential order, typically a horizontal row. The sequential order defines a visibility space 453 between each editing icon 435 such that the workspace 415 is visible in the visibility space 453. The visibility space 435 is therefore defined by the separation between the editing icons 435 so that even when not retracted, the workspace content is visible in a somewhat interrupted manner "behind" the icons 435.

The entire editing area defined by the workspace 415 is therefore responsive to window slide controls 439, in which the window slide controls 439 are for scrolling portions of the edit document 417 outside the rendering area 419, in which the buffer region 610 is rendered at an extreme range of the window slide controls. In the example shown, the buffer region appears when the slider pulls the lowermost portion of the workspace 415 in to the rendering area 419, the edit document 417 being responsive to the rendering device 110 for visual perception by a user. Alternate arrangements of the dock 450, buffer region 610 and window slider controls 439 may be envisioned, such as at the sides or top of the screen, as suited to the preferences at hand.

Expandable Workspace

Figure 7A:
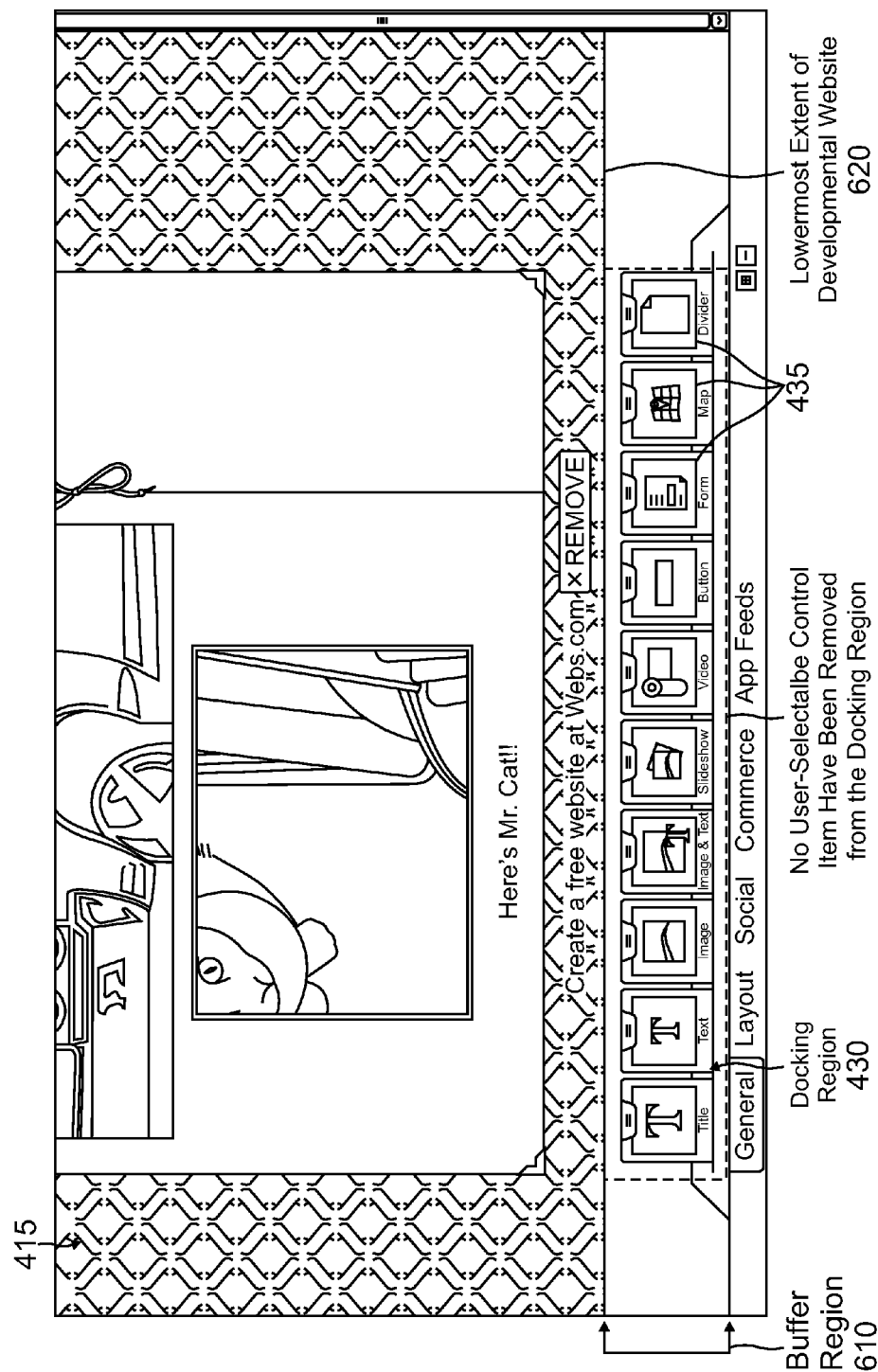
FIG. 7, consisting of FIGS. 7A-7B, illustrates further aspects of an expandable workspace for a developmental website.
Figure 7B:
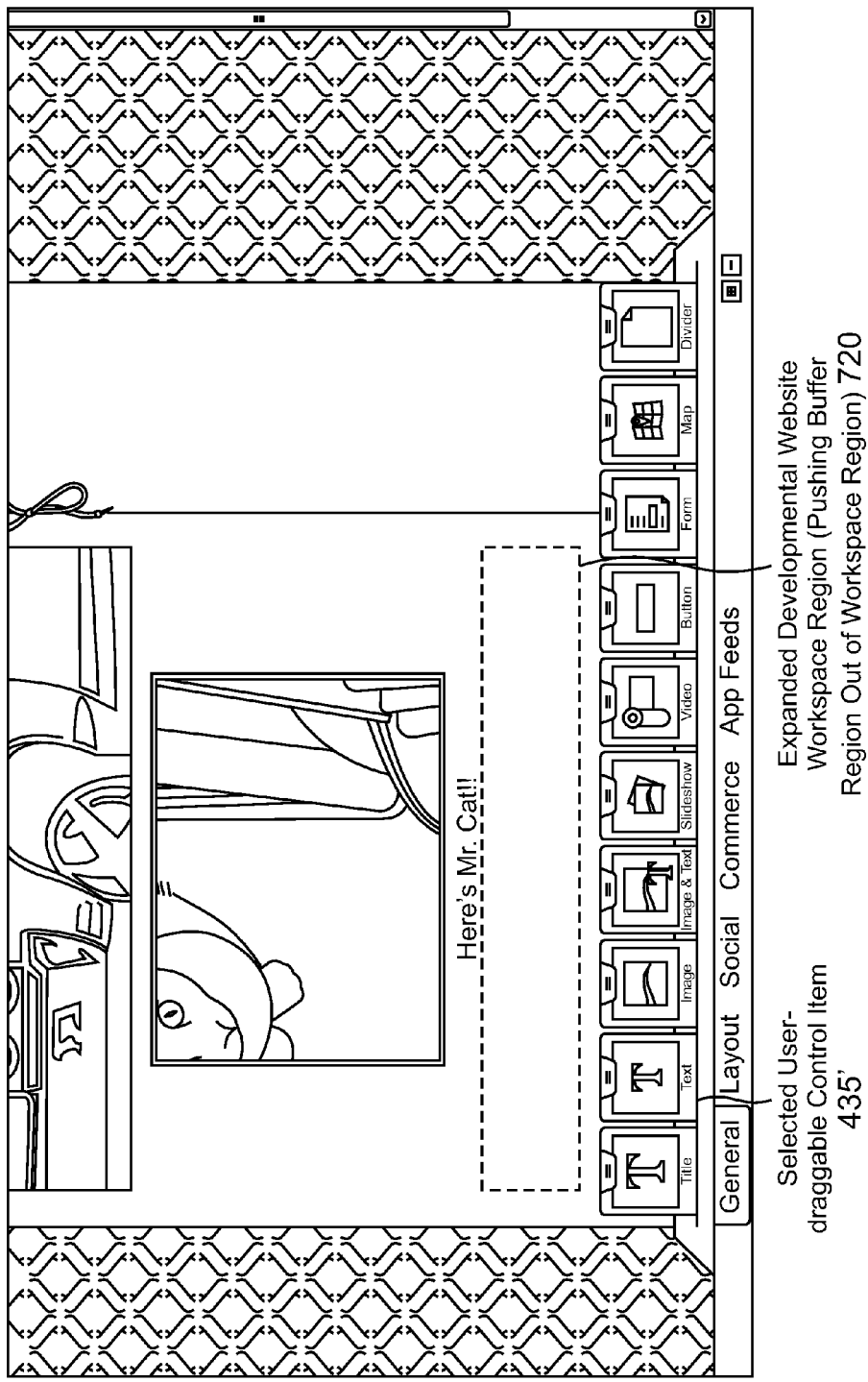

FIG. 7 illustrates the foregoing aspects of the disclosed system in further detail. FIG. 7, which consists of FIGS. 7A-7B, are screenshots of a developmental website workspace region 415 displaying the lowermost extent of a developmental website 400 and an accompanying buffer region 610. As shown in FIG. 7A, a docking region 430 comprising a plurality of user-selectable control items 435 is displayed in the buffer region 610, and no control items have been selected by the user. According to one aspect, once a user selects a control item, such as is shown at 435' in FIG. 7B, the developmental website workspace region 415 expands to provide the user with additional easily accessible workspace for inserting the functionality of the selected control item 435.

As FIG. 7B further illustrates, according to one aspect, when a user selects a control item, the browser's scrollbar representing the vertical height of the developmental website adjusts (expands) to signify the expansion of the developmental website. And as previously described, the website workspace region 415 expands to fill the space to the lowermost portion of the display region 410, revealing an expanded developmental workspace region 720 that replaces the buffer region.

According to one aspect, website construction content items and their corresponding functionalities are inserted into a developmental website upon a user command, such as by clicking on a corresponding control item 435 (FIG. 4, but not specifically shown) and dragging a representation of the control item into the developmental website workspace region 415. The functionality of that control item, for example, insertion of a text box, or image, or video, or content carousel, is thereby inserted at the selected location within the developmental website workspace region 415. Further details of particular types of content items and their functionalities are described elsewhere herein.

Content Container Type-Specific Toolbars

Figure 8A:
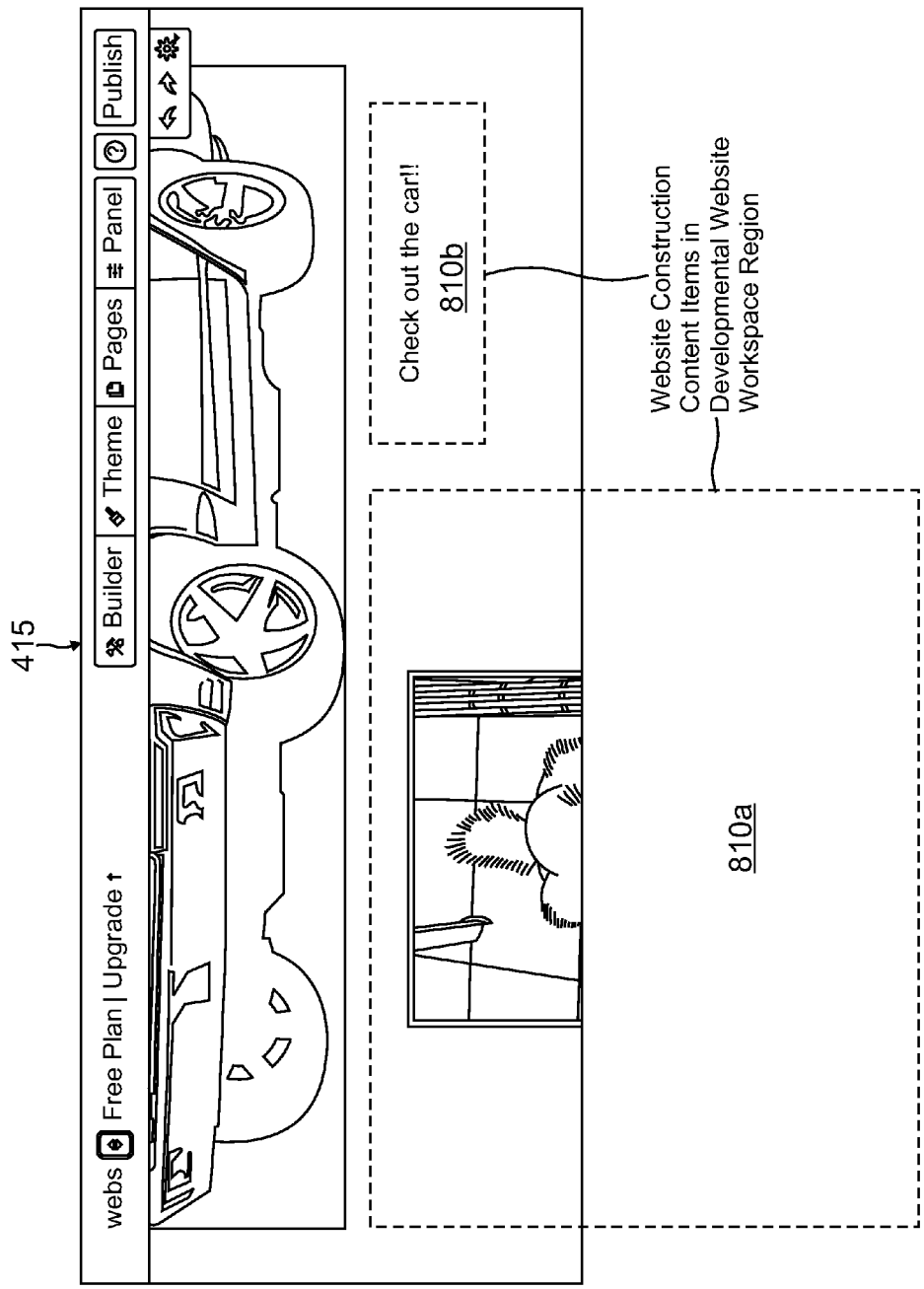
FIG. 8, consisting of FIGS. 8A-8C, illustrates aspects of website content container type-specific toolbars associated with insertion of specific types of content into a developmental website.
Figure 8B:
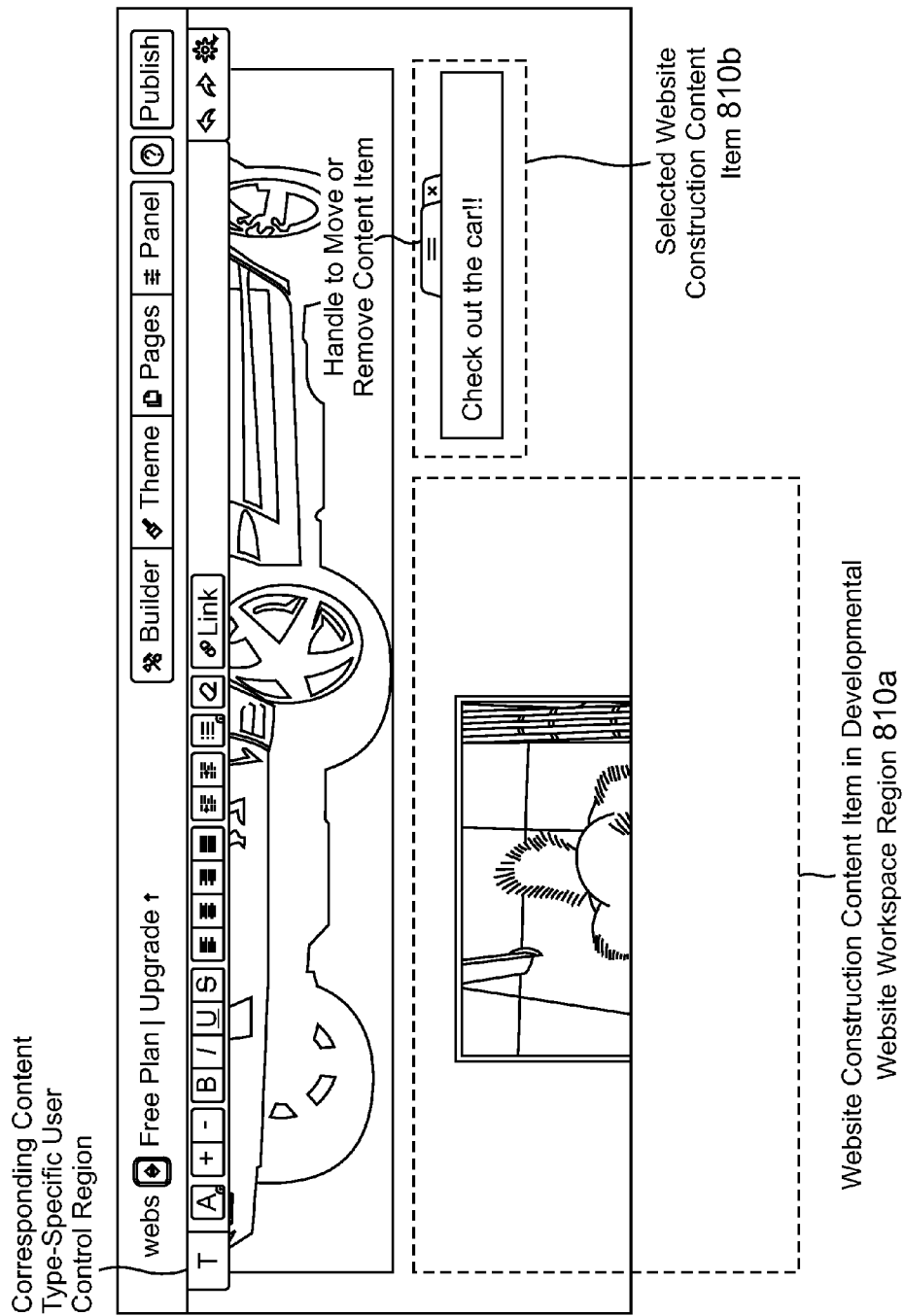
Figure 8C:
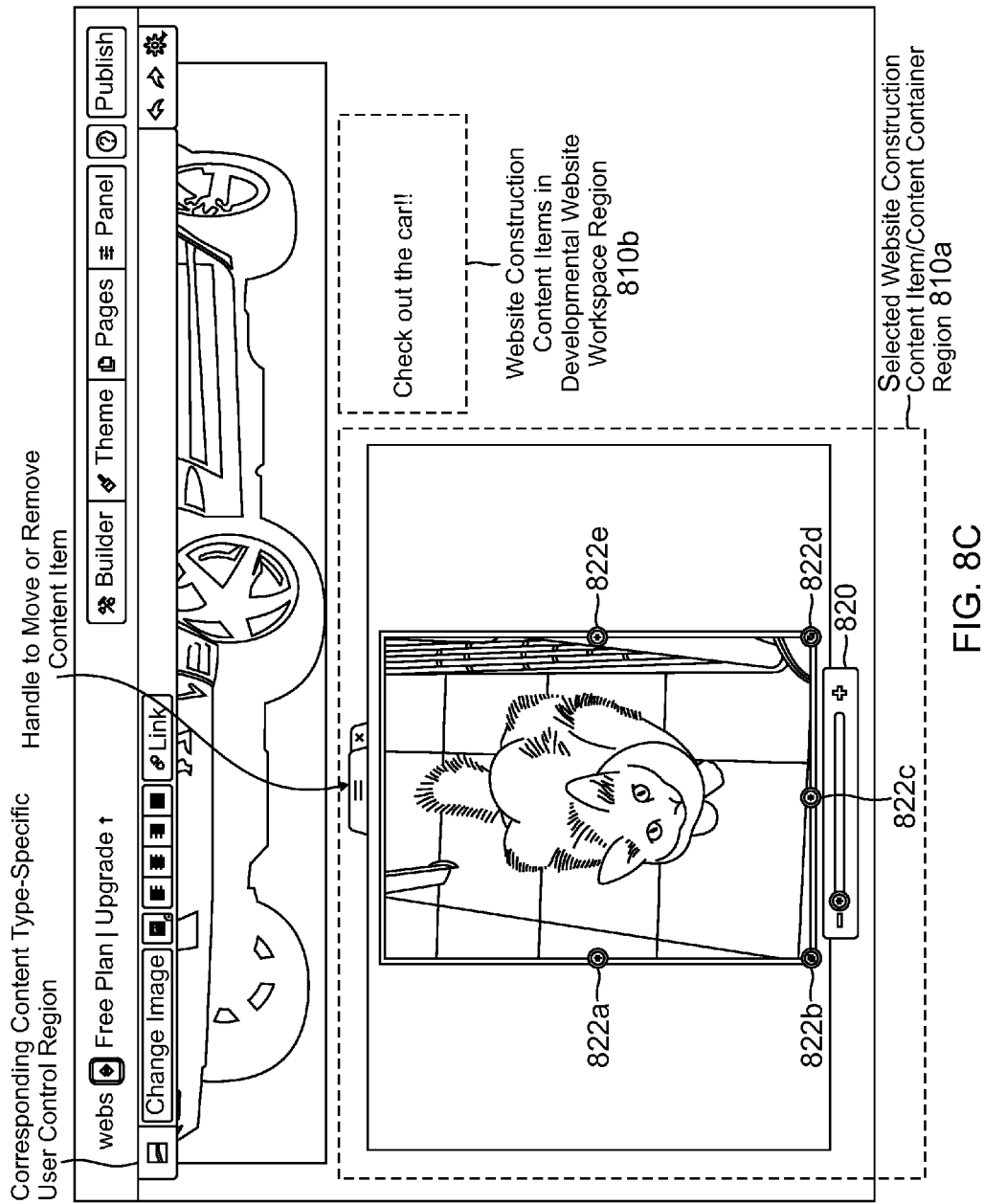

FIG. 8A, consisting of FIGS. 8A-8C, are screenshots illustrating aspects of website content container type-specific toolbars associated with insertion of specific types of content into a developmental website. These figures illustrate an exemplary developmental website workspace region 415 into which a user has placed specific types website construction content items 810a, 810b for inserting website content into the developmental website. For example, as is shown in FIG. 8A, the user has placed both an image content item 810a and a text content item 810b into the workspace region 415 for adding images and text to the developmental website, respectively.

According to one aspect, as shown in FIG. 8A, website construction content items 810a, 810 and their corresponding functionality are inserted into a developmental website upon a user command, such as by clicking on a corresponding image or text control item 435 (FIG. 4, but not specifically shown) and dragging a representation of the control item into the developmental website workspace region 415.

According to one aspect, the website construction content items 810a, 810b are also considered, more generally, to be content containers. The boundaries of such items are initially predetermined by the system to fit within the available space. The corresponding content of such containers or items may be resized or otherwise manipulated to fit within a predetermined maximum boundary, as in accordance with other aspects of the disclosure.

According to another aspect, once a user 301 inserts a particular content item for editing, a corresponding content type-specific user control region and/or associated content controls are displayed in the display region 415 that provides the user with content-type specific tools for manipulating the particular selected content item, such content items including text, titles, images, or similar items that will occur to one of ordinary skill in the art.

As one example, as shown in FIG. 8B, a user has selected a text-specific content item 810b for editing. A corresponding text-specific user control is displayed in the display region, thus providing the user access to text editing options. As shown in FIG. 8B, the text-specific content control comprises a text insertion box with blinking cursor to indicate that text may be selected, typed, or deleted. Other types of text-specific controls that may be displayed (but are not so displayed in FIG. 8B) include such text controls as format controls (such as bold, underline, italicize, etc.), font selection, font size selection, and other similar text-specific editing options as will be understood by one of skilled in the art.

As another example, as shown in FIG. 8C, a user has selected an image-specific content item 810a for editing, and a corresponding image-specific user control region is displayed in the display region. In this example, the image-specific controls include a zoom slider 820 and image resizing handles 822a-822e. The image-specific user controls allows the user to access image editing options as will be understood by those skilled in the art.

Image Manipulation

Figure 9A:
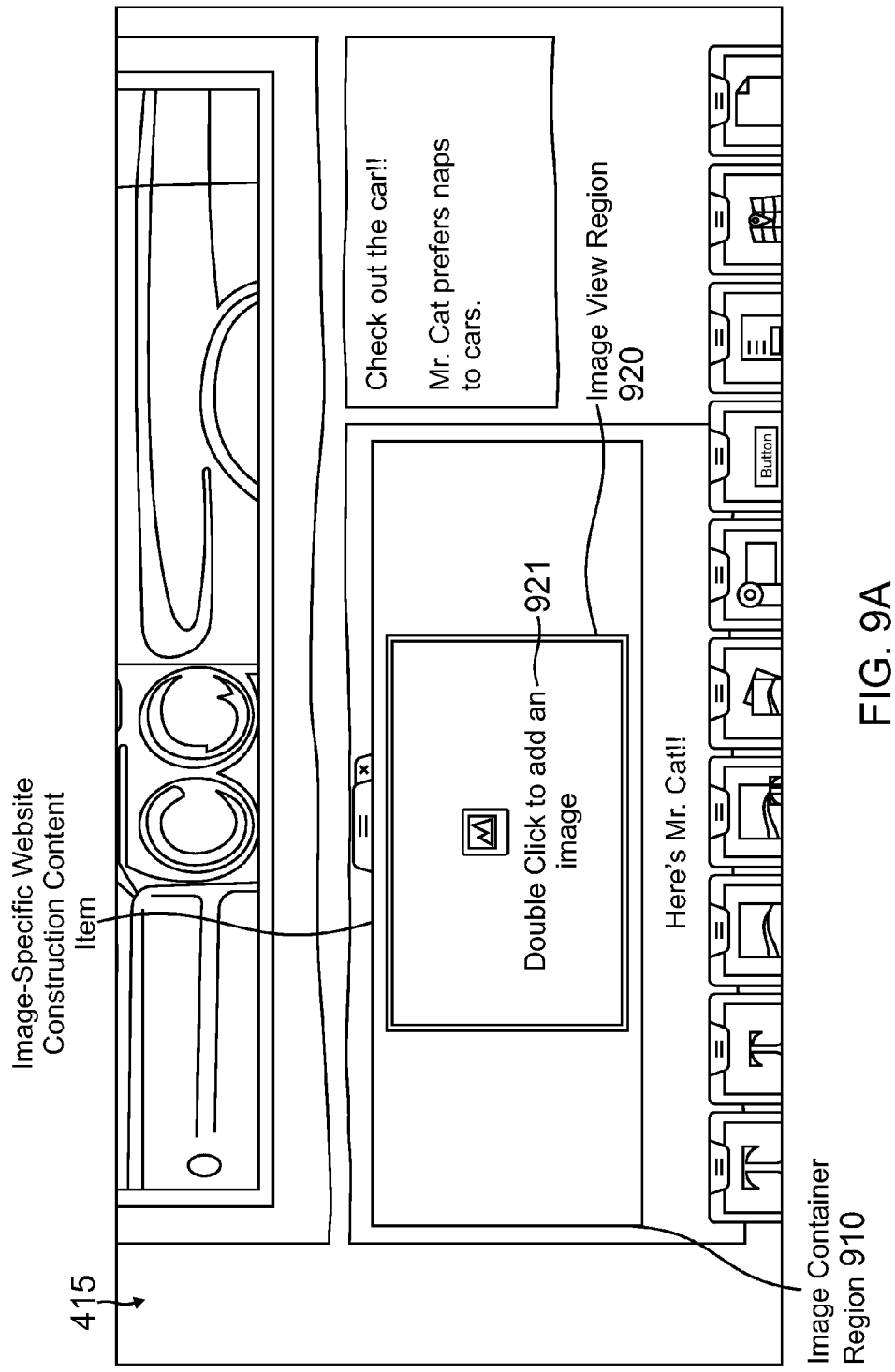
FIG. 9, consisting of FIGS. 9A-9G, illustrates aspects of image manipulation in a developmental website.

FIG. 9A, consisting of FIG. 9A-9G, illustrates aspects of image manipulation in a website construction system constructed in accordance with the present disclosure. FIG. 9 provides exemplary screenshots of a developmental website workspace region 415 in which a user has selected an image-specific content item 810a (see FIG. 8C) in order to add an image to the developmental website 400. According to one aspect, an image-specific content item generally comprises an image container region 910 of predetermined initial height and width for confining an image to particular predefined spatial regions of the developmental website 400. Although the following discussion is specifically directed to an image container, it will be understood that certain principles of operation are applicable to other types of content containers for constructing a developmental website. The image container region 910 in FIG. 9A corresponds to a content container or item 810 in FIG. 8.

According to one aspect, as shown in FIG. 9A, an image container region 910 is inserted into a developmental website upon a user command, such as by clicking on a corresponding carousel control item 435 (FIG. 4, but not specifically shown) and dragging a representation of the image container control item into the developmental website workspace region 415. An image container region 910 typically comprises an image view 920 of predetermined height and width less than the image container region, such image container region typically providing a region where users display and modify images selected for inclusion in the developmental website. The image view 920 comprises a view of a selected image, having a dimension reduced by the system to fit within the image container region 910.

Figure 9B:
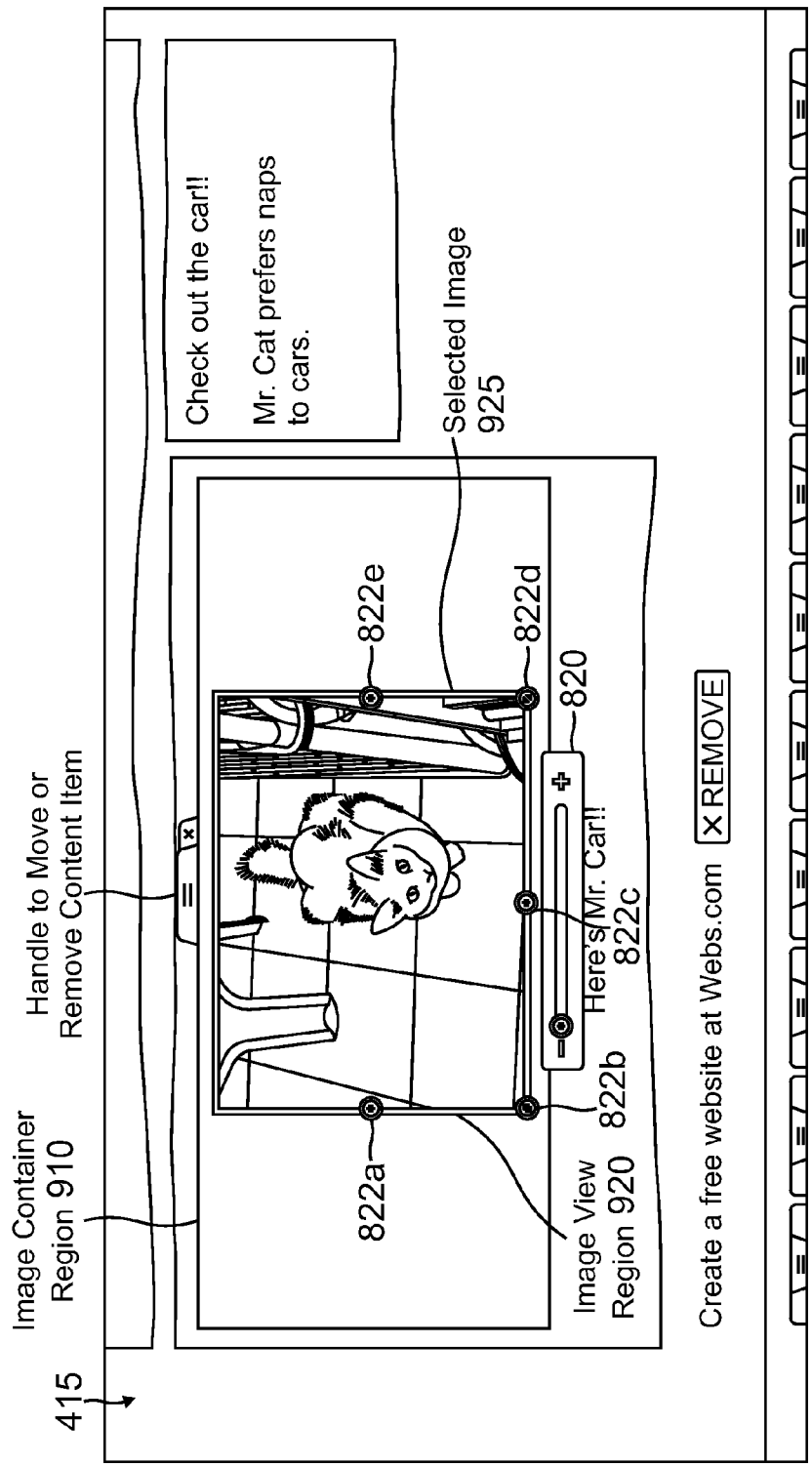

According to one aspect, in response to user selection and insertion of a particular image into an image container region 910, such image is displayed within the image view region 920 having a predetermined resolution and dimensions less than those of the image view region 910. For example, as shown in FIG. 9B, the user has selected an image 925 of a cat to include in the developmental website, such image displayed in the image view region.

Figure 9C:
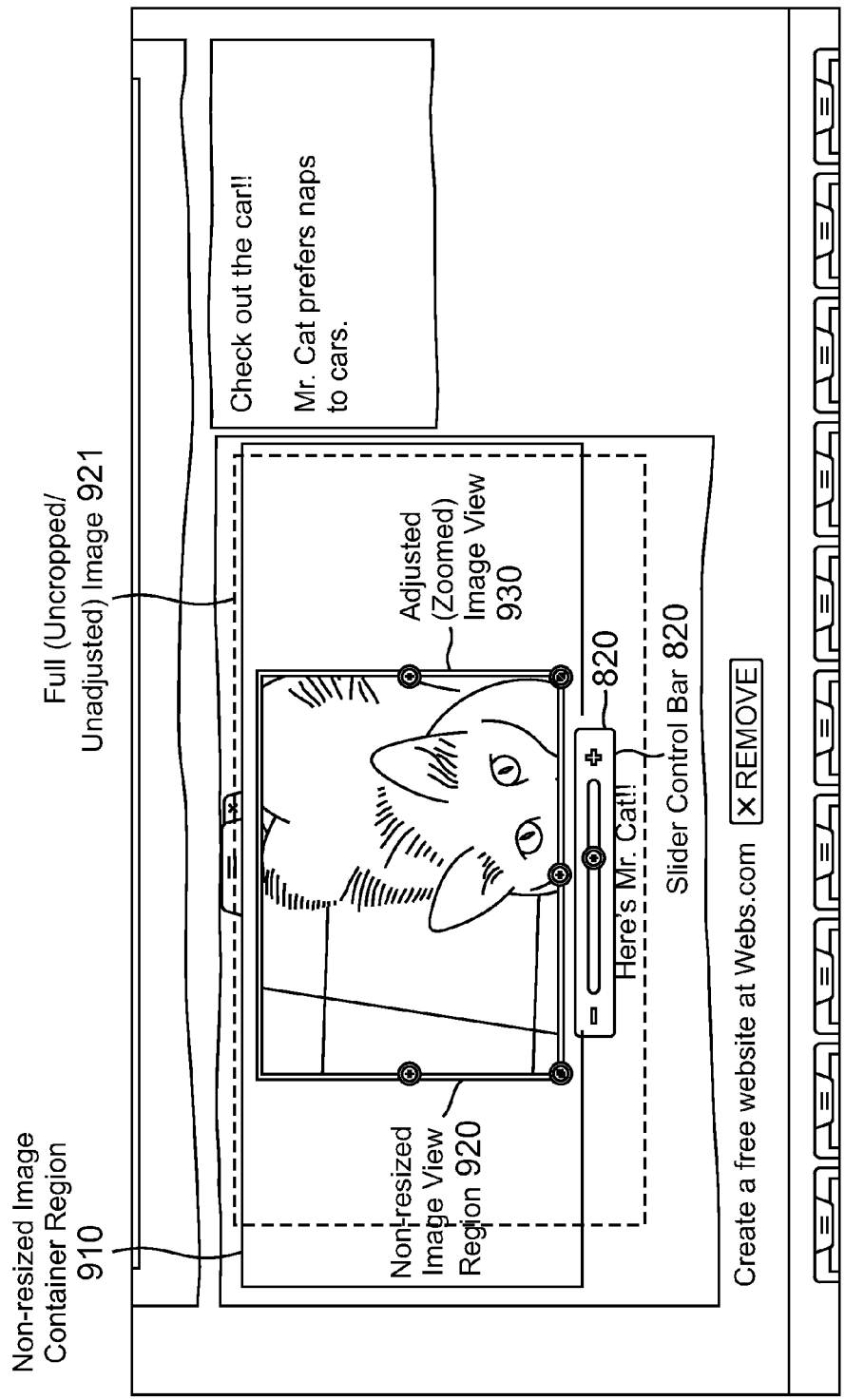

According to another aspect, in further response to user selection and insertion of a particular image into an image container region 910, certain type-specific user controls (i.e. specific to images in the present example) are displayed in the developmental workspace for image manipulation. As shown in FIG. 9C, a slider control bar 820 is displayed proximate to the image container 910 for zooming the image within the image container region. In FIG. 9C, the user has manipulated the slider control bar 820 resulting in a zoomed representation 930 of the cat image 925 previously displayed in FIG. 9B; however, the manipulation of the cat image has not affected the underlying size of the image container region 910 or the image view region 920. Rather, the cat image 930 is zoomed but still confined within the image view region 920. As will be described next, the image view region 920 is independently adjustable.

Figure 9D:
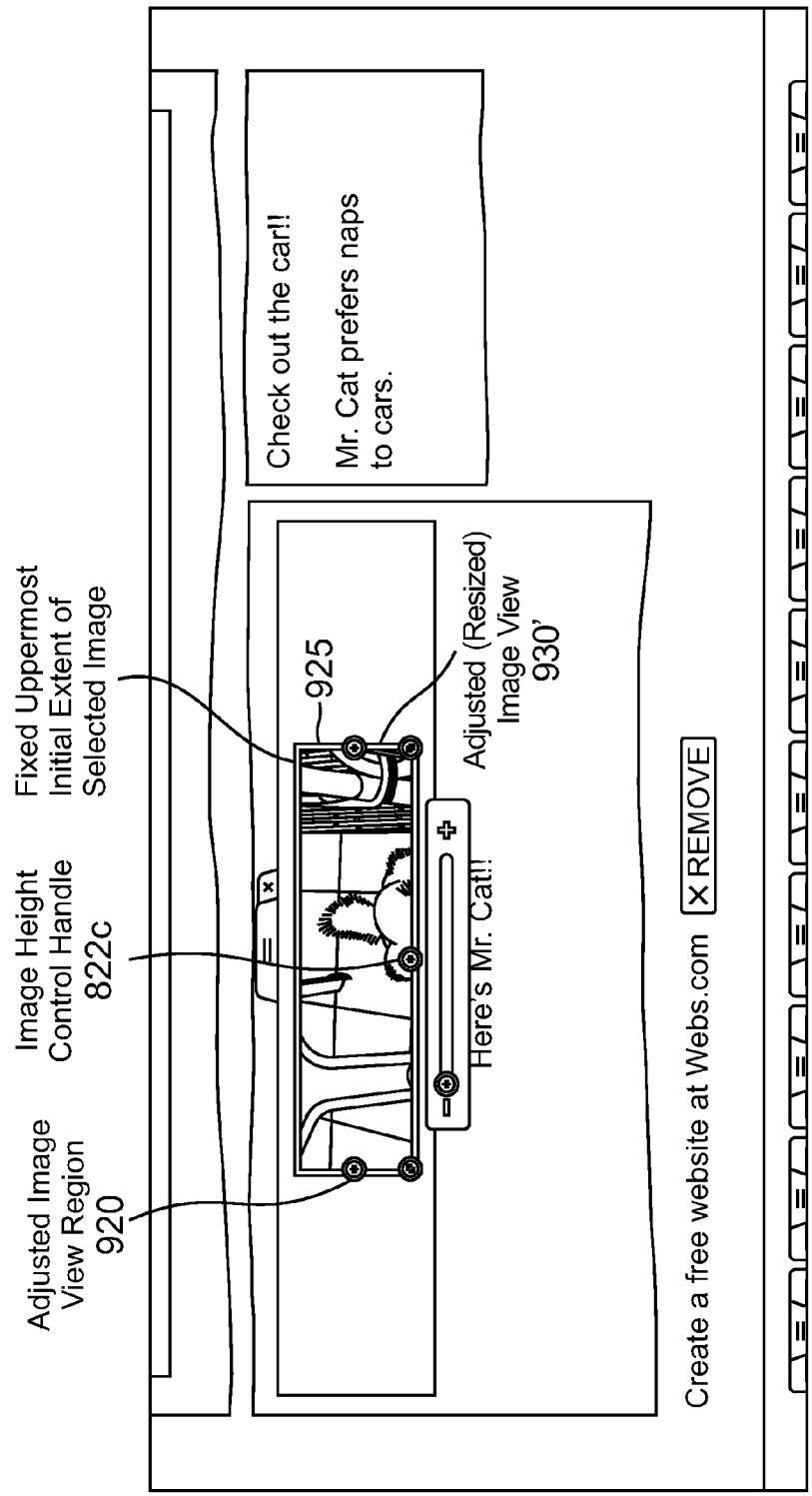

According to another aspect, in further response to user selection and insertion of a particular image into an image container region 910, an image height control handle 822c is displayed proximate to the bottom of the selected image 925, as is shown in FIG. 9D. As will be understood, an image height control handle 822c allows a user to adjust the height of the image view region 920 and the selected image relative to the fixed uppermost initial extent of the selected image. For example, FIG. 9D shows an adjusted image view 930' of the cat image 925 initially displayed in FIG. 9B. In this figure, the user has manipulated the image height control handle 822c to adjust the height of the original cat image such that the adjusted image view 930' of FIG. 9D only displays the cat's hind legs and tail. The image view region is correspondingly resized from 930 as in FIG. 9C to that of 930' as in FIG. 9D subsequent to the user's manipulation of the image height control handle. As will be understood, user manipulation of an image height control handle can result in a multitude of adjusted image views relative to the fixed uppermost initial extent of the selected image.

Figure 9E:
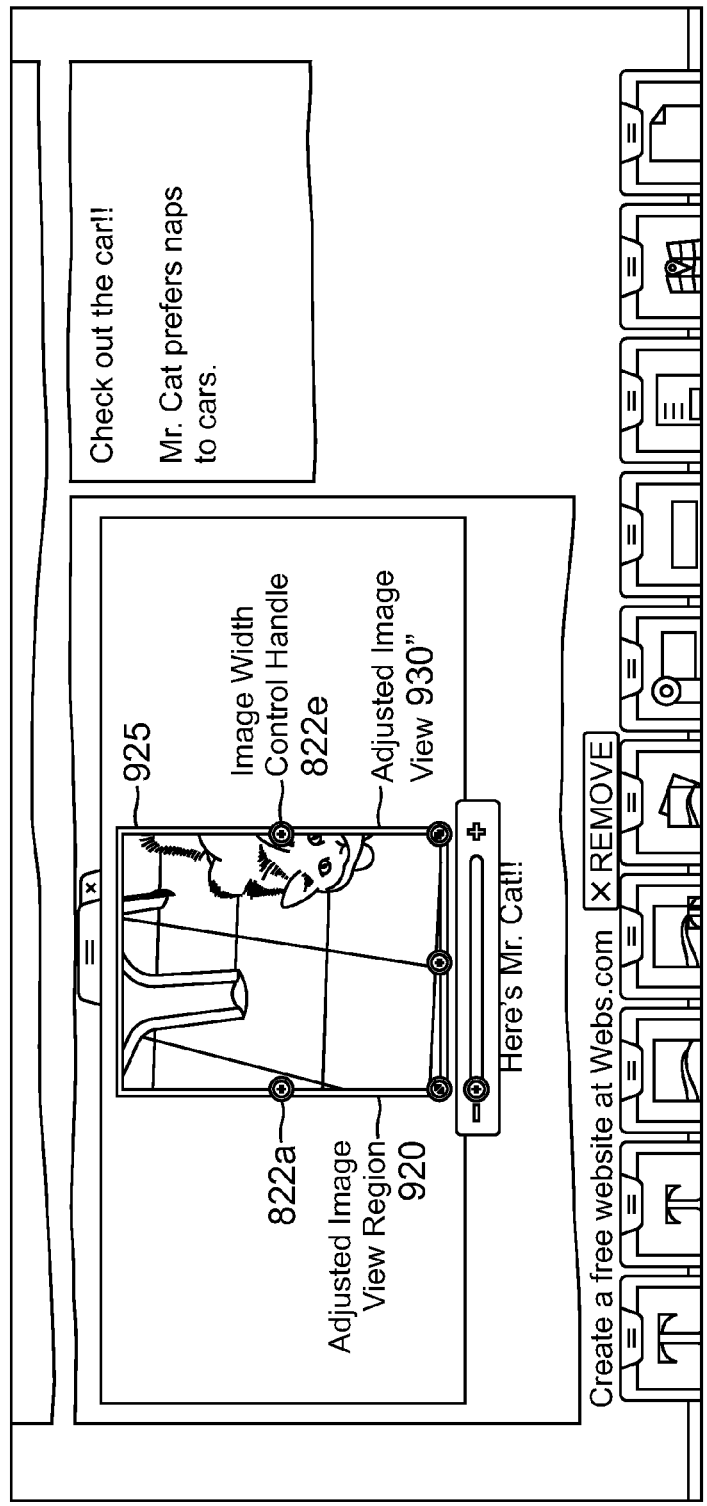

According to another aspect, in further response to user selection and insertion of a particular image into an image container region 910, image width control handles 822a, 822e are displayed proximate to the sides of the selected image 925 as shown in FIG. 9E. An image width control handle allows a user to adjust the width of the image view region 920 and the selected image view 930 relative to a side (or height) of the image. For example, in FIG. 9E, the user has manipulated an image width control handle 822e to adjust the width of the original cat image 925 such that only half of the cat appears in the adjusted view image 930". The image view region is correspondingly resized from 930 as in FIG. 9C to that of 930" as in FIG. 9E subsequent to the user's manipulation of the image width control handle. The width of the image view region in FIG. 9E has likewise been resized to correspond to the user's manipulation of an image width control handle. User manipulation of an image width control handle can result in a multitude of adjusted image views 930" relative to a side of the image within the boundaries of the image container region 910.

In this manner, the method of editing a digital video image as described herein includes identifying a rendered digital image 925 having aspects, such that the aspects define translation of a raw image 921 from a content source (typically an image on disk) to a rendered image 925. Aspects include a height and width, as well as overall size and zoom/pan over a portion of the original raw image imported from the content source. A user or website designer invokes an edit function (such as 822a-e) for modifying at least one of the aspects, such that the edit function simultaneously performs a corresponding modification to aspects responsive to other edit functions based on corresponding or dependent aspects to maintain proportions of the original raw image 921. Thus, the edit functions result in rendering the modified digital image such that the corresponding aspects maintain an aspect ratio of the rendered digital image 925.

The edit functions performed by edit handles 822a-822e (822 generally) modify aspects of the image 925 such that each edit function (handle) 822 affects aspects for which a subset of the aspects are affected by one of the other edit functions 822. In other words, invoking an edit function 822 to change certain aspects triggers changes of other corresponding aspects if the image 925 is to remain visually consistent. For example, changing the width also triggers a corresponding change in the height if the image 925 is to remain proportional and not appear distorted. Such simultaneous modification of corresponding aspects avoids disproportionate pixelation resulting from a horizontal appearance being scaled differently then a vertical appearance.

Figure 9F:
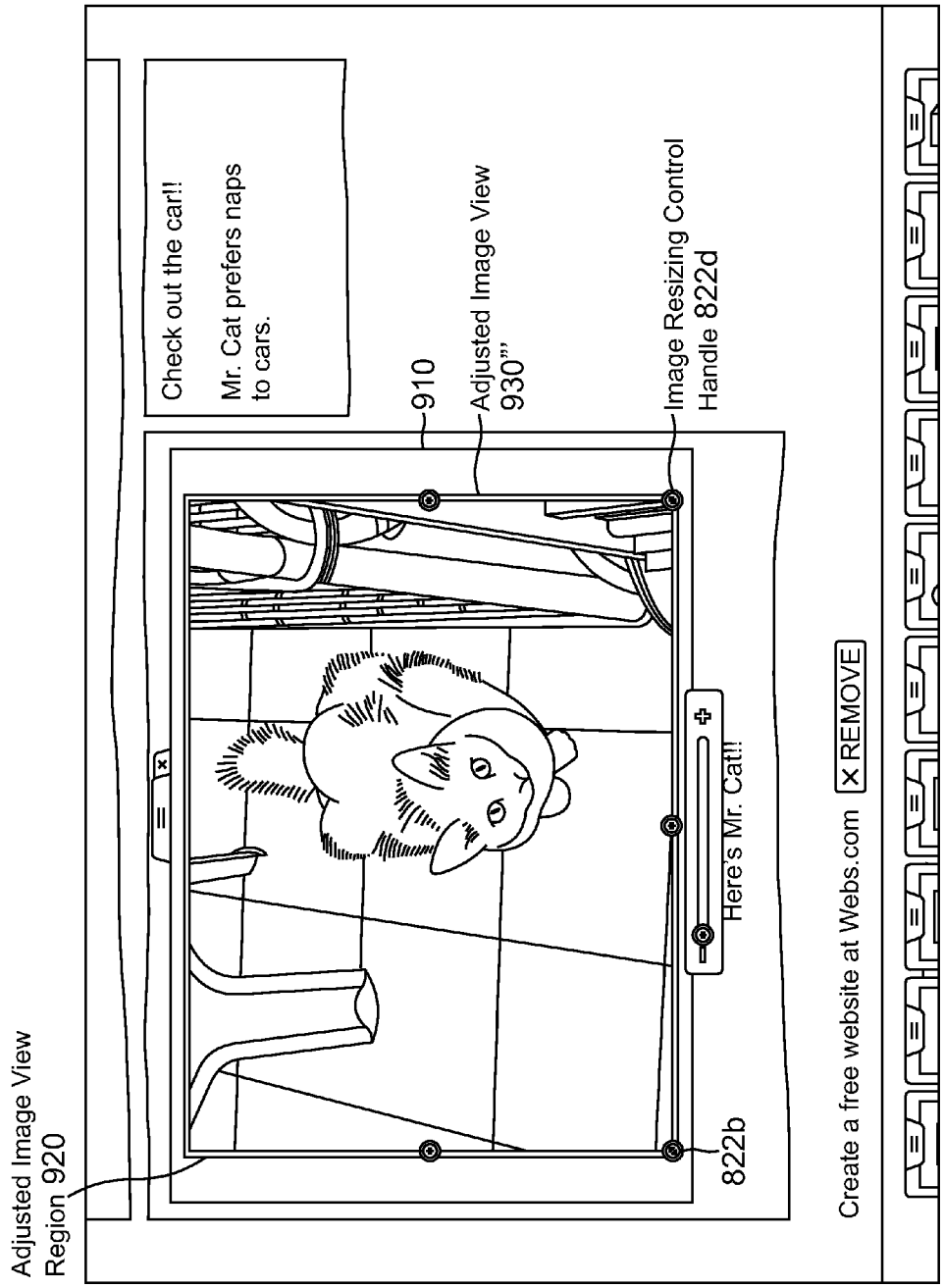
Figure 9G:
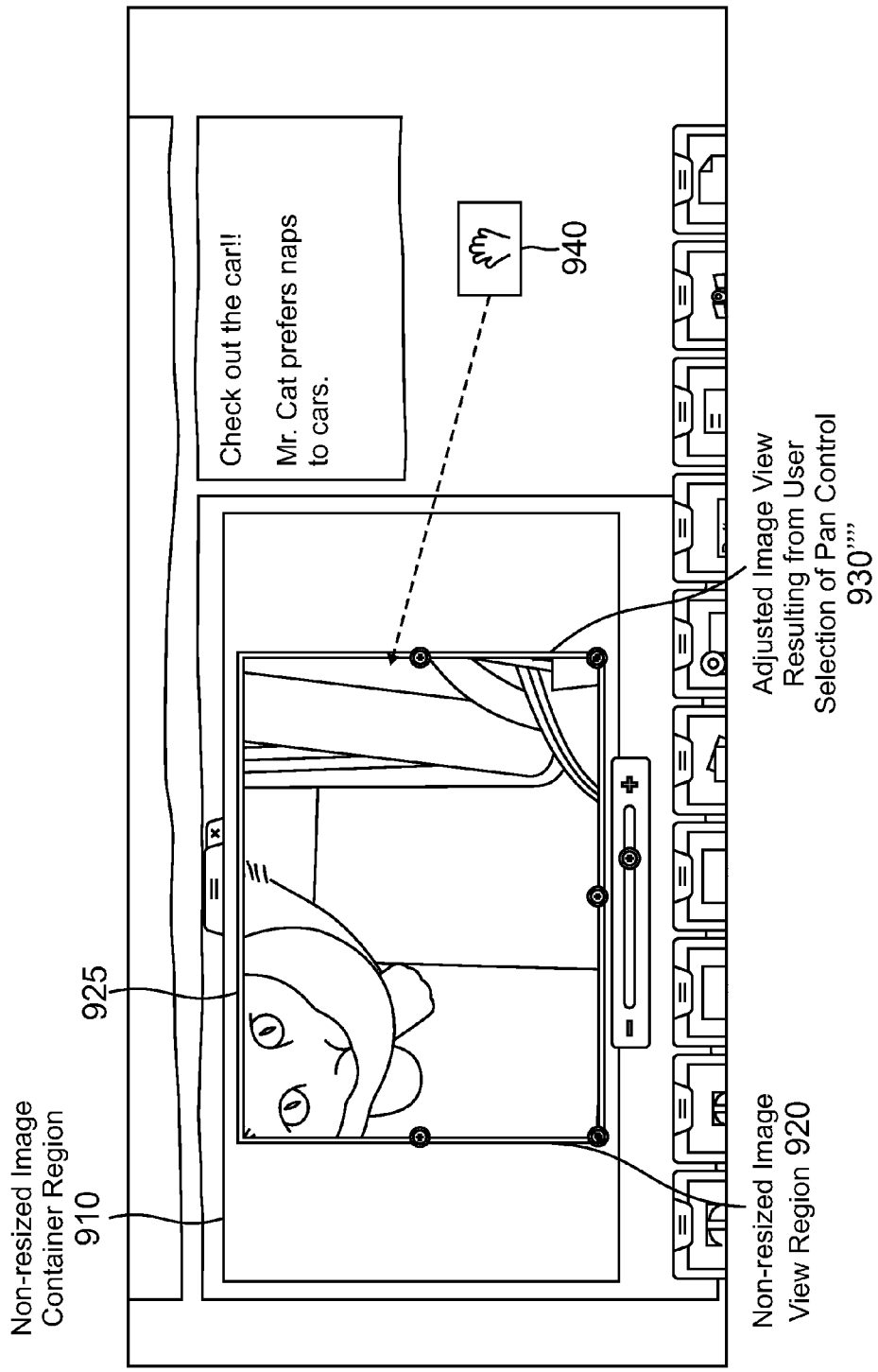

According to another aspect, in further response to user selection and insertion of a particular image into an image container region, image resizing control handles 822b, 822d are displayed proximate to the bottom corners of the selected image 925 as shown in FIG. 9F. The image resizing control handle allows a user to simultaneously adjust the height and width of the image view region 920 and the selected image within the boundaries of the image container region 910. As shown in FIG. 9F, the user has manipulated an image resizing control handle 822b such that the height and width of the cat image 925 are both increased relative to the cat image as displayed in FIG. 9B. The height of the image container region as well as the height and width of the image view region have likewise been increased subsequent to the user command. The image view region is correspondingly resized from 930 as in FIG. 9C to that of 930''' as in FIG. 9E subsequent to the user's manipulation of the image resizing control handle. As will be understood, user manipulation of an image resizing control handle can result in a multitude of adjusted image views 930''' within the boundaries of the image container region 910.

According to an additional aspect, and in further response to user selection and insertion of a particular image into an image container region 910, the disclosed system provides a user with the ability to pan (move around without resizing) a selected image within the image view region 920. A pan control allows a user to reposition a zoomed or other image view of a selected image 925 within the image view region 920, to obtain an adjusted view such as that shown at 930''''. Often, a pan control assumes the form of a "hand" icon as cursor such as shown at 940, which is selected by a user command (not shown). For example, in FIG. 9G, the user has panned the zoomed image 925 from FIG. 9C such that the adjusted image view 930'''' includes not only the cat's face but a portion of the chair shown in the original image view 930 displayed in FIG. 9B. As will be understood, user manipulation of pan control can result in a multitude of adjusted image views within the boundaries of the image container region 910.

According to the present embodiment and as will be appreciated by one of ordinary skill in the art, the adjusted image views presented in FIGS. 9C-G, each of which result from user manipulation of the plurality of image controls displayed subsequent to user selection and insertion of an image into an image container region, are neither stretched nor distorted relative to the original cat image shown in FIG. 9B.

Upon invoking a plurality of the edit function handles 822, in which each of the edit functions 822 affects at least one aspect, the construction module 122 applies a first edit function 822(a-e) of the plurality of edit functions 822, such that the first edit function modifies at least one of the aspects affected by another second edit function of the plurality of edit functions 822(a-e). Thus, the same aspect may be changed by more than one handle 822 and modification of corresponding aspects of one handle 822, results in indirect modifications of the corresponding aspects, as if the changes had been made by the handle causing direct changes to the corresponding aspects. The construction module 122 thus defines a plurality of the edit functions as handles 822, in which the edit functions 822 are mutually dependent such that a first edit function modifies an aspect that is also modified by a second edit function of the plurality of edit functions.

In the example arrangement, the aspects include scale, horizontal size, vertical size, horizontal rendering area, vertical rendering area, such that the horizontal size affects the horizontal width of the rendered image while maintaining the vertical distance, and the vertical size affects the vertical height of the rendered image while maintaining the horizontal distance. Similarly, the scale handle affects pixelation of the rendered image while maintaining horizontal and vertical distance, the horizontal rendering area defines a horizontal range of a rendered portion of the raw image, and the vertical rendering area defines a vertical range of a rendered portion of the raw image 921 pulled from the content item source.

In the example configuration, the invokable edit functions include resize, crop, pan and zoom the resize control handle 822b, 822d defines the horizontal size and vertical size proportionally such that the aspect ration is maintained and scale is modified. A zoom control 820 affects scale while maintaining horizontal size and vertical size, and a horizontal cropping control 822a, 822e affects the left and right horizontal rendering area, respectively, defining the horizontal portion of the raw image 921 for rendering, and modifies the horizontal size proportionately while maintaining the vertical size and scale aspects. A vertical cropping control 822c affects the vertical rendering area defining the vertical portion of the raw image for rendering, and modifies the vertical size proportionately while maintaining the horizontal size and scale aspects. In the example configuration, the horizontal and vertical rendering area define a frame, or viewing area 920, through which at least a portion of the raw image is visible, as modified by cropping and panning.

Additional features are such that, in response to a user command for insertion of another website content item, automatically resizing the image container region, therefore accommodating additional containers to maintain a visually pleasing appearance. Selection and insertion of the raw image 921 invokes a user control for selecting a particular image from an image repository for insertion into the image container region, typically by a file browse window or other suitable scanning mechanism. Generally, the image manipulation controls are displayed prior to displaying an image for manipulation.

The disclosed functions therefore provide for automatically resizing a displayed content item in a content container of a website in connection with construction of the website by a user 301, by providing a developmental website comprising a developmental website workspace region for construction of the developmental website by the user, and providing a viewable display region for display of a developmental website workspace region.

The user provides an original content 925 item having original characteristics, and in response to a user command to include the original content item in a first content container of the website, the construction management module 122 displays a proportionally sized first representation of the original content item in the display region 910 confined within a predetermined initial display subregion 920 of the first content container, as shown in FIG. 9B. In response to a user command for manipulation of the first representation of the content item, the construction management module displays a modified first representation of the content item in the first content container, and in response to a user command to place the modified first representation of the content to a second content container of the website, displays a proportionally sized second representation of the original content items confined with a predetermined initial display subregion of the second content container, while reflecting the modifications from the user command for manipulation of the first representation, This approach provides that the display of the first representation and the second representation of the content items are relative to the original content item and no adjustments resulting from user manipulations affect the original content item, thus maintaining a visually pleasing and undistorted view of the rendered image 920 absent pixelation, stretching, or other distortion that often accompanies on-screen editing.

In the example arrangement, a predetermined size defines width and height of the independent content containers to set a reasonable default. Also, a theme may be provided comprising an initial layout that includes a plurality of content containers in a predetermined spatial arrangement relative to each other, each of the content containers being of a predetermined initial size.

Content Carousel

Figure 10A:
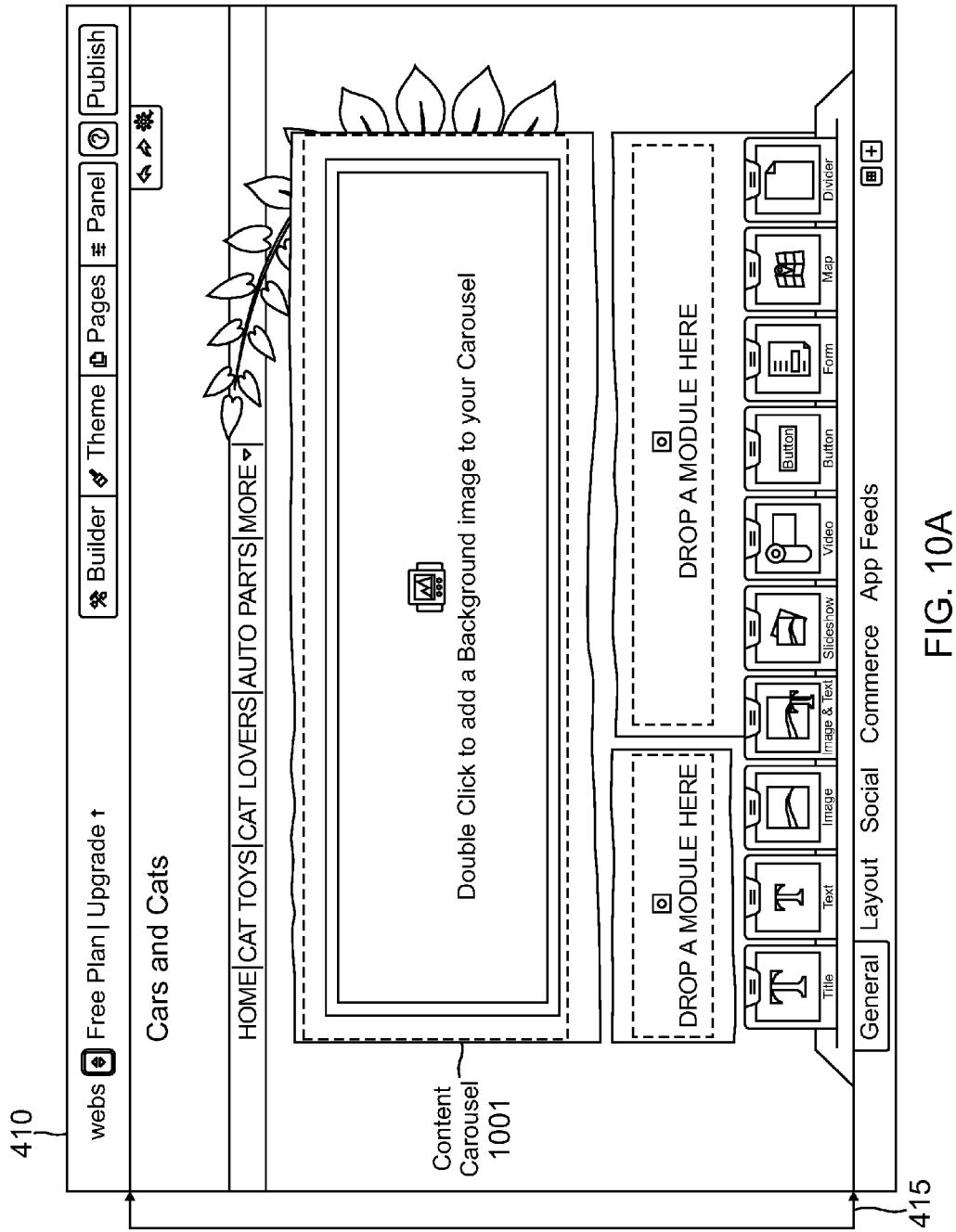
FIG. 10, consisting of FIGS. 10A-10F, illustrates aspects of a content carousel for a developmental website.

FIG. 10A, consisting of FIGS. 10A-10F, illustrates aspects of a content carousel 1001 for a developmental website according to aspects of the present disclosure. FIG. 10 provides exemplary screenshots of a developmental website workspace region 415 in which a user has selected a content carousel 1001 for inclusion in a developmental website. A content carousel is a type of content container for use in constructing a developmental website. A developmental website can include none, one, or plural content carousels. Each carousel container is generally capable of accepting and displaying various website construction content items such as images, video, textual material, etc. The notion of a "carousel" is that the content carousel comprises a plurality of different content items, such as images, and the images are successively displayed by rotating or sliding or revolving into and out of view, in accordance with predetermined image change rules and image transition rules. One notion of a carousel is that of a "slide show" of images, where one image changes into another by sliding, or dissolving, or other image transition rule.

Figure 10B:
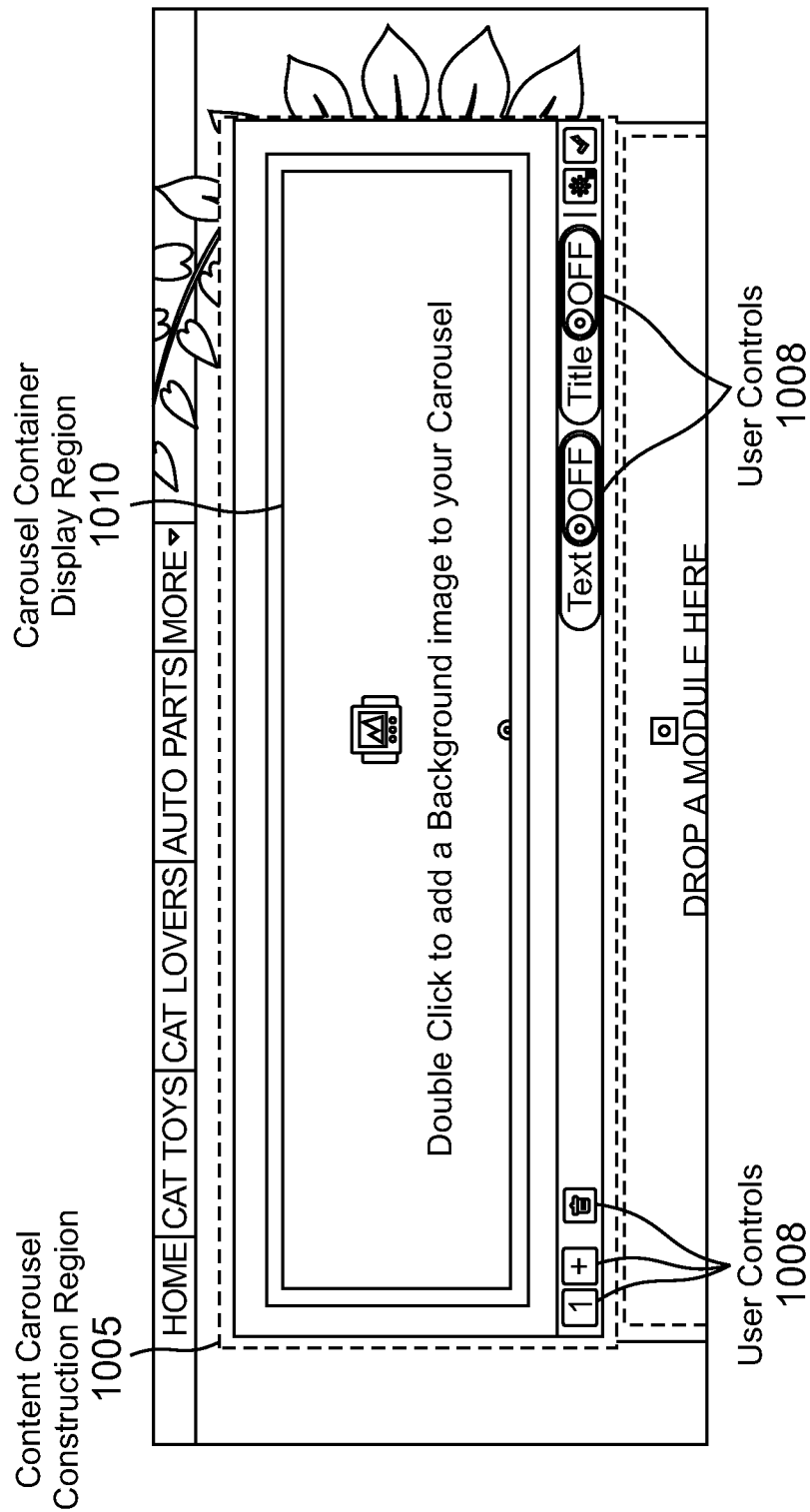

As shown in FIG. 10B, according to one aspect, a content carousel construction region 1005 and its functionality is inserted into a developmental website upon a user command, such as by clicking on a corresponding carousel control item 435 (Modules, FIG. 4) and dragging a representation of the control item into the developmental website workspace region 415. This causes the system to generate and display a content carousel construction region 1005, which initially has a predetermined initial height and width, but contains no specific content. Additionally, as shown in FIG. 10B, the content carousel construction region 1005 generally comprises user controls 1008 for adding, editing, removing, or otherwise manipulating content items, as well as a carousel container display region 1010 for displaying user-selected content items. The carousel container display region 1010 preferably has a predetermined initial height and width less than the content carousel construction region 1005.

Figure 10C:
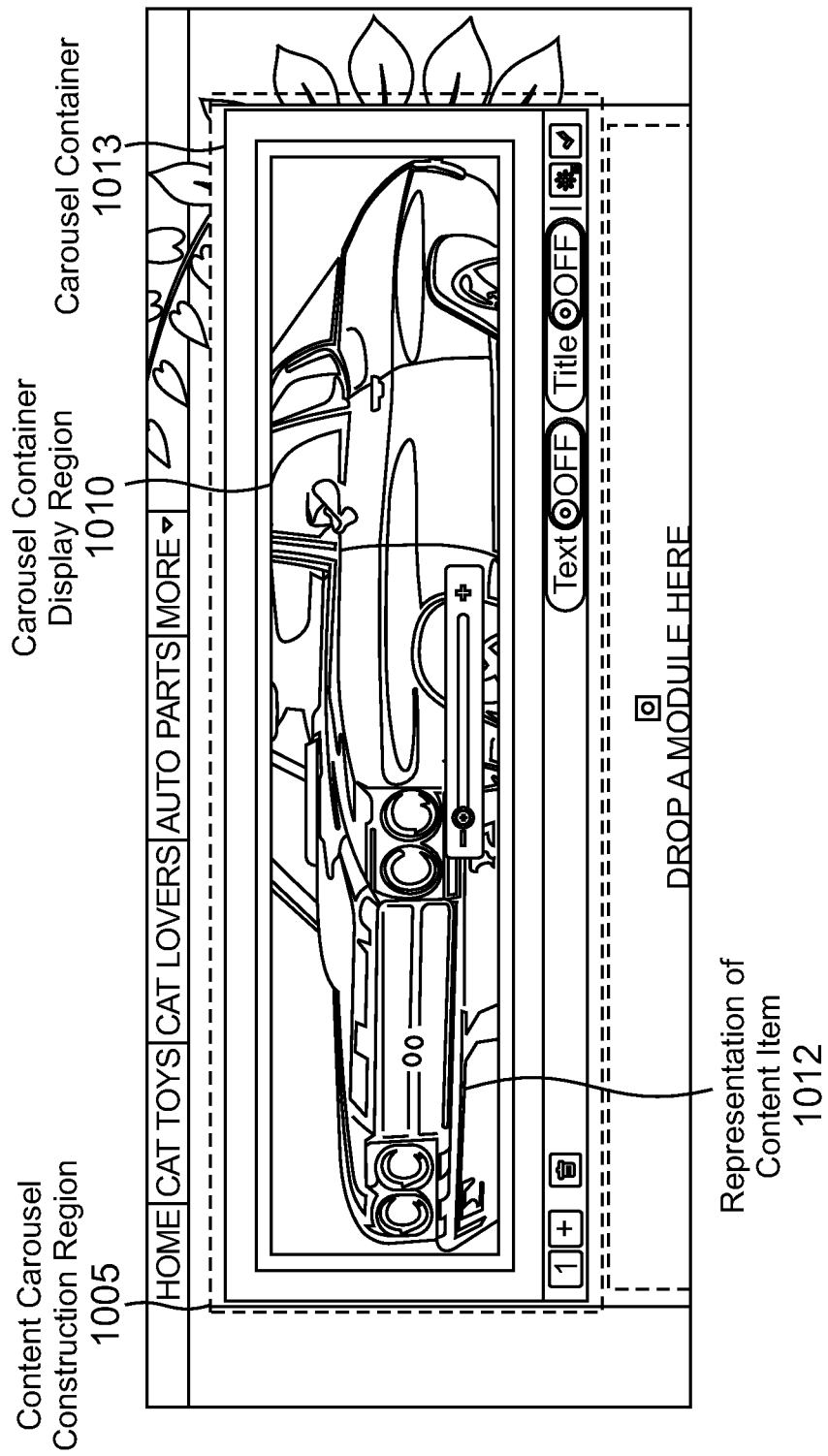

As shown in FIG. 10C, in response to a user command corresponding to the addition of a specific content item to the carousel container, for example an image, and according to one aspect of the disclosure, a representation of a selected content item 1012 having an initial view and a predetermined resolution and size less than the initial height and width of the carousel container is displayed in the carousel container display region 1010. Such operation comprises the creation of a first content carousel container 1013. As shown in FIG. 10C, a representation of a car image 1012 has been added the carousel via a carousel container 1013, which is correspondingly displayed in the carousel container display region 1010 subsequent to a user's command. The content carousel module 435 is operable to place the content carousel 1001 in the desired position on the webpage 314, similar to the other containers generated via the modules 435. The content carousel 1001 then receives one or more carousel containers 1013 for rendering screen elements 1012 including a representation of a rendered content item. The representation of the car image has a predetermined view and resolution, and its height and width are less than the carousel container as represented by the display region 1010.

Figure 10D:
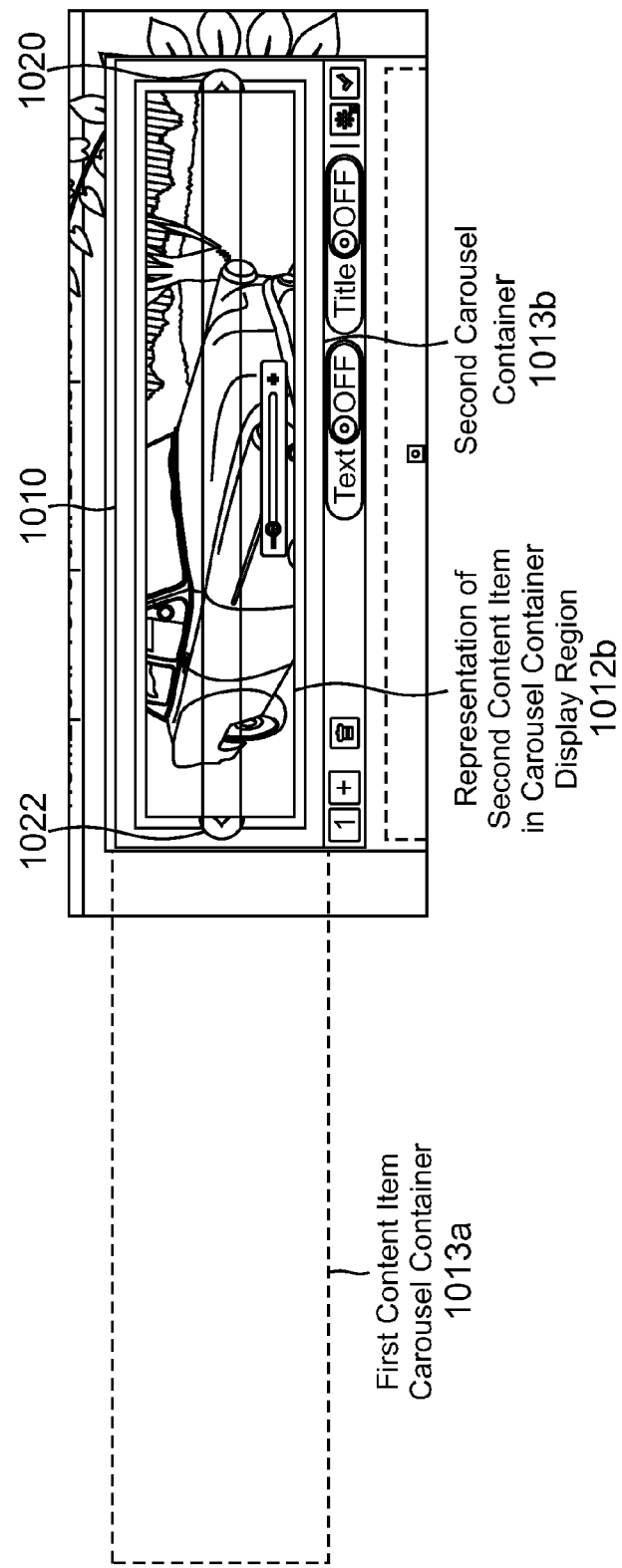

As mentioned above, a carousel container may contain, and often will contain, a plurality of content items that are successively displayed to a website viewer. Thus, a carousel may include a plurality of content carousel containers 1013, as will be described. Each of such content carousels 1001 may contain a plurality of carousel content containers 1013, each of which is adapted to render user items as any of the user controls 435 (modules) for defining static containers. For example, each of the carousel containers 1001 may be an image container adapted to render a screen element including an image content item. FIG. 10D illustrates aspects of the additional of a subsequent content item 1012b to a content carousel via addition of a second content carousel container 1013b, after the carousel already includes a first content item 1012a in a first content carousel container 1013a. In response to a user command corresponding to the addition of a second content item 1012b to the carousel container, and according to one aspect, a representation of a second content item 1012b is displayed in a the carousel container display region 1010, and the representation of the first content item 1012a is taken out of primary view. Such operation comprises the addition of a second content carousel container 1013b.

For example, as shown in FIG. 10D, a second representation of a car image 1012b has been added to the carousel container display region 1010. The representation of the second car likewise has a predetermined view and resolution, and its height and width are less than the carousel container.

Although FIG. 10D shows that a first content item carousel container 1013a is positioned to the left of the newly added, second carousel container 1013b, it will be understood that the first carousel container could be positioned elsewhere such as above or below the newly added second carousel container, or could be hidden completely.

In the website construction tool 120, therefore, a carousel module 435 may generate window based content as a series of rotating or cycling panels, or "carousel", for insertion in the website 304 by receiving, from a plurality of modules 435 corresponding to types of window based screen elements, a selection of a carousel module for defining one or more carousel containers 1013 responsive to a set of screen elements arranged in an iterative rotation, such that each of the screen elements is an image container 450 (or other type of container) responsive to a content source for rendering content items. The disclosed carousel format lends itself well to image containers for rendering photos and/or graphics, however other types of containers 150 may be included in the carousel, and need not be uniform (i.e. container types may be mixed). The construction module 122 populates, based on a received command, each of the screen elements 1012 from the content source (the screen element is the representation of the content item as rendered in the carousel container display region 1010). The carousel enables rendering of each of the screen elements 1012 according to an ordered sequence, such that the ordered sequence displays a portion of each successive and previous screen element responsive to commands for advancing the ordering, typically a forward or backward rotation.

In the example shown, the carousel container 1013 arranges a plurality of image containers in a visually uniform appearance, such that the carousel container 1013 displays the image containers according to a sequence. The sequence renders at least a portion of a current image 1013a container 150 simultaneously with at least a portion of a successive image container 1013b, thus giving the appearance of rotation as portions of the rendered image appear to rotate or pivot out of the rendering area of the content carousel 1001, as if rotated. The content carousel 1001 thus renders the successive image container 1013b in entirety as the current element 1013a advances beyond the visual rendering area 1010. The carousel 1001 then renders the successive image container 1013b as the current image container in anticipation of a subsequent command to advance the carousel 1001.

Carousel 1001 content is added to the website by displaying a user control 1008 for adding a content item to an available screen element 1012 on the carousel 1001, and displaying a window operative for selecting a content source for populating the available screen element 1012. In the example shown, selection of the content source is a drag and drop mechanism between the content source and the available selection 1012, such as a file open menu or similar interface. Once generated, the carousel 1001 renders a current image container 150 and a predetermined number of available image containers 150 renderable in either direction on the carousel, such that the available image containers are renderable via rotation of the carousel. The predetermined number of available image containers 1013 is rendered in a compact form, such that the compact form displays an alternate view having less detail than that of the current image container 1013. The alternate view renders the image container at an angle, providing an appearance of viewing the image container being rotated on an axis into or away from a direct line of sight. Therefore, a number of the carousel containers 1013 are visible on either side of a current (centered) container, and the side containers are rendered at increasing angles to provide a circular arrangement.

The rendered content carousel 1001 is also adapted to receive a command indicative of one of either directions, and to advance the current image container 1013b to the successive image container 1013a in the commanded direction. In the example shown, right and left navigation ears 1020, 1022 (respectively) provide bi-directional advancement. Further carousel operations include receiving a command to modify the height of the current image container, and modifying the height of other images in the carousel to correspond to the height of the current image container for providing a uniform appearance to the carousel images, thus maintaining all carousel containers and images therein in a uniform arrangement.

Figure 10E:
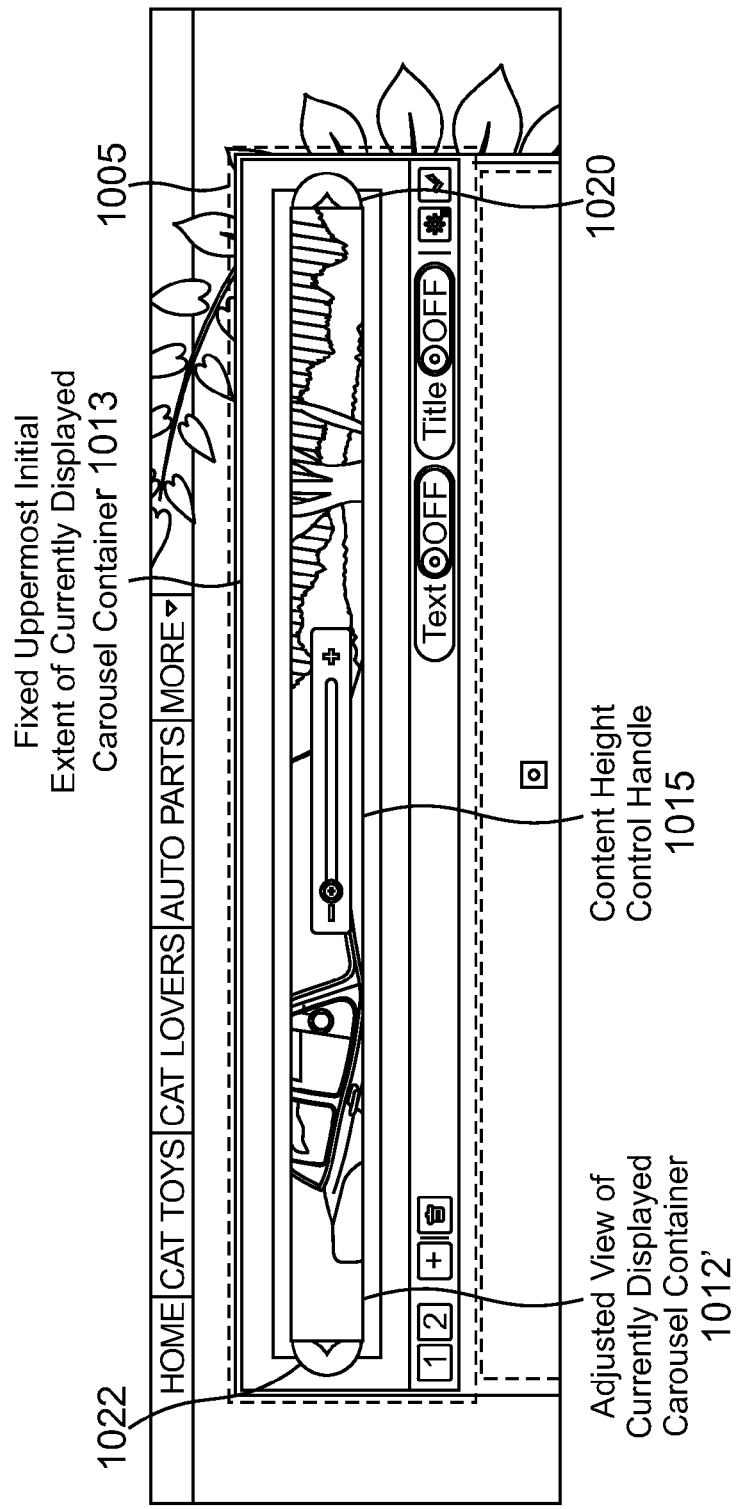

According to another aspect, image manipulation controls specific to the type of content, e.g. an image, are provided for user manipulation of a selected content item as that item is included into a carousel. As shown in FIG. 10E, a content height control handle 1015 is displayed proximate to the bottom of the content carousel display region 1010 subsequent to a user's command to add a content item to a carousel container. As will be understood, a content height control handle allows a user to adjust the height of a carousel container and the associated selected content item relative to the fixed uppermost initial extent of the currently displayed carousel container. For example, FIG. 10E shows an adjusted image view 1012' of the car image 1012 initially displayed in FIG. 10D, where the user has manipulated the content height control handle 1015 to adjust the height of the original car image such that the adjusted image view 1012' only displays the car's side windows and windshield. According to one aspect, the carousel container 1013 itself is also correspondingly resized subsequent to the user's manipulation of the image height control handle. As will be understood by one of ordinary skill in the art, user manipulation of a content height control handle can result in a multitude of adjusted content views relative to the fixed uppermost initial extent of the currently displayed carousel container.

According to another aspect, in response to a user's manipulation of the content height control handle 1015 to adjust the height of a particular container, e.g., the container adjusted in FIG. 10E, the height of other carousel containers 1013 within the same content carousel are dynamically adjusted to correspond to the previously adjusted container to provide a uniform look to all carousel containers throughout the carousel. As shown in FIG. 10F, the height of the initial content item added to the carousel, as previously depicted in FIG. 10C, has been adjusted to correspond to the height of the carousel container as depicted in FIG. 10E, thus providing uniform carousel container height throughout the carousel.

Web Page Links/Navigation Controls

Figure 11A:
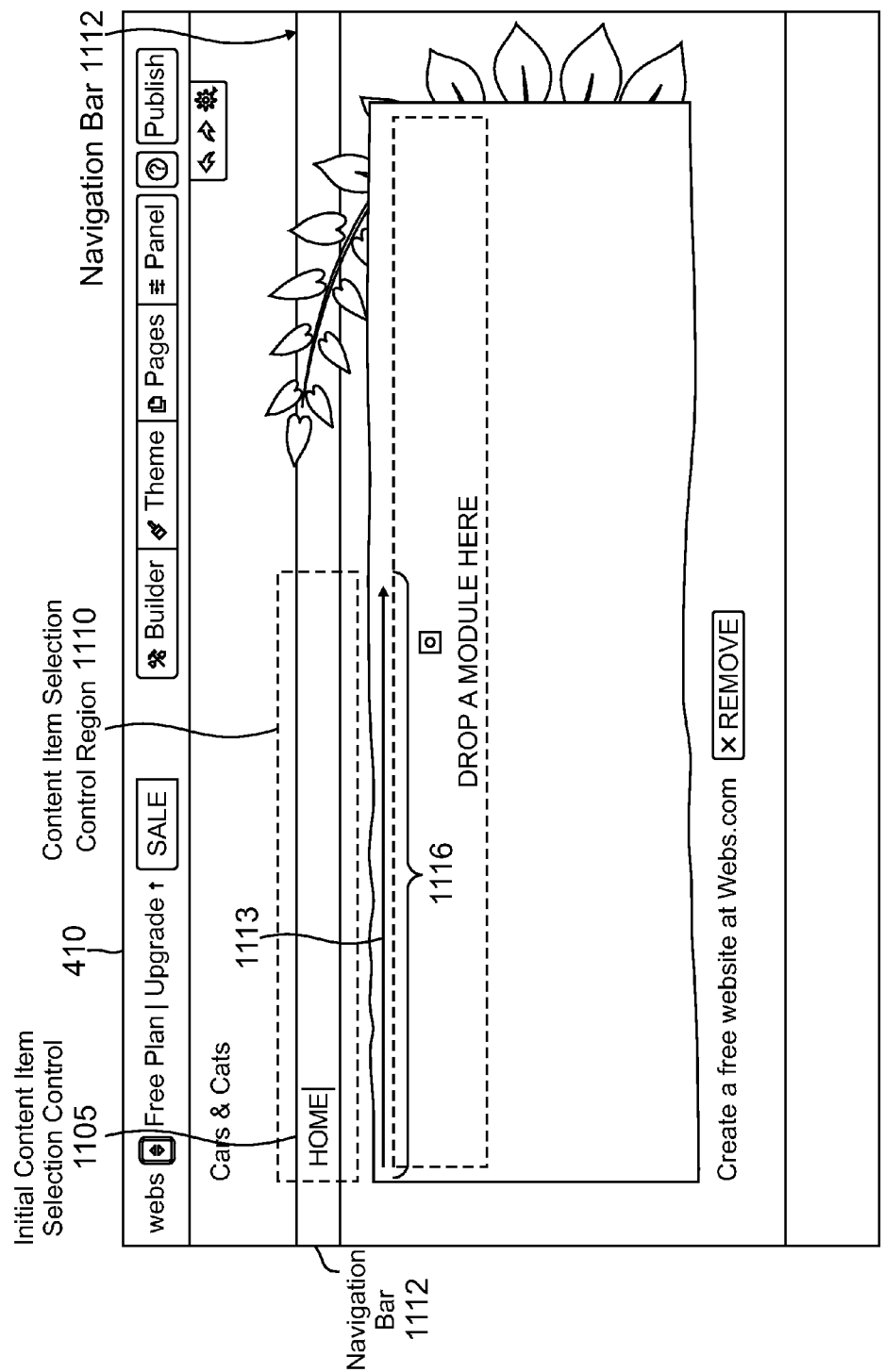
FIG. 11, consisting of FIGS. 11A-11C, illustrates aspects of the addition of website end user navigation controls and provision of different types of such controls to a developmental website.
Figure 11B:
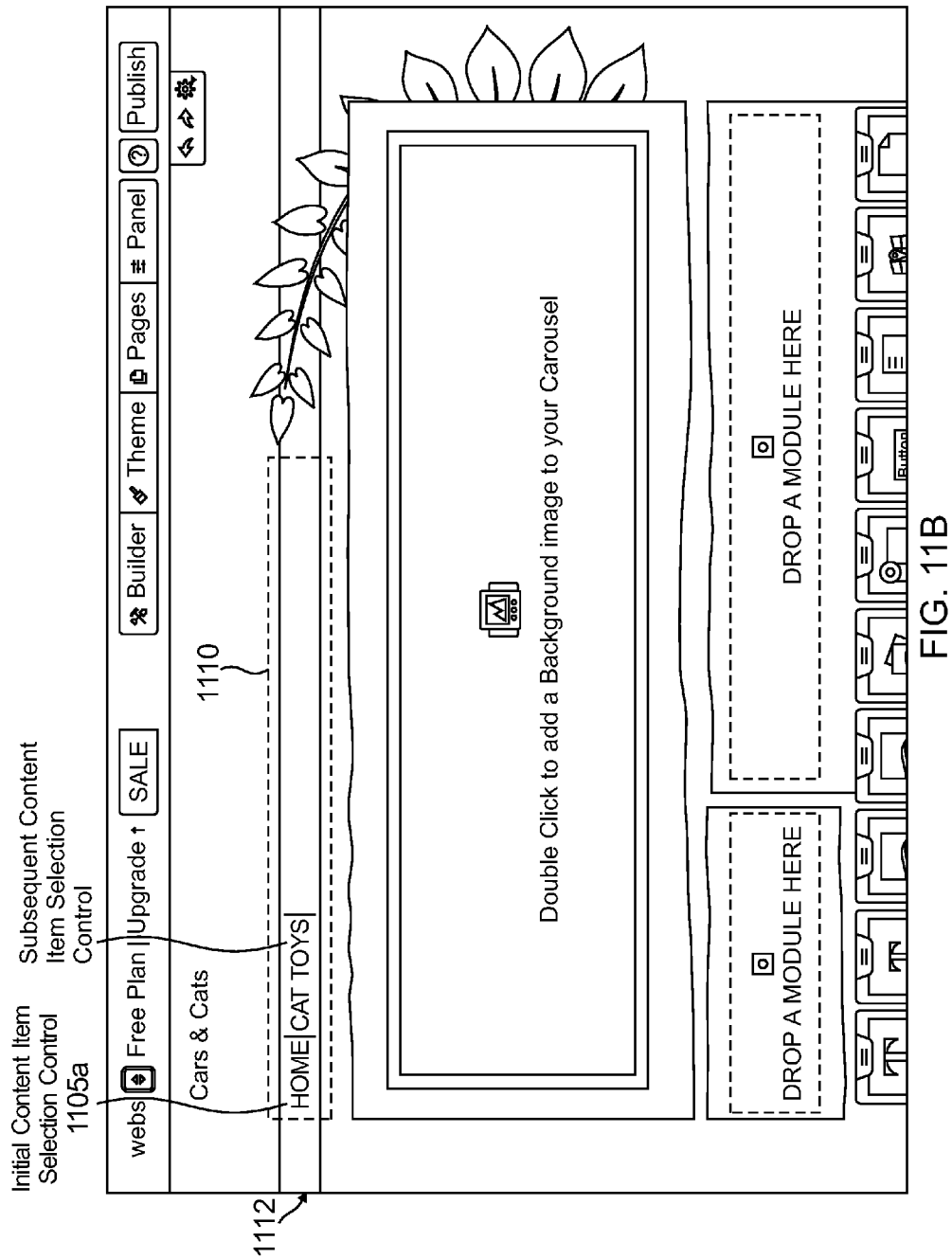
Figure 11C:
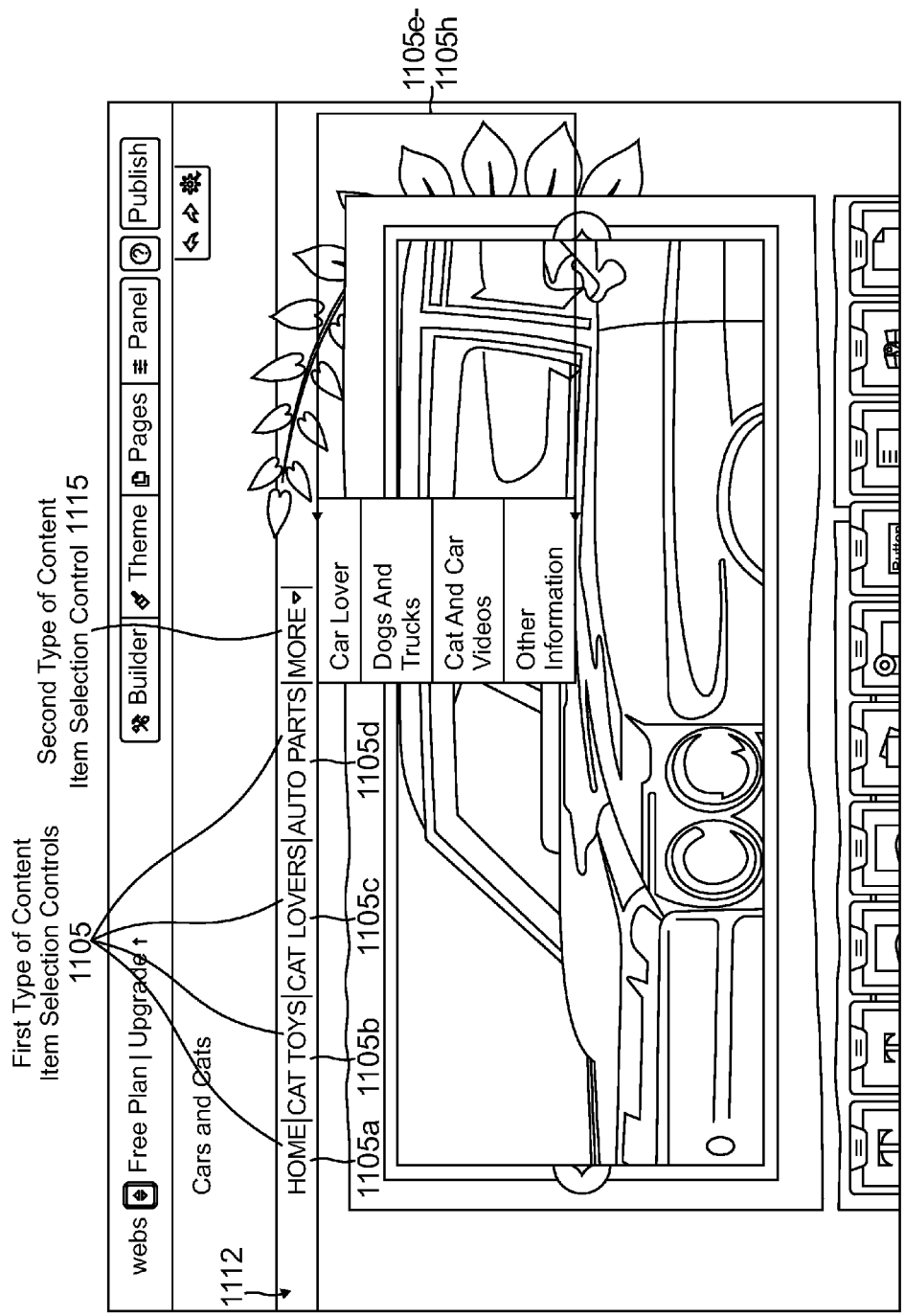

FIG. 11, consisting of FIGS. 11A-11C, illustrate aspects of the addition of website end user navigation controls for effecting end user navigation to multiple pages within a website constructed by a user constructing a website. FIG. 11 provides screenshots of a developmental website workspace region 415 in which an initial content item selection control, for example a "home page" navigation tab control 1105, is displayed in a content item selection control region 1110 of predetermined maximum horizontal dimension. As will be understood by those skilled in the art, content item selection controls, often provided in the form of tabs arranged in a linear alignment at or near the top of a website, are often used to navigate between webpages within a website. Such controls or tabs 1105 are often provided in a particular linear arrangement known as a navigation bar 1112. However, it will also be understood that the principles of this aspect, as for other aspects described herein are not limited to navigation controls, although such navigation controls or tabs are a typical application.

As shown in FIGS. 11A-11C, the initial content item selection control 1105 is of a first type displayed at the start of a sequence 1113 in the content item selection control region 1110. In the example shown, the first type extends in a horizontal direction, however any suitable direction may be employed. The first type extends in the sequence 113 in a visually appealing manner, such that the rendering of the first type does not appear to crowd or overwhelm the display region with the navigation bar 1112.

As shown in FIG. 11B, in response to a user command to include an additional page in a developmental website, a new webpage container (not separately shown) for receiving user-added content items is added to the developmental website. In further response to user command to include an additional page in the developmental website, a corresponding content item selection control 1105b corresponding to the new page is generated and displayed in the content item selection control region, for example, adjacent to the first or "home page" content item selection 5 control or tab 1105a in the navigation bar 1112. As shown in FIG. 11B, the user added a second page titled "Cat Toys" to the developmental website and the new page and its corresponding content item selection control 1105b was generated and displayed in the developmental website workspace region 415.

It will be understood that a plurality of content item selection controls 1105 may be added to the navigation bar 1112, as space may permit. It will be appreciated that a website construction system as described herein may only provide a navigation bar 1112 of a predetermined size, limited to the width of a typical webpage (and as controlled by the underlying HTML, CSS, or other construction mechanism) so that addition of oversized control items or tabs, or multiple control items, in the navigation bar 1112 can result in visual clutter to an end user. Additionally, the size of the content item selection control region 1110 may be of a limited and predetermined size. In accordance with another aspect, the inclusion of content item selection controls that are oversized or of a number sufficient to create a cluttered appearance, or exceed the allocated size for the control region 1110, are automatically rearranged into a less cluttered, more pleasing presentation, as will be described.

As shown in FIG. 11C, and according to another aspect, in response to detection that the content item selection control generated in response to a user command to include an additional page in the developmental website has exceeded the predetermined maximum horizontal dimension of the content item selection control region 1110 (and/or the navigation bar 1112), a second type of content item selection control 1115 is generated within the content item selection control region 1110 for containing and presenting the content item selection controls 1115 in a different manner. As depicted in FIG. 11C, after adding four pages in addition to the original home page, with corresponding content item selection controls 1105a-1105d, a second type of content item selection control 1115 was generated to contain and display to subsequently generated content item selection controls, e.g. 1105e-1105h. This second type of content item selection control 1115 in FIG. 11C is labeled "MORE", although other legends could be applied, e.g. "OTHER PAGES," or "ADDITIONAL CONTENT", etc.

In operation, the website development system 120 receives design information for website user controls including receiving a plurality of requests for additional content pages, and generates, for each of the additional content pages, a content item selection control, such that the content item selection control has a first type 1105 and a second type 1115. The first type and second types conserve visual viewing area by displaying the first type in entirety and selectively displaying only the second type when activated by a pointing device or keystroke. Therefore, the first type is adapted to be rendered for a visually appealing number of the first type (i.e. a horizontal sequence across part of the display screen), and the remainder (second type) are adapted for successive content item selection controls not rendered as the first type, such as via pulldown menu. Each of the first type and the second type nonetheless are content item selection controls corresponding to one of the plurality of content pages and responsive for selection of the corresponding content page. Thus, in operation on the resulting generated website, user selection of either the first type or the second type results in displaying the corresponding web page.

For visual appearance and screen formatting, the visually appealing number denotes a linear sequence of content item selection controls, in which the linear sequence based on a predetermined distance 116 across the screen, such as half or ⅔ of the total distance across. The first type is adapted for full view of the content item selection control, and the second type is adapted for a summary view, such that the summary view selectively displays the content item selection control, therefore only requiring full concurrent display of the first type. The second type of controls (e.g. pull down buttons) are selectively displayed when "dragged across" or "clicked" by a mouse or other pointing device.

In the example arrangement shown, the second type is adapted for a pulldown view 1106, such that the pulldown view is responsive to activation from a pointing device (i.e. mouse "dragging" or "clicking:), in which activation renders a series of the content item selection controls of the second type, such as the pulldown menu 1106. Although not required, the linear sequence of the first type may extend in a substantially orthogonal direction from the series of the second type, such as a vertical pulldown menu for the second type at the end of the first type sequence 113. The predetermined distance 1166 may be computed based on the size of the rendering of the first type of the content item selection controls and on an available display area, so as to avoid a "crowded" screen.

According to the present aspect and as shown in FIG. 11C, the second type of content item selection control 1115 is preferably a drop-down list; however, as will be understood by one skilled in the art, the second type of content item selection control 1115 may comprise a variety of forms that will occur to one of ordinary skill in the art.

It will further be appreciated that a determination as to the number of content item selection controls provided within the second type of content item selection control 1115 may be dynamic and vary in response to an end user's resizing of his or her view of the final deployed website, and as a function of the size (e.g. number of characters, font size, font, etc.) of the legends on the controls 1105, and the allocated width of the navigation bar 1112. Mechanisms for dynamic resizing and inclusion/exclusion of control items within the initially-provided region 1110 for content item selection controls and the second type of content item selection control 1115 are within the skill of the ordinary artisan.

Resizing of Content Items Upon Relocation

Figure 12A:
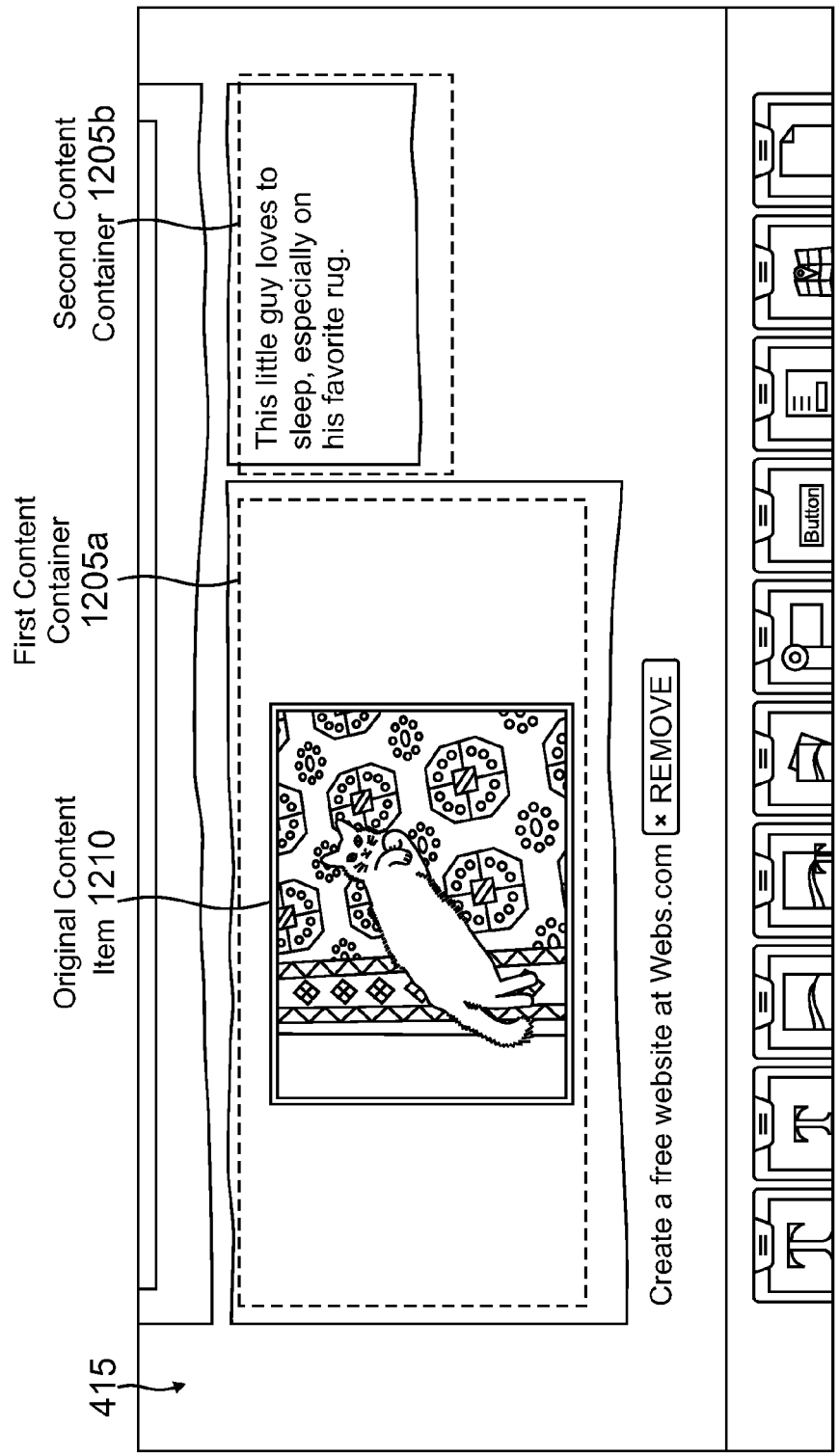
FIG. 12, consisting of FIGS. 12A-12C, illustrates aspects of automatic resizing of content items from one content container when utilized or moved to another content container in a developmental website.
Figure 12B:
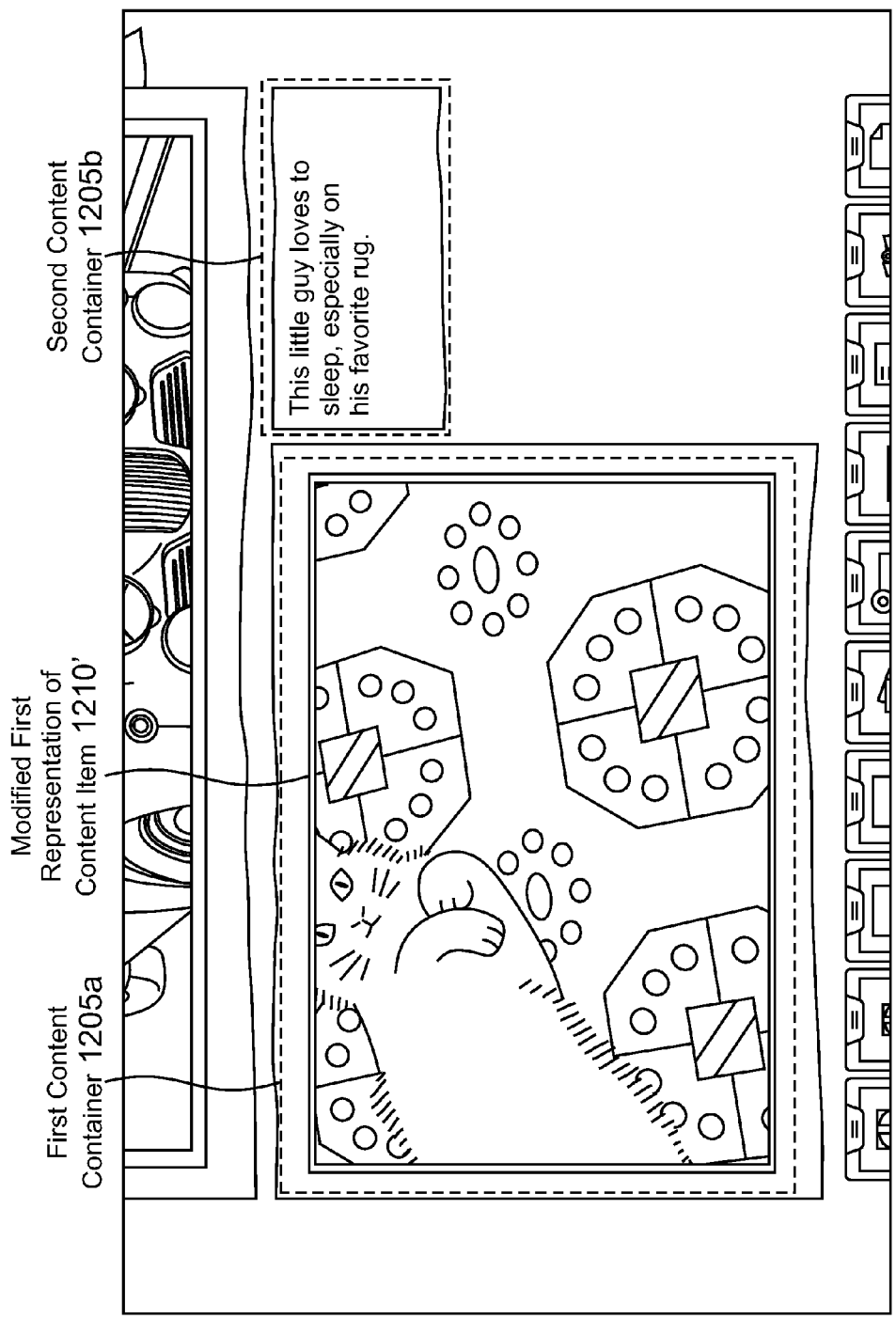
Figure 12C:
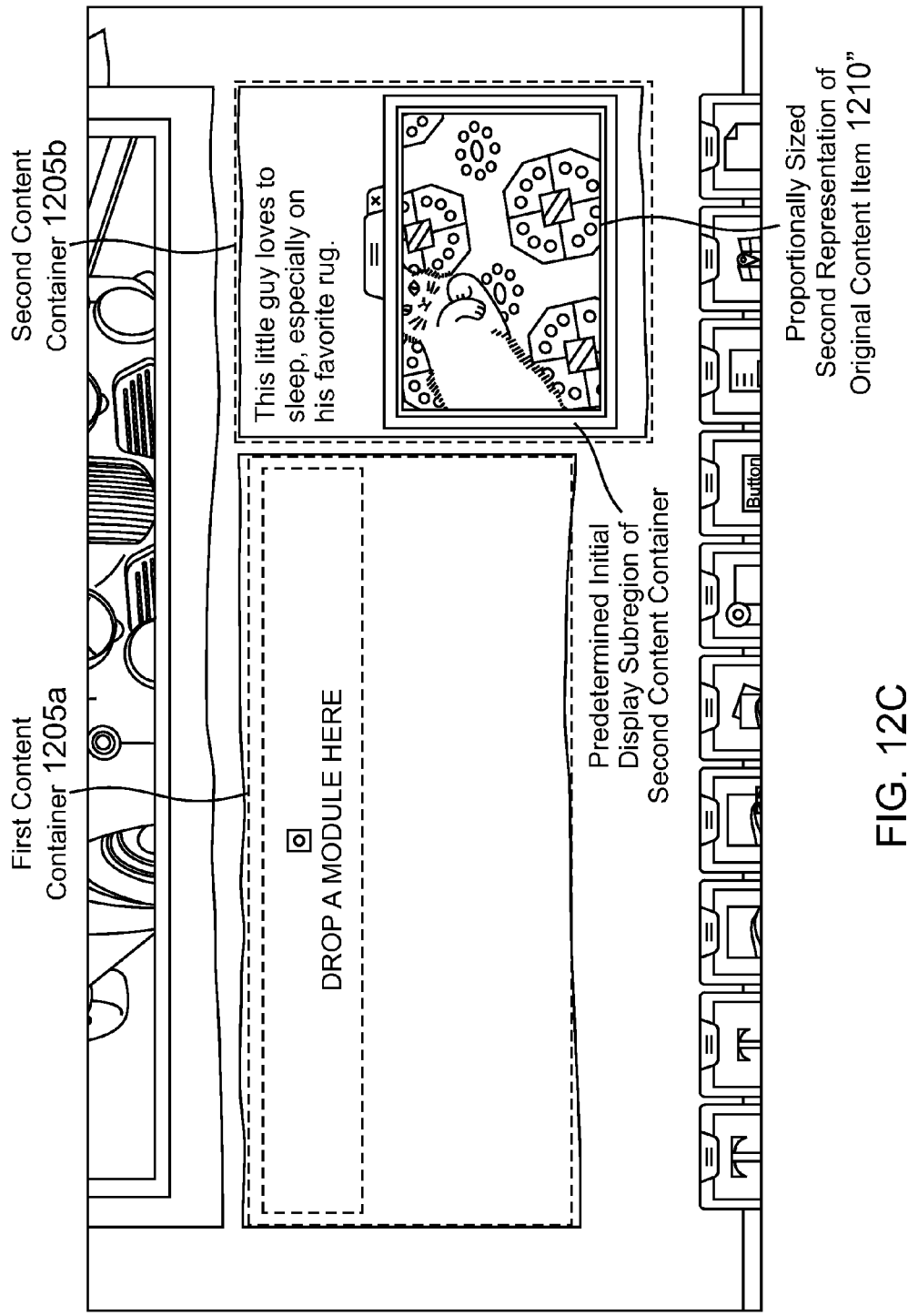

FIG. 12, consisting of FIGS. 12A-12C, illustrates aspects of automatic resizing of content items provided in one content container are utilized or move to another content container in a developmental website. FIG. 12 provides exemplary screenshots of a developmental website workspace region 415 in which two content containers 1205a, 1205b are provided, and a content item such as an image 1210 is manipulated by user controls during construction of the website, and then utilized or moved to another content container. As initially shown in FIG. 12A, a first content container 1205a displays an image 1210 of a cat as a representation of an original content item having inherent characteristics such as image size and resolution. The cat image 1210 shown in FIG. 12A is confined within a predetermined initial display subregion of a first content container 1205a and is proportionally sized.

According to one aspect, in response to a user command to manipulate the first representation 1210 of the content item, a modified first representation of the content 5 item is displayed in the display subregion of the first content container 1205a. For example, as is shown in FIG. 12B, in response to a user command to resize the image of the cat, a modified representation 1210' of the cat image is displayed in the display subregion of the first content container.

As shown in FIG. 12C, and according to one aspect, in response to a use command to place or move the modified first representation 1210' of the content item into a second content container, for example by dragging the image, a proportionally sized second representation 1210" of the original content item is displayed in a predetermined initial display subregion of a second content container 1205b. The modified second representation 1210" reflects the modifications to the first representation resulting from the user's commands during construction of the website. For example, as shown in FIG. 12C, in response to a user command to place the resized cat image into the second content container 1205b, a proportionally sized representation 1210" of the resized cat image, previously displayed in FIG. 12B, is displayed in the second content container 1205b. In accordance with an aspect, the system automatically resizes the image, without introducing distortion such as stretching, so that the resized representation of the image 1210" will be contained within the boundaries of the second content container 1205b. As will be understood by those skilled in the art, such image resizing is typically effected by a resampling algorithm run against the first image representation 1210' that reflects the earlier image manipulations by the user. According to aspects of the present disclosure, the first and second representations of the content item, i.e., the cat images 1210', 1210" displayed in FIGS. 12B and 12C, respectively, are displayed relative to the original content item 1210 and no adjustments from user manipulations affect the original content item. As will be understood, the manipulation to the first representation of the content item was a resizing but could include a zoom, crop, or other manipulation, as desired by the user in construction of the website.

Undo/Redo Architecture

FIG. 13, consisting of FIGS. 13A-13F, illustrates aspects of multiple levels of undo and redo operations on a developmental website. In contrast to conventional undo and redo operations provided to computer system users, aspects of the disclosed invention(s) allow users to preserve an opportunity for an undo or redo operation based on expiration of a timer, in addition to conducting a session comprising a saved undo/redo stack.

As will be understood by those skilled in the art, current user interfaces for computer systems that involve the creation and editing of content allow the user to "undo" certain types of operations of content creation or editing, and also to "redo" certain "undone" operations, within limits. Typically, user operations that are capable of "undo" or "redo" are of specific predetermined types, for example the insertion of a string of text delimited by spaces, or the selection and movement of a predetermined string of text such as a paragraph or sentence, or manipulation of the colors in an image, or the resizing of an image, etc. A discussion of the types of operations that are undoable or redoable is beyond the scope of this disclosure, but are available to persons skilled in the art.

Typically, undo and redo operations are delimited by specific actions, and each action is pushed onto an undo stack, which it typically a known type of data structure arranged for "first in-first out" (FIFO) operations). The preferred data structure comprises data identifying the particular computer operation, content and other parameters involved in the operation, and location information typically relative to prior operation. In order to conduct an undo operation, the user selects an undo command, which pops the last undoable operation from the stack, and the data contained in the popped stack entry is used to reverse the operation and revert the display of information to a state that existed before the undo operation. Such push/pop stack architectures for undo/redo management are known in the art. Aspects of the present disclosure provide a different type of undo/redo architecture. Conventional undo/redo operations can be cumbersome when a series of individual operations needs to be redone by repetitive undo invocations. In contrast to conventional undo/redo operations, a timer identifies sequences of operations grouped together as a single undo/redo invocation, such as a sequence of keystrokes of a single word. Thus, a logically cohesive action that required several related input operations can be undone with a single command, and need not be stepped through in reverse order for each individual step or keystroke.

Figure 13A:
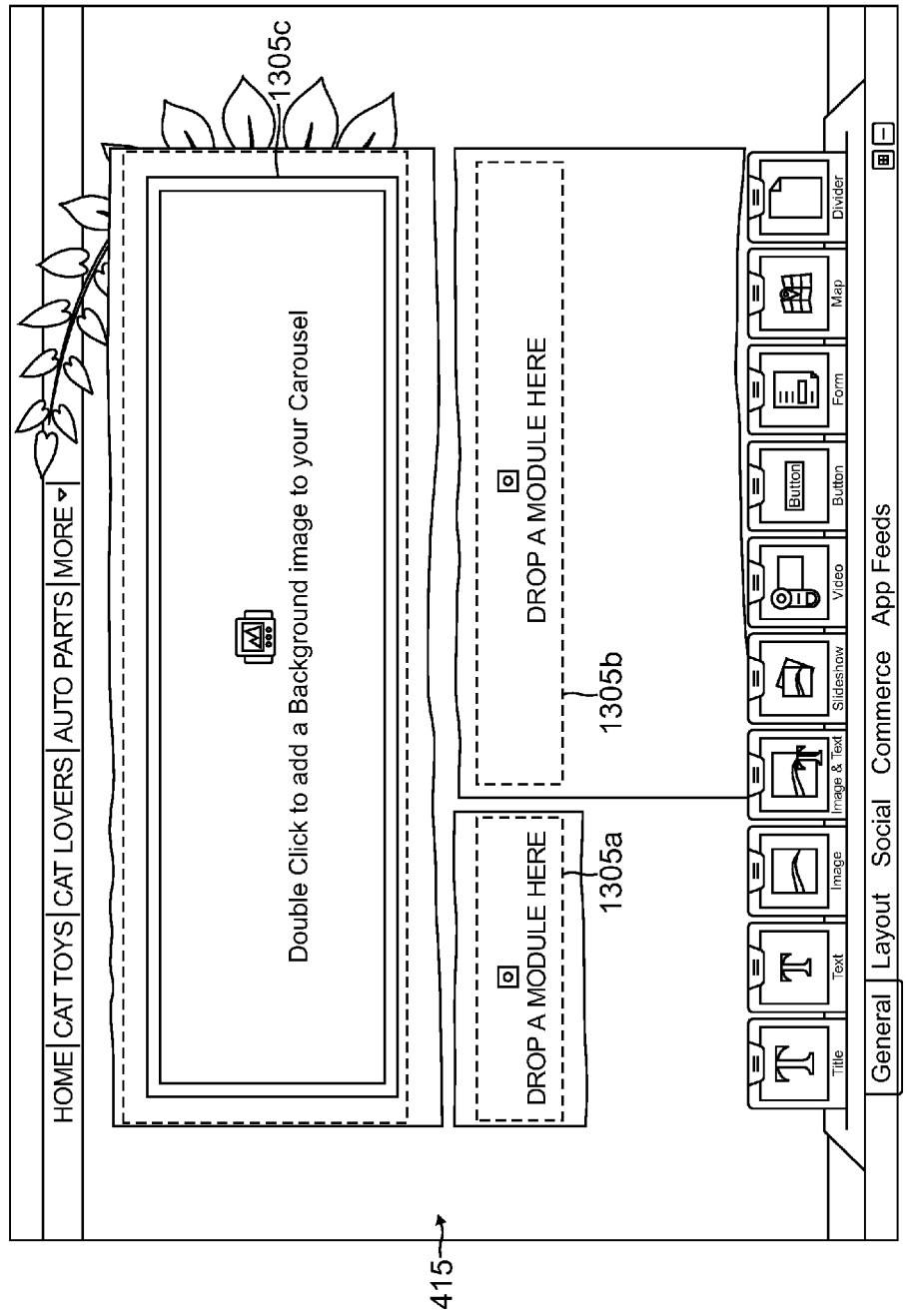
FIG. 13, consisting of FIGS. 13A-13F, illustrates aspects of multiple levels of undo and redo operations in a developmental website.

Referring now to FIG. 13, and in particular FIG. 13A is a screenshot of an exemplary developmental website workspace region 415 displaying various content containers 1305a, 1305b, 1305c for user insertion and editing of content items. As shown in FIG. 13A, no content items have been added to the content containers 1305. According to the present aspect described, a data structure (not shown) is provided for storing information corresponding to the execution of website construction and/or editing operations by the user.

In this context, the website development tool inserting undo/redo operations into a website under construction 304 includes the ability to select a user control 1310 for implementing an undo operation in the website under construction, and providing an ability to, via activation of the user control, reverse previously performed command entries to the website under construction, the previously performed command entries based on a timer. The website under construction 304 is responsive to the activation by reversing the effect of at least one of the previously performed command entries. The undo/redo logic of the construction management module 122 computes the number of previously performed command entries to be reversed based on the timer and a type of the command entry. During user input, the management module 122 stores the previously performed command entries by aggregating received actions of the user 301 based on the timer, such that storing combines a plurality of the previous actions as a single command entry. The management module 122 combines the previous actions following an expiration of a predetermined time, determined based on the combined actions being perceived as a single command. In the example arrangement, the management module 122 stores the received keystrokes as the previous actions, such that the combined actions comprise sequential keystrokes, and in which the sequential keystrokes defining a single command entry. The undo function, as referred to herein, of course includes an undo and a complementary redo function.

Figure 13B:
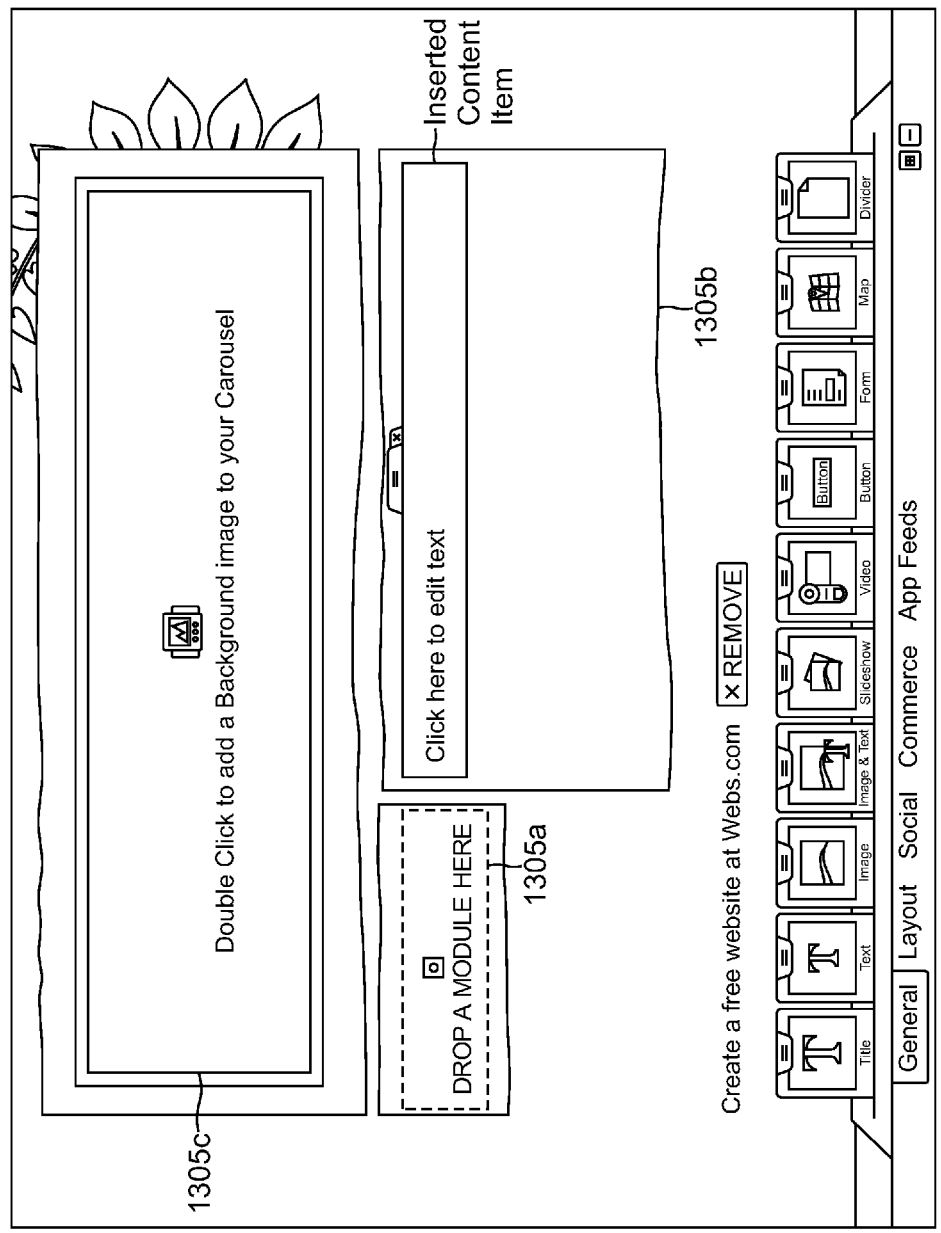

As shown in FIG. 13B, in response to a user command to insert a content item into the workspace region 415, a text-specific content item 1305b is displayed in the workspace region, though as will be understood that the content item could be image-specific, video-specific, or any other type of content item for use in constructing a website. In accordance with the present aspects, the data structure is modified to reflect the insertion of the content item into the developmental website workspace region to allow a user to subsequently remove the content item from the workspace region.

Figure 13C:
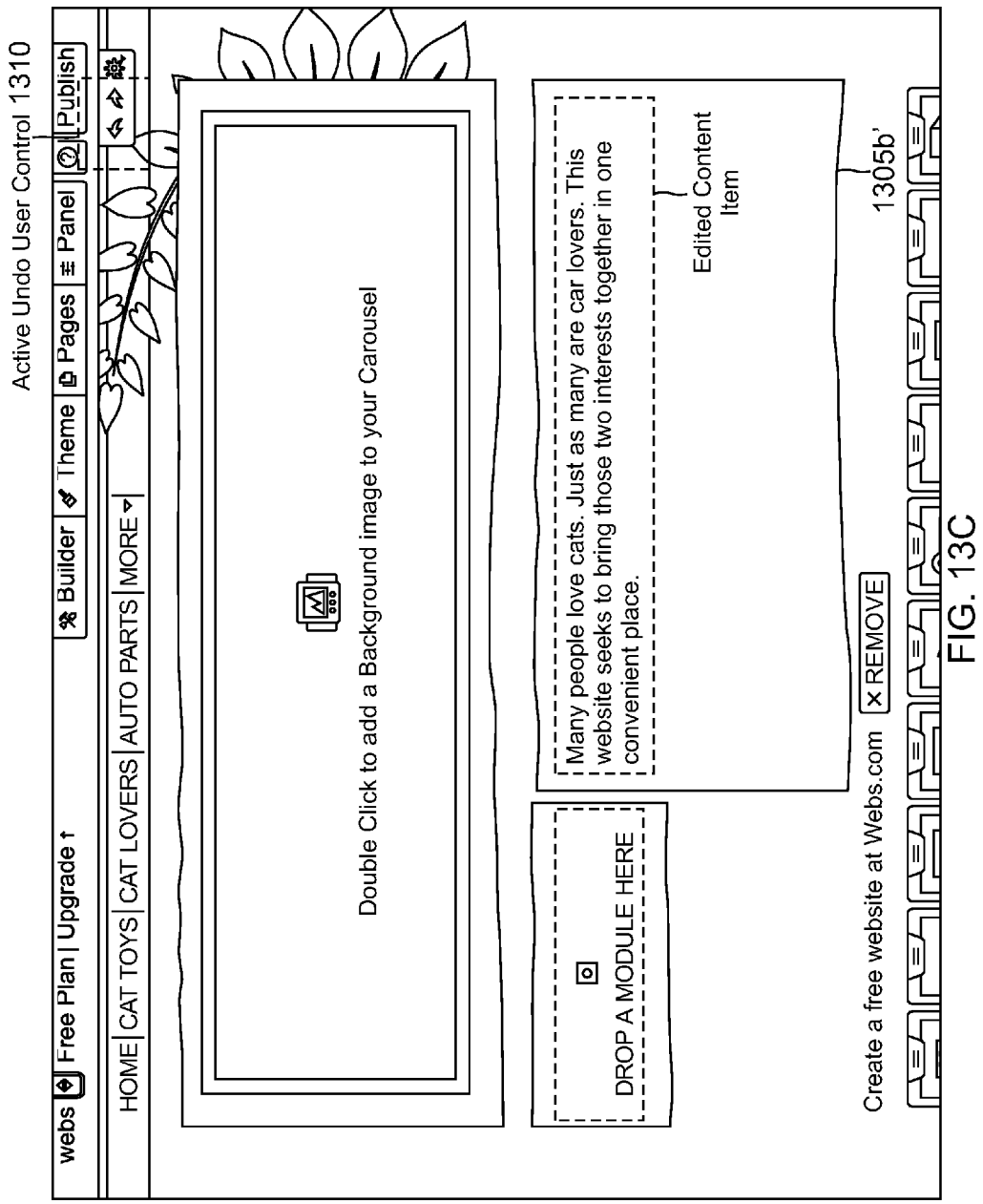
Figure 13D:
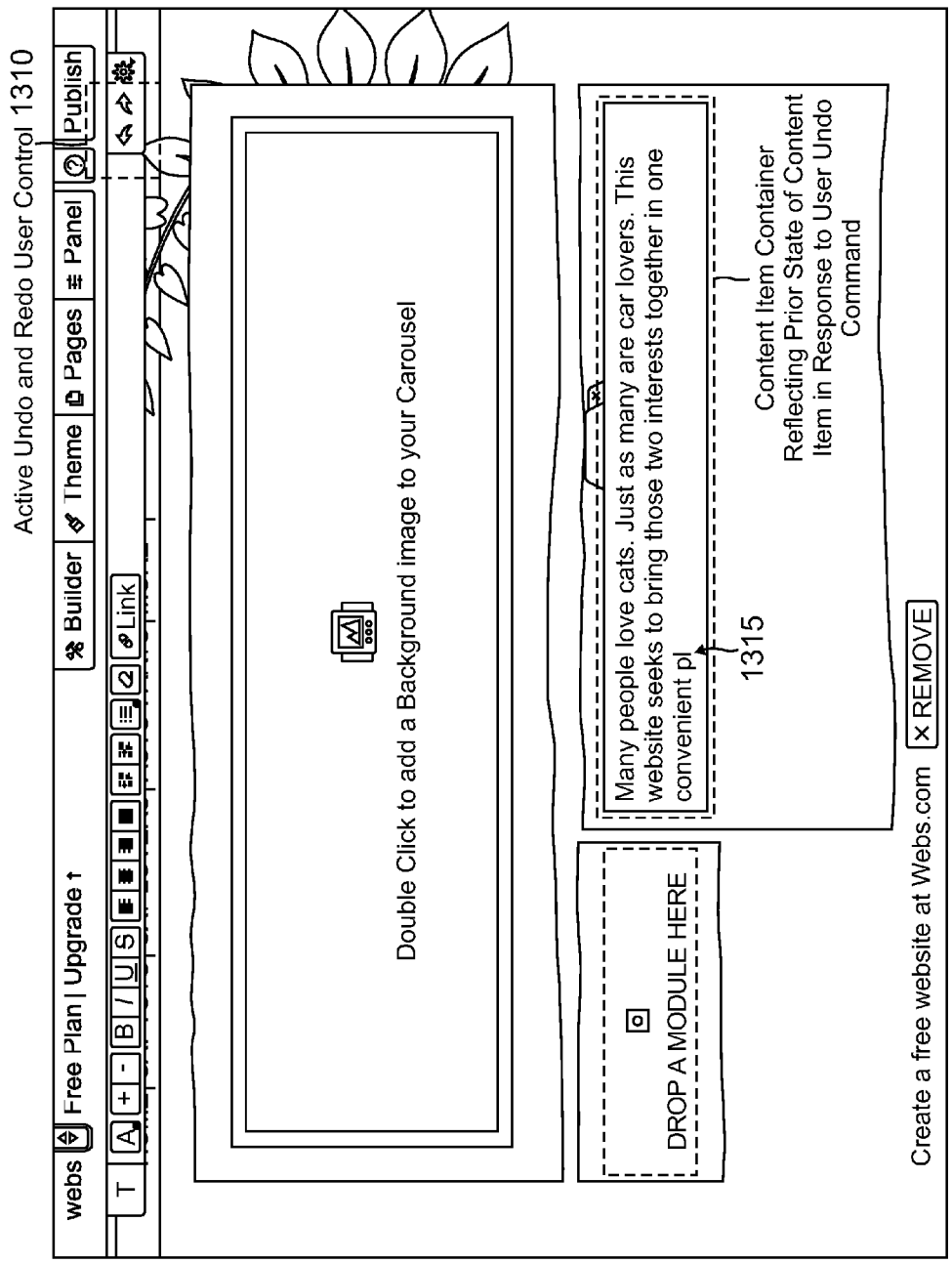

Upon user selection of the inserted content item for editing, according to one aspect, a content editing tracking timer (not shown) for timing predetermined intervals is activated. In response to expiration of the timer, the data structure is modified to reflect a current state of the currently active content item at the time of expiration. As shown in FIG. 13C, the user is actively editing the text-specific content item 1305b, so as to provide a modified text-specific content item 1305b'. As the data structure has been modified to reflect changes to the developmental website and store previously captured states of development, FIG. 13C also displays an active undo user control 1310 indicating the user can undo the edits made to the developmental website.

According to one aspect, in response to a user undo command, the data structure is accessed such that the developmental website is updated to reflect a prior state of the content item. For example, FIG. 13D reflects the edited state of the text-specific content item subsequent to user undo command, such state corresponding to the previous expiration of the content editing tracking tinier and data structure modification with respect to the state shown in FIG. 13C. As will be seen in FIG. 13D at 1315, the text string "pl" appears instead of the original text string "place" in FIG. 13C, reflecting that the content editing tracking timer had initiated after the user had typed the characters "pl" and expired when the user had completed the word "place." Thus, FIG. 13D reflects the undoing of the character string "place" to the smaller string "pl".

Figure 13E:
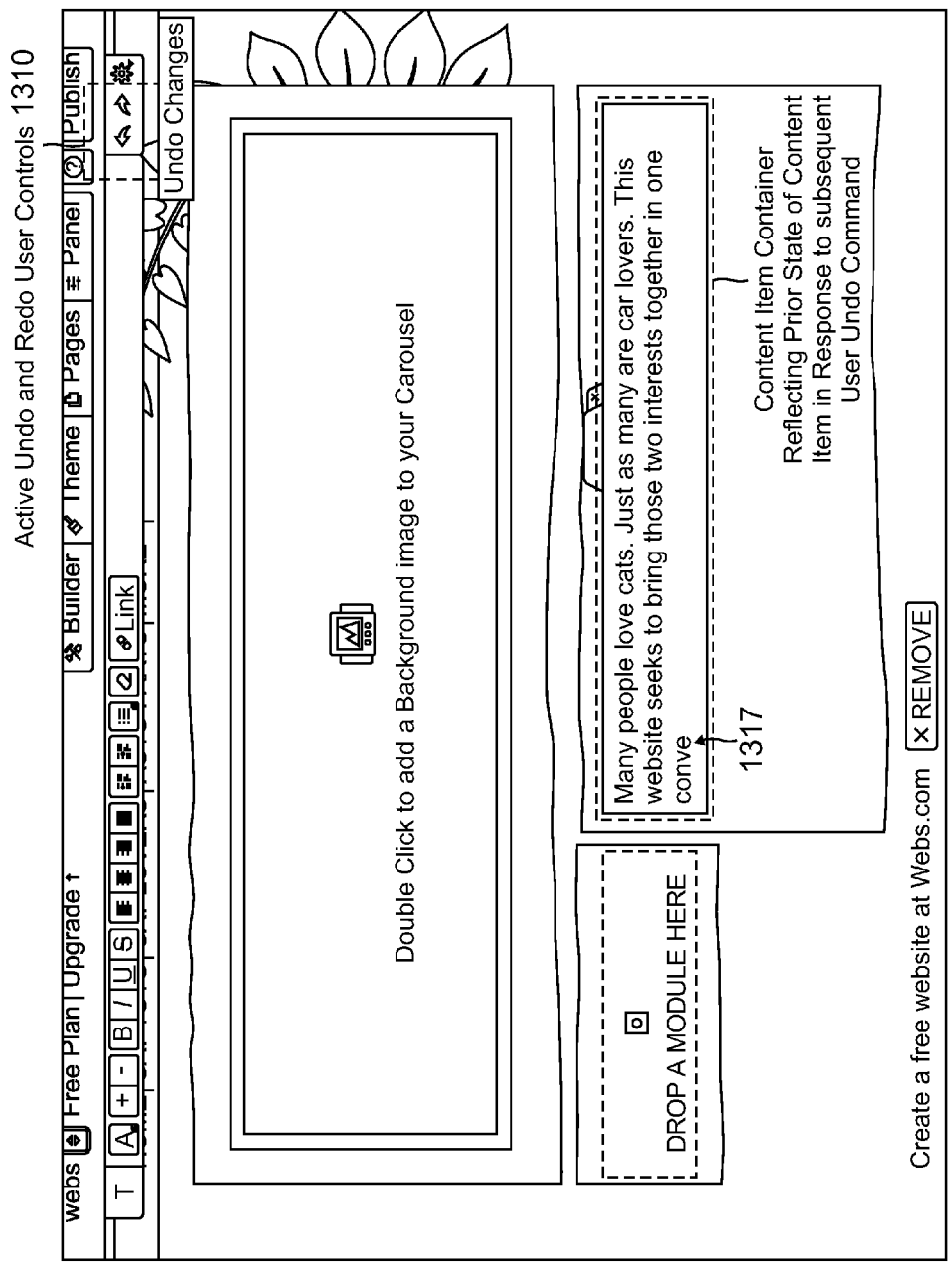

As depicted in FIG. 13E, the text-specific content item reflects an edited state subsequent to a second user undo command. Additionally, FIG. 13E displays active undo and redo user controls 1310 to reflect the user's ability to further undo previous edits or to return to editing states that existed prior to any undo commands. Specifically, as will be seen in FIG. 13E at 1317, the text string "conve" appears instead of the original text string "convenient" in FIG. 13C, reflecting that the content editing tracking timer had initiated after the user had typed the characters "conve" and expired when the user had completed the word "convenient pl." Thus, FIG. 13E reflects the undoing of the character string "convenient" to the smaller string "conve".

Figure 13F:
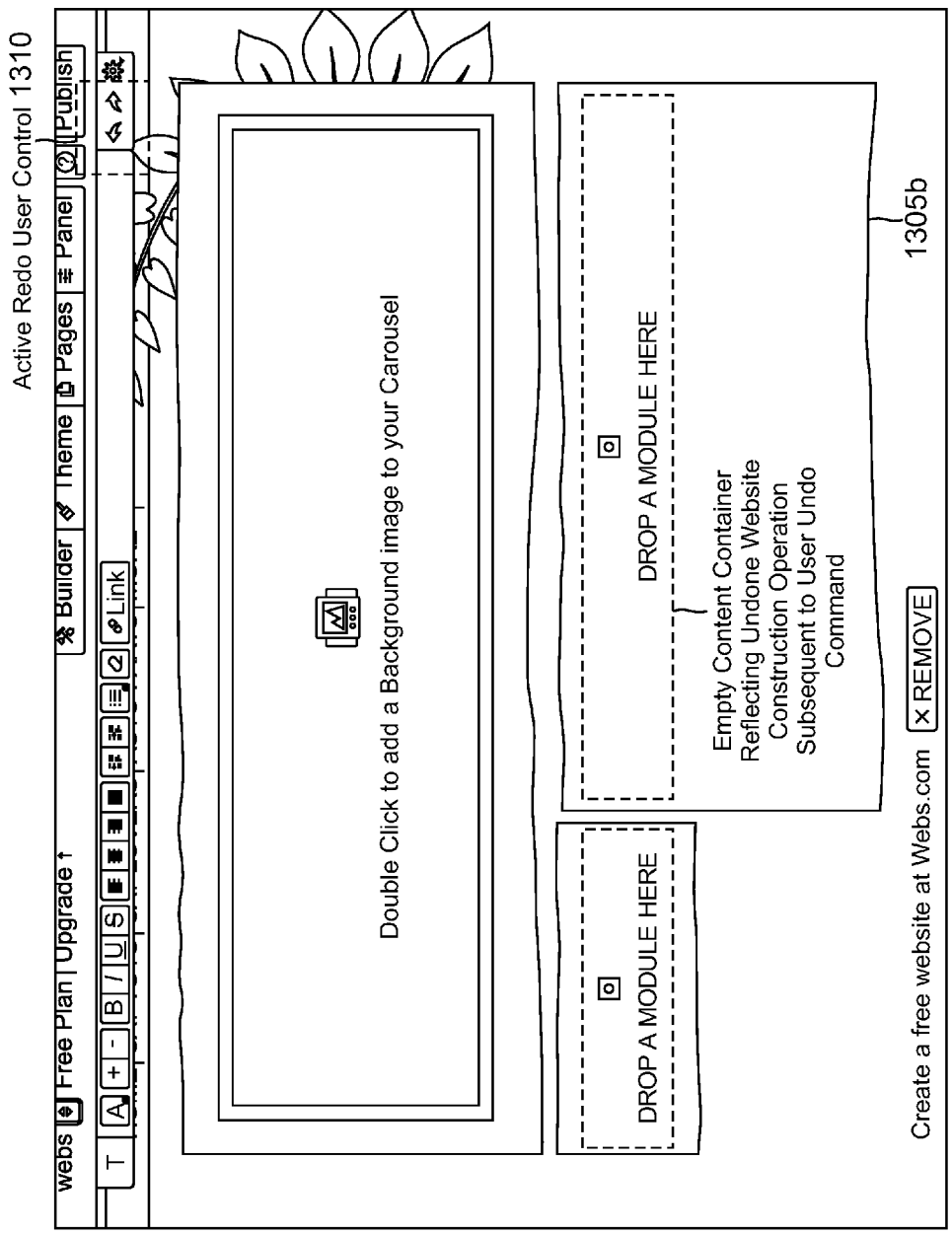

Finally, FIG. 13F reflects an empty content container 1305b that formerly contained a text-specific content item, after a number of undo operations. Only the redo control is active, thus indicating that no editing states existed prior to the current state of empty content containers. However, the user can return to previous editing states that reflect changes previously made to the currently depicted developmental website workspace region.

The undo/redo functionality responsive to the undo/redo control 1310 implements a data structure for aggregating or grouping the related input actions to provide a grouping of inputs that are likely related as a single input, and thus would be undone as a single operation. In other words, the undo/redo logic modifies the granularity of the input keystrokes and operations to permit undoing of set of related and/or atomic operations as a single cohesive entity. In the example configuration, a tree structure identifies sets of the related input operations, and the timer is employed to identify breakpoints. The breakpoints attempt to identify the logically related steps as a single entity, and weighs them with the timer input, since older operations are more likely to be removed as a large group. For example, a user might immediately under 1 or two keystrokes as a typo, but after some time is more likely to remove whole sentences or paragraphs.

App Feeds/App Module

FIG. 14, consisting of FIGS. 14A-14E, is a series of screenshots illustrating aspects of a developmental website 400 (FIG. 4) at different points in time to demonstrate the functionality of a blog-specific app feed within a website. As used herein, an "app feed" is an example of an associated computing function, such as the blog computing function 125 or a third party computing function or data source such as an external blogger 130 as shown in FIG. 1. The functionality of an app feed is to provide an automatically updating (i.e. "autoupdate") content container for a website being constructed by user. In the example of FIG. 14, a blog entry container 1405 is one form of an associated computing function, that is, a content container for providing blog entries created by bloggers either via a blog application hosted within the system 100 such as at 125 or provided by the external source 130.

Figure 14A:
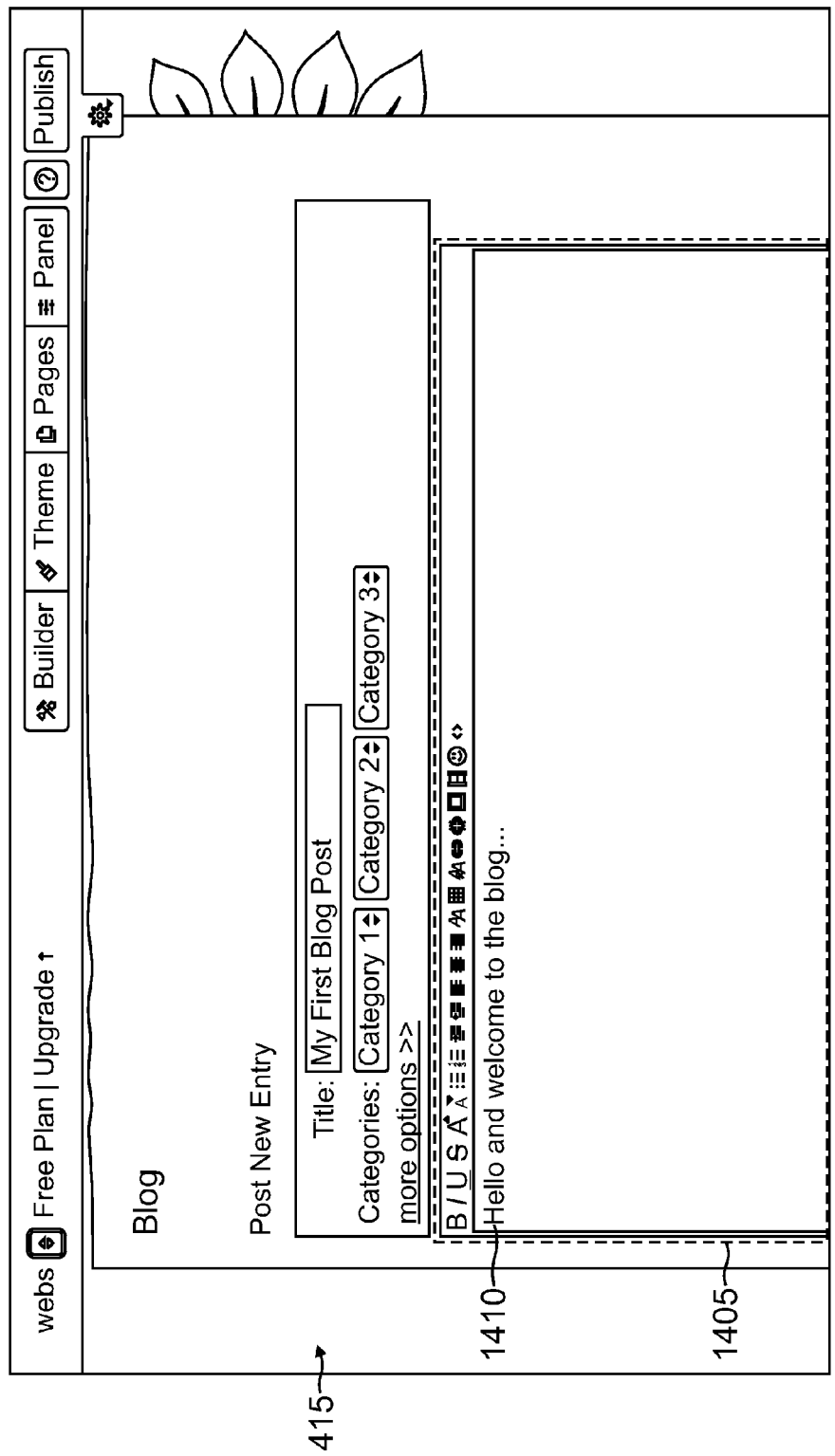
FIG. 14, consisting of FIGS. 14A-14E, illustrates aspects of the app feed user control item and autoupdating website content from affiliated computing processes.

At a first time, as shown in FIG. 14A, a user has created a new blog entry content container 1405 in the developmental website workspace region 415 and has added some a portion of a blog entry (content) 1410 to the new blog entry content container 1405.

Figure 14B:
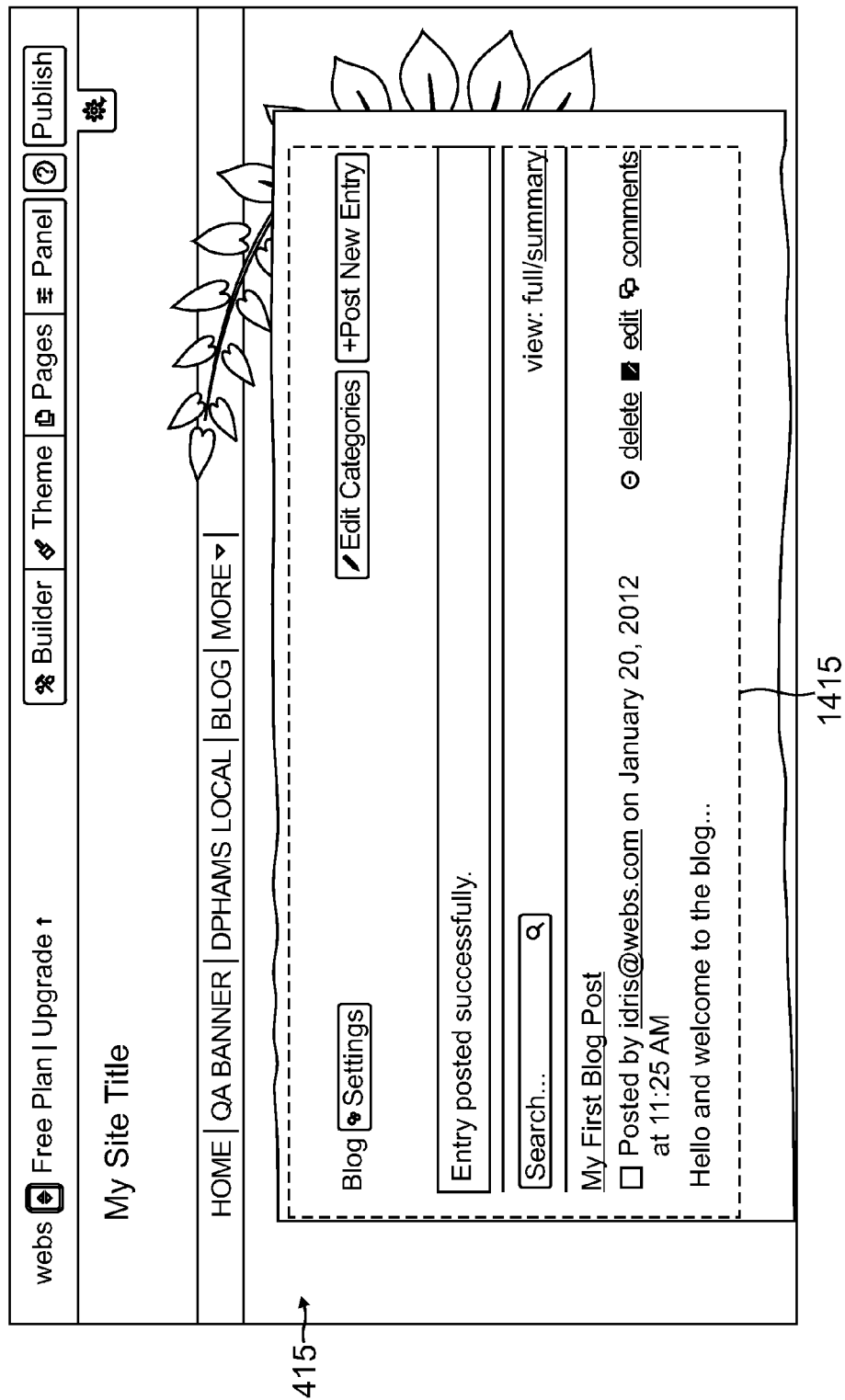

FIG. 14B shows the finalized blog post 1415 added to the developmental website workspace region 415, thus replacing the new blog entry content container 1405 and blog content 1410 previously shown in FIG. 14A.

Figure 14C:
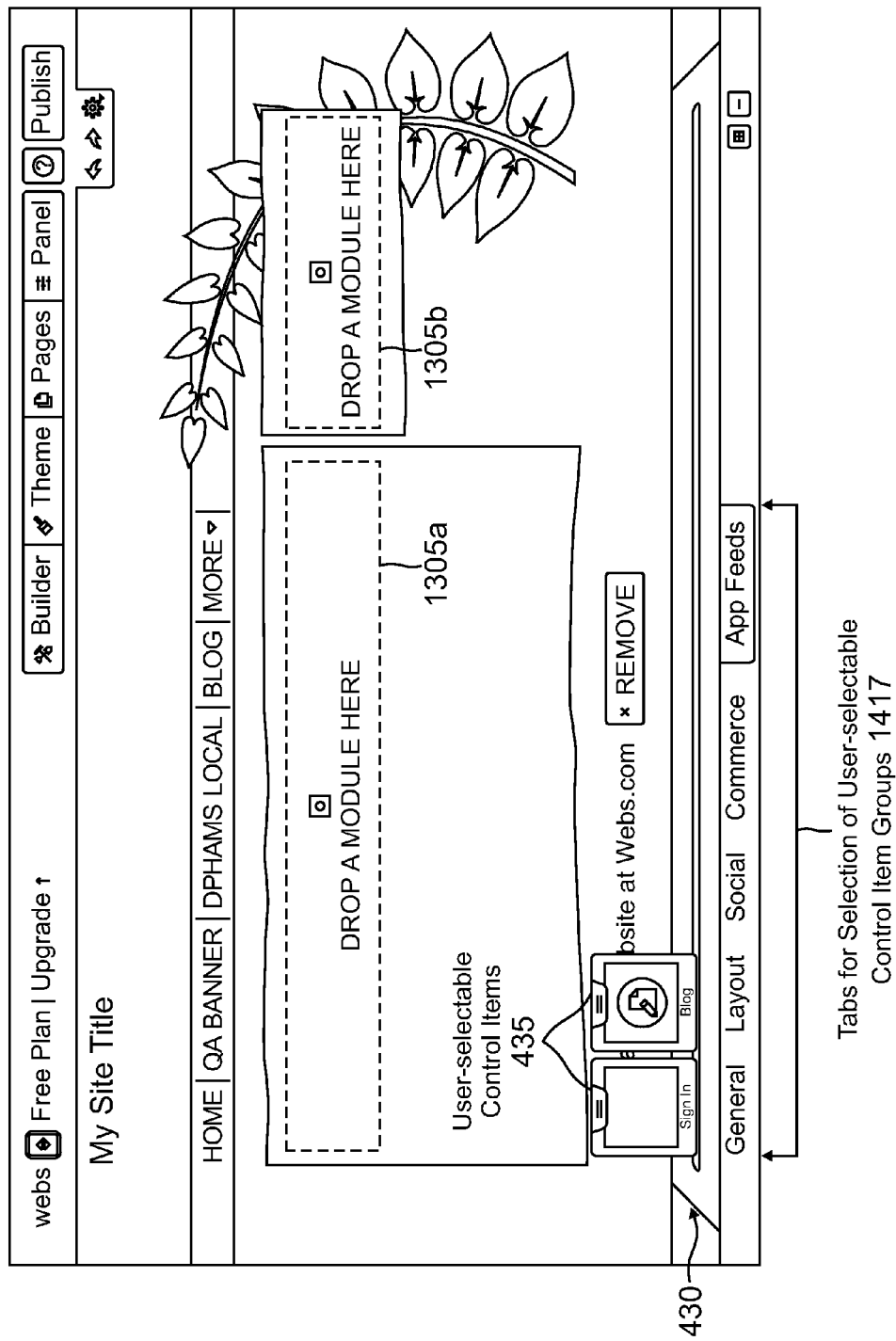

FIG. 14C displays a separate webpage within the same developmental website 20 400 displayed in FIGS. 14A and 14B. The developmental website workspace region 415 of the currently selected webpage displays two content containers 1305a and 1305b (1305 generally) for user insertion and editing of content items. In addition, FIG. 14C shows a predetermined docking region 430, tabs for selection of user-selectable control item groups 1417, and user-selectable controls 435 in the docking region. The user selectable control 435 for "blog" permit a method for applying dynamic update functions in a website under construction 304 by generating an ability for identifying a remote network entity the configured for delivering content to the website under construction, and associating the delivered content with a container 1305 in the website under construction. Typically, the remote network entity is the hosting website for the blog or other remote content for which dynamic update is sought. The inserted container 1305 is operable for rendering the delivered content via the associated container.

In the example arrangement, such content includes an app feed to the website under construction 304, such that the app feed provides periodic updates of revised content from the remote network entity. During construction, this includes providing the remote network entity with a network identity of the website under construction 304, and receiving, based on the provided network identity, periodic updates of content from the remote network entity, in which the remote network entity is updated independently of the website under construction, as in the case of a remotely sourced blog, discussed further below in FIGS. 14D and 14E.

Figure 14D:
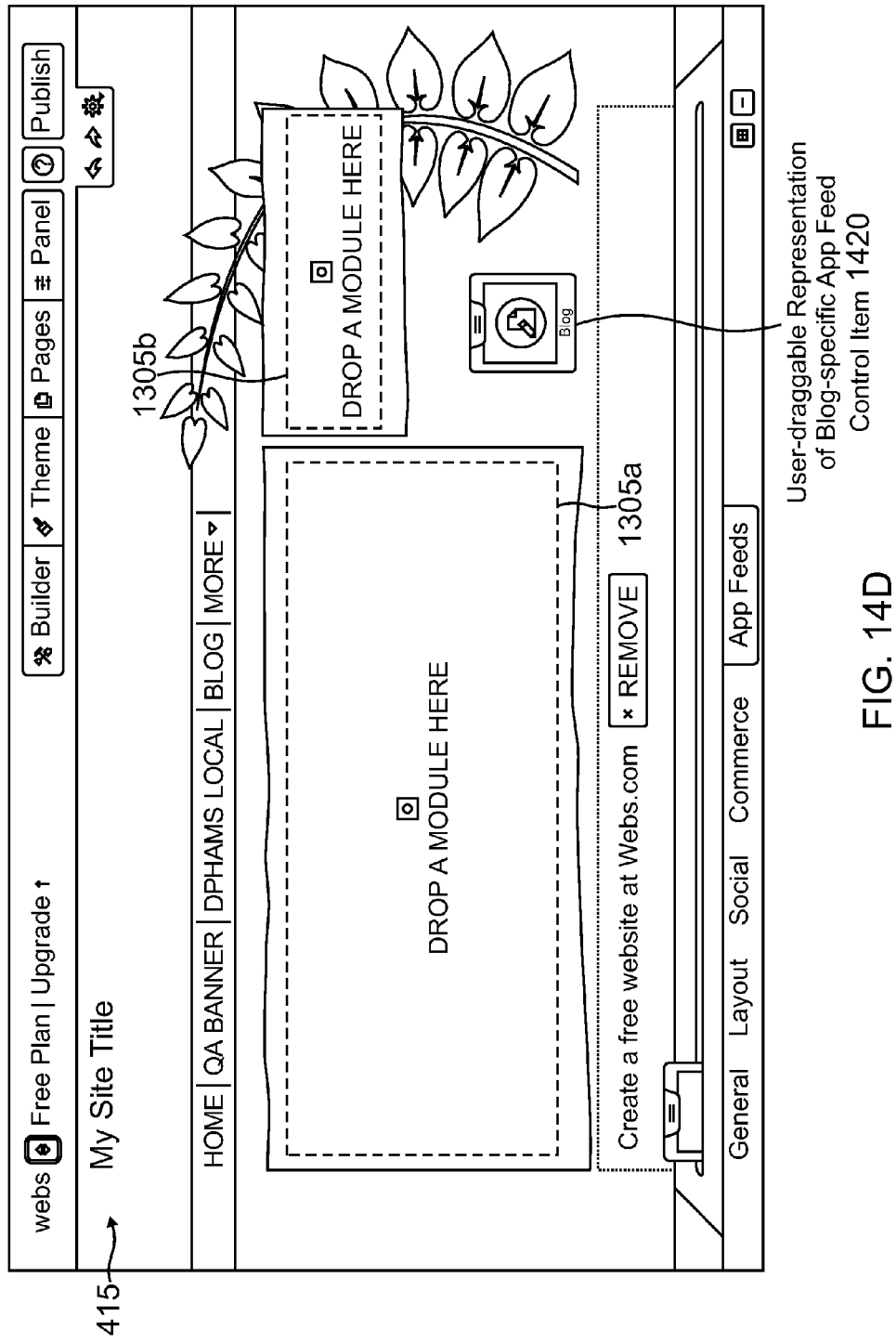

As shown in FIG. 14D, at a second time subsequent to the first time of FIG. 14A, the user has selected a user-draggable representation of the blog-specific app feed control item 1420 and dragged it into the developmental website workspace region 1415, as shown by arrow 1420. It will be understood that a part of this operation (not separately shown) includes the identification and/or linking to an associated computing function 125 or external third party computing function which provides dynamic content, i.e. content that is dynamically updated as provided by that associated or third party computing function.

Figure 14E:
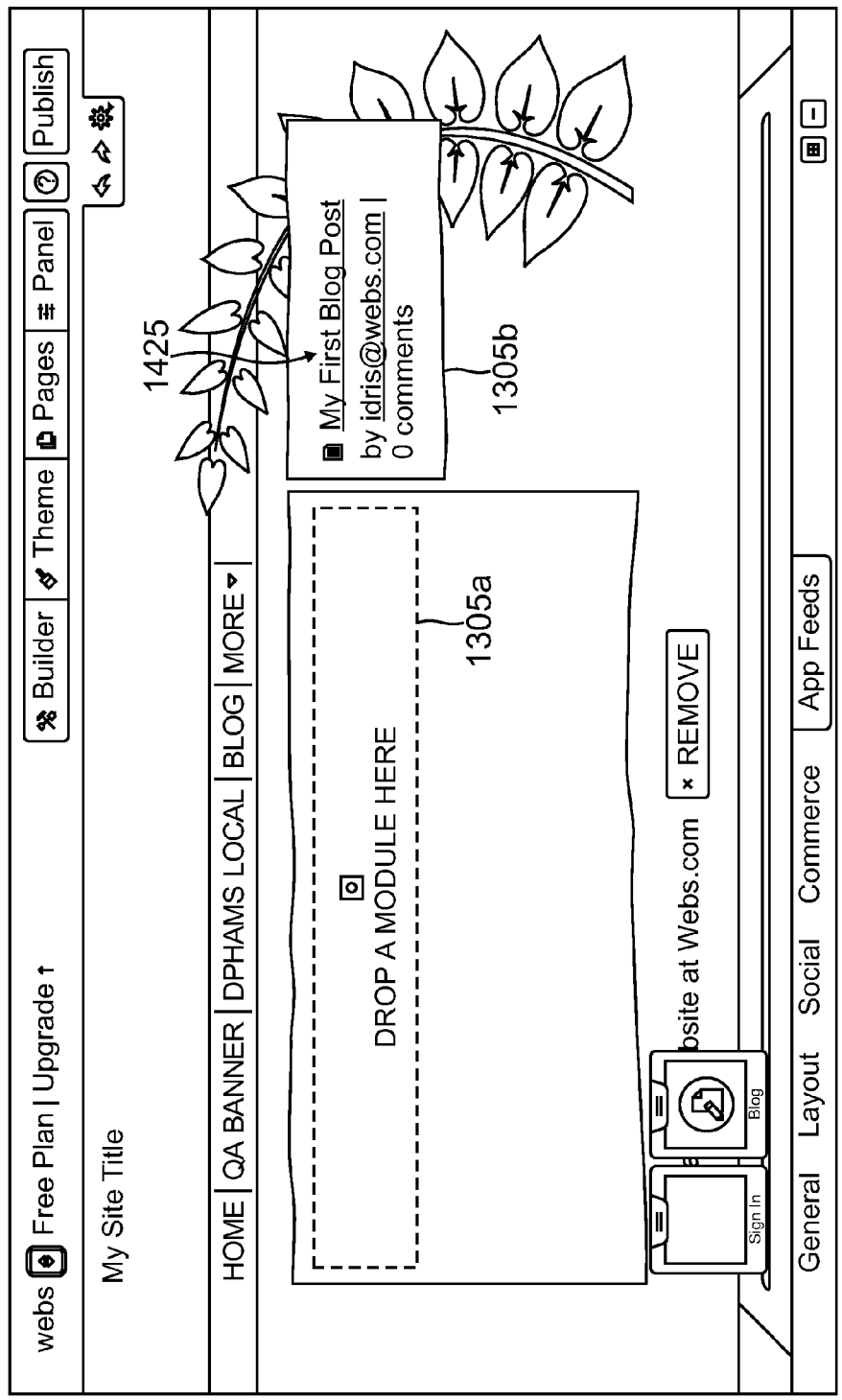

Subsequent to the user releasing the blog-specific app feed control item 1420 into the content container 1305b and providing any required linking or associating to the third party computing function or external computing function, and as shown in FIG. 14E, the content container is dynamically updated as shown at 1305b' through the functionality of the blog-specific app feed control item 1420 to display a link 1425 to the finalized blog post 1415 as previously depicted in FIG. 14B. Those skilled in the art will understand that the blog entry content container 1405 is operative to automatically receive updated 10 blog entries (i.e. updated content) from an associated source such as the associated computing function 125 or third party computing function 130 and thereby provide automatically updated content (in this case, of a blog) to an end user of the website created by the user of the system 100.

The remote content depicted by the link 1425, such as a URL, generally scrolls in the container as updated content 1305', such as from the app feed delivering information from a social media website, for example. In the example arrangement, the dynamic update of 1305b' is well suited such that the app feed delivers information from a blog, in which the blog includes chronologically updated revisions based on input from a remote user base, however other sources and remote network entities may be employed. Accordingly, the dynamic update provided by the control item 1420 generates code for identifying the remote network entity, establishing a network connection for transmitting the content.

Although FIGS. 14A-14E illustrate the functionality of a blog-specific app feed, as will be understood, app feeds are not limited to blog content and can be utilized to dynamically add various other types of content from sources external to a specific webpage.

Automatic Theme Change Adjustment

Figure 15A:
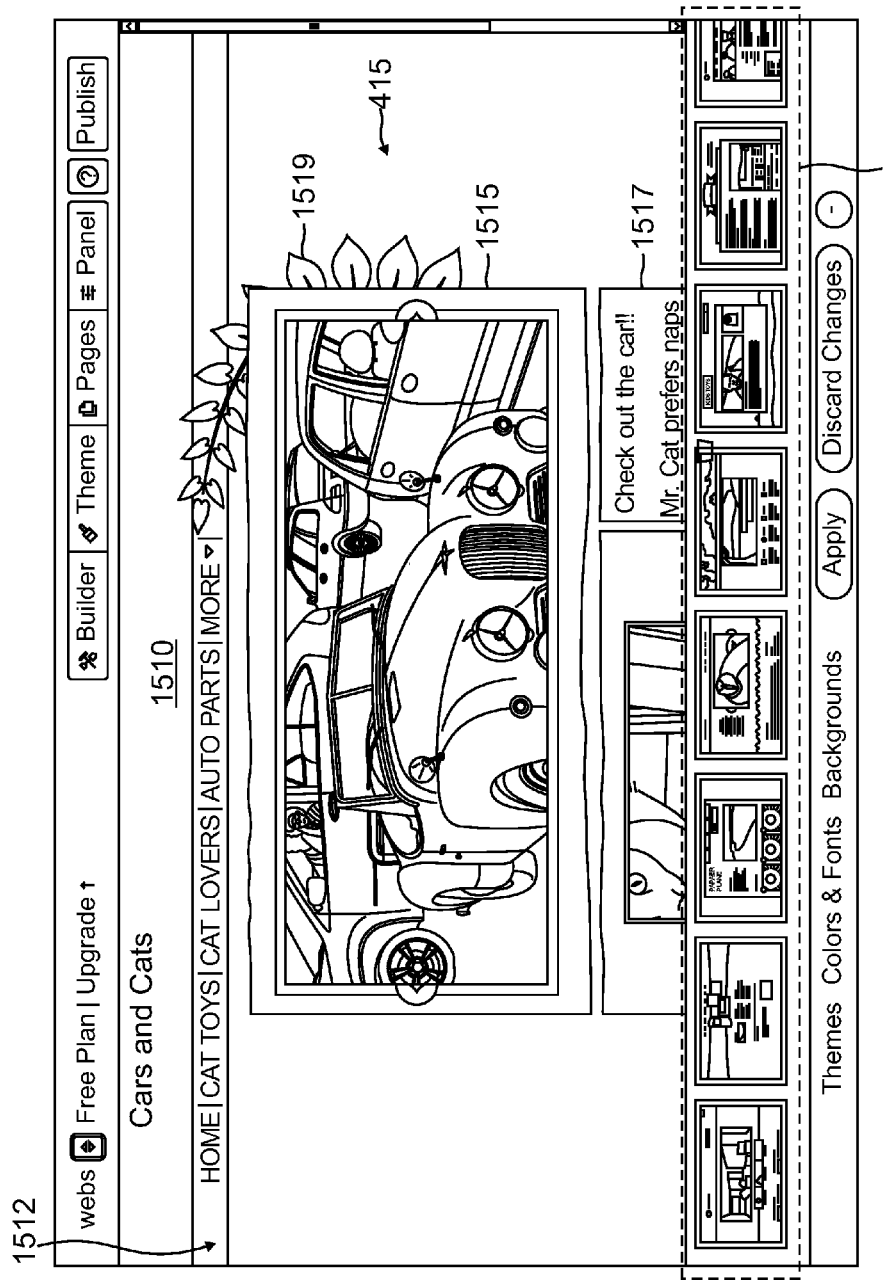
FIG. 15, consisting of FIGS. 15A-15C, illustrates aspects of modification of a developmental website generated in a particular aesthetic theme, by change from a first theme to a second and different theme, and the automatic adjustment of the website under construction in response to such a theme change.
Figure 15B:
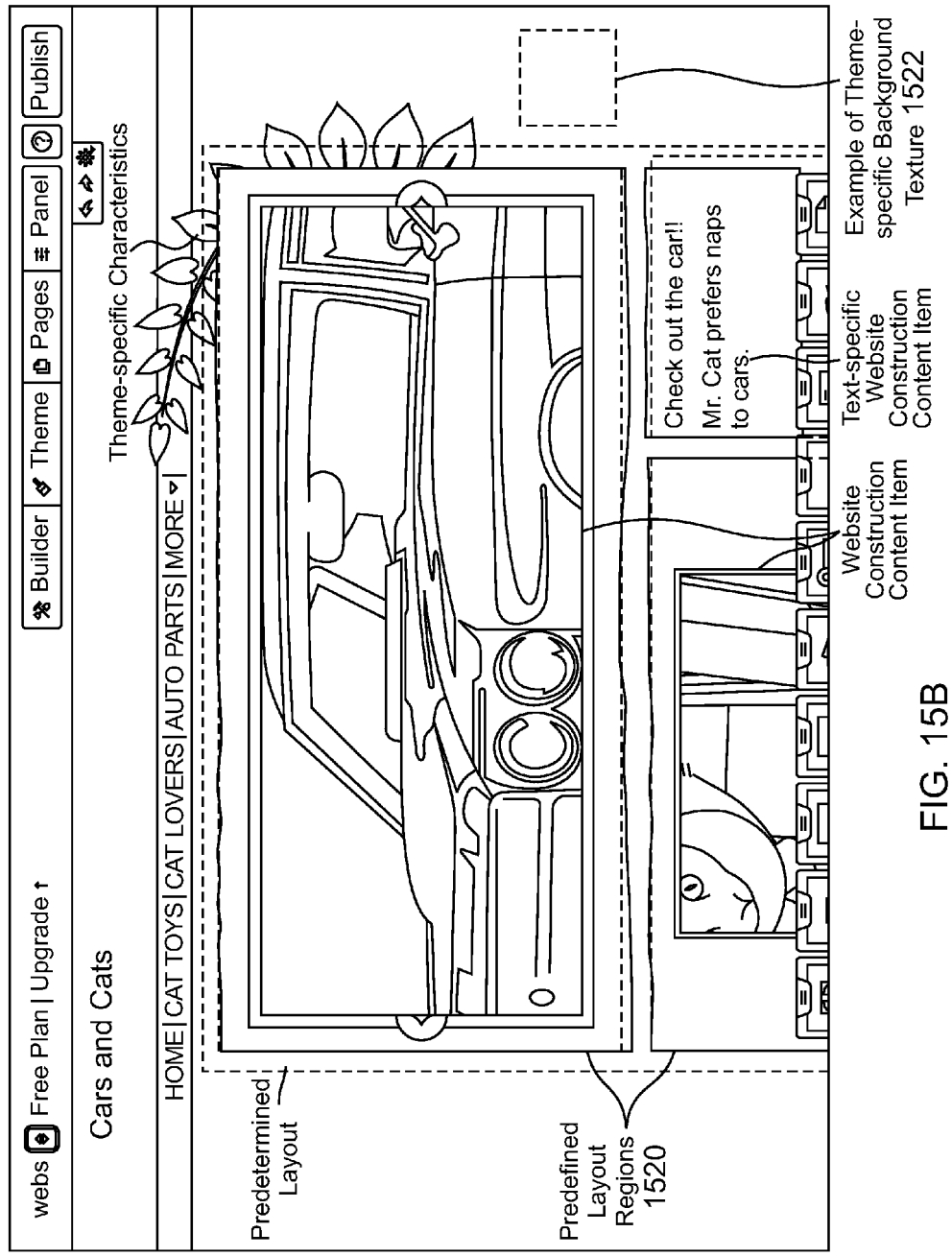
Figure 15C:
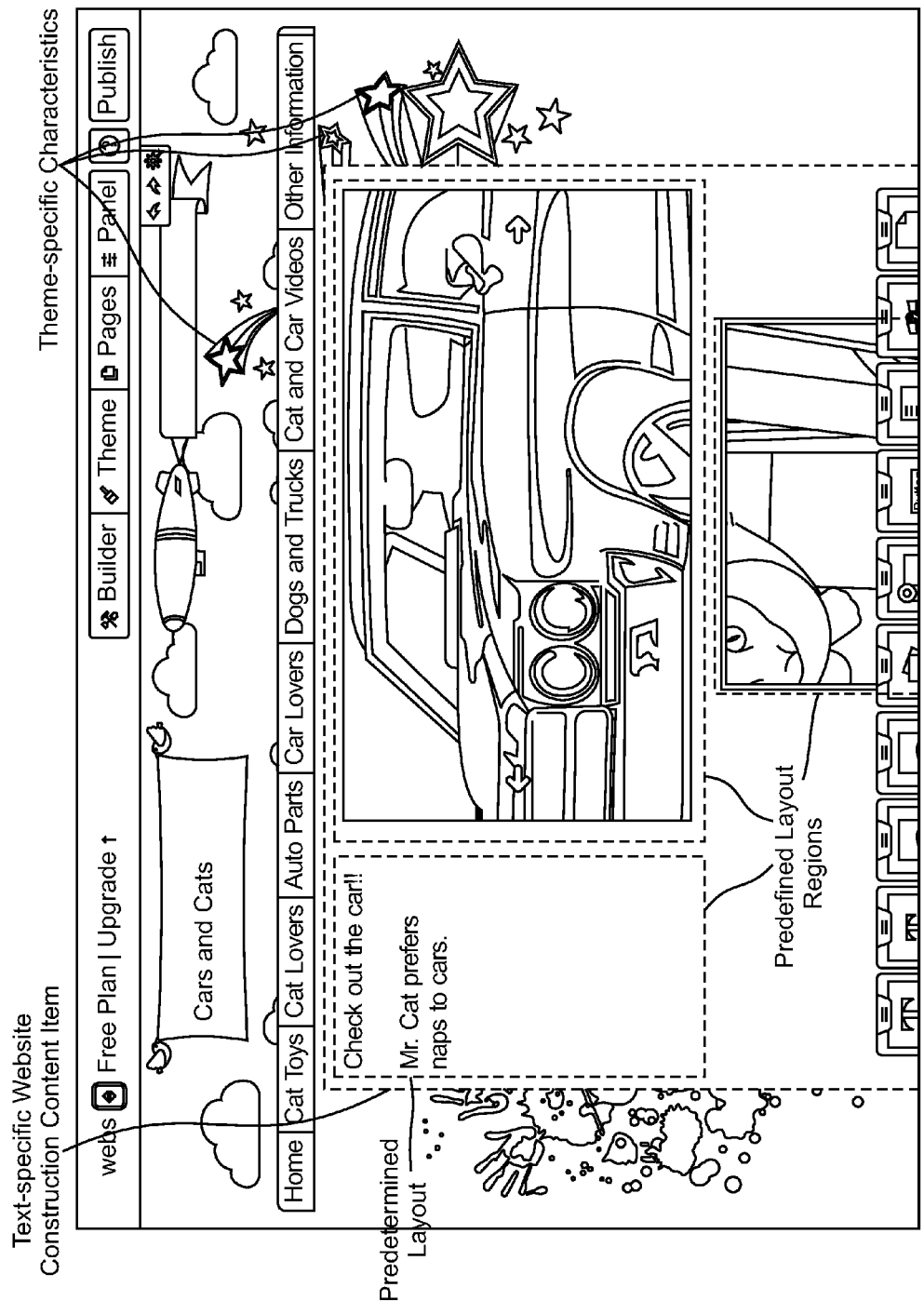

FIG. 15, consisting of FIGS. 15A-15C, illustrates aspects of modification of a developmental website generated in a particular aesthetic theme, by change from a first theme to a second and different theme, and the automatic adjustment of the website under construction in response to such a theme change. FIG. 15 provides a sequence of screen shots that illustrate the manner in which characteristics of a developmental website change in response to a change of themes.

FIG. 15A is a screenshot of a developmental website workspace region 415 displaying a plurality of preconfigured user-selectable website aesthetic themes in a theme selection region 1505, which is displayed to enable user selection upon provision of a predetermined theme selection command (not shown). A user interacting with the system and creating a developmental website may select one of the plurality of themes from the theme selection region 1505 to provide certain aesthetic treatments to the website. Such aesthetic treatments include selection of various characteristics of display of content items, arrangements of items, special embellishments, and other characteristics that are theme-specific. In accordance with an aspect, certain characteristics of the website under construction that are theme-specific are automatically modified or adjusted in response to a user's change from a first theme to a different second theme.

According to one aspect and as will be understood by those skilled in the art, website aesthetic themes comprise predetermined layouts comprising at least one layout region having predefined boundaries for confining website construction content items. As described elsewhere herein, website construction items are of various types including a title region 1510, a navigation bar or content item selection controls region 1512, an image container 1515, a text container 1517, etc. (such items provided by way of illustration and not of limitation). Some or all these content containers may contain theme-specific characteristics, for example, a particular theme, may provide title text in the title region 1510 in a predetermined font, font size, and font color, with a predetermined color for the banner that contains the title. Similarly, a particular theme, may provide text in the navigation bar region 1510 in a predetermined font, font size, and font color, with a predetermined color for the banner that contains the navigation bar, preferably in a consistent style and color with that of the title region 1510, as has been preselected by a system operator via a template (not shown). Similarly, a particular theme may include an embellishment (image, texture, etc.) such as the ivy background image 1519 shown in FIG. 15A.

As will thus be understood, website aesthetic themes comprise one or more predetermined theme-specific characteristics including predefined fonts, predefined color schemes comprising a plurality of complementary colors, particular embellishments such a image overlays and decorative images, and various other characteristics. For example, FIG. 15B shows an exemplary embodiment of a developmental website provided in the developmental website workspace region 415 after user selection of a particular first website aesthetic theme that comprises a selection of predetermined content items, preconfigured to the selected theme. In FIG. 15B, the selected theme comprises a predetermined layout with predefined layout regions 1520, an example of a theme specific background texture 1522, and an exemplary theme-specific characteristics such as decorative leaves (also known as an embellishment). The predefined layout displayed in FIG. 15B comprises three predefined layout regions including a layout region comprising a text-specific website construction content item.

In the website development tool, the method of providing a theme to a website under construction 304 therefore includes the ability to apply an initial theme to the website under construction 400, such that the theme defines aesthetic characteristics on each page of the website under construction 400. The theme is based aesthetic characteristics having a consistency throughout the pages of the website under construction 304. During website construction, the system 120 receives an indication of a new theme selection for the website under construction, and automatically applying the aesthetic characteristics corresponding to the new theme to each webpage in the website under construction.

Such themes define aesthetic characteristics including, but not limited to, color, layout, and arrangement of containers for displaying content, the aesthetic characteristics independent of available control functions and rendered media content. Additionally, themes may also include layout regions 1520 responsive to types of containers, discussed further below. The aesthetic features are applied without disrupting the functions provided by rendered control items on the pages of the website under construction. The themes extent to the entire website 304, thus apply the new theme retroactively to previous modifications to the pages 314 of the website under construction 304.

The website under construction 304 may include layout regions corresponding to specific display areas rendering content of a particular type, generally denoted by a container 150 responsive to a module 435, such that he applied aesthetic characteristics are common to each of the layout regions of the website under construction 400. The selected theme associates each of the layout regions, or containers 150, with a content item, such that the content item defines the source of the rendered content and user controls applicable to the rendered content. For example, a particular theme, in addition to specifying a font and background color, might define a layout having a title container across the top of the screen, a text container on the left below the title, and an image container on the right below the title.

As shown in FIG. 15C, and according to an aspect of the present disclosure, in response to user selection of a second theme to replace the first theme, a modified developmental website is generated and displayed by the system that reflects an automatic change of any theme-specific characteristics from the properties of the components of the first theme, to corresponding changed properties for the components in the second theme. For example, the second theme in FIG. 15C comprises a changed predetermined arrangement of website components possessing theme-specific characteristics associated with the second theme. Any website components and/or website construction content items that have theme-specific characteristics are automatically updated to reflect the change from the first theme to the second theme.

For example, FIG. 15C displays the same content items as shown in FIG. 15B, i.e. website construction content items such as images and text, adjusted if necessary to reflect effecting of the second theme. Specifically, FIG. 15C shows the same cat, car, and text in the predefined layout regions, though such regions are now provided in a different spatial configuration than those displayed in FIG. 15B. The developmental website is updated, however, to display new theme-specific characteristics such as shooting stars and paint splotches as embellishment, and with a different font for the title region and navigation bar or region. As will be understood by those skilled in the art, theme-specific characteristics can include images of leaves, shooting stars, paint splotches, or a multitude of other characteristics.

General Overview of System and Processes

The underlying structure of a web development platform constructed in accordance with the present disclosure comprises two components: a front end (i.e., the user's browser, the client) and back end (i.e., network-accessible servers). The web development platform also comprises various data structures. When a data structure is created on the front end, a similar though not identical data structure is created on the back end. Each data structure has its own ID, and in addition to various other information, the data structure IDs are stored in a database maintained by a system operator.

The various types of data structures include site, page, region, tree, and module. A site data structure has a site ID at the top level and also includes theme IDs and page IDs. The theme ID includes specific layout information as well as certain customizable variables such as text and color. Theme overrides to the customizable variables occur at the site level. For example, if the theme text color is red and the user would rather use blue text, that override occurs at the site level. Page IDs include layout IDs as well as many tree and region IDs.

Trees fill out a page's regions, and typically they comprise a list of modules and have module IDs. In essence, a particular tree has a pointer to the appropriate modules it comprises. Though trees typically comprise a list of modules, if a user adds a column to the middle of the module at the top of the list, the tree will become module/column/module with other modules lower down on the list. The newly inserted column will also comprise modules.

Modules comprise module types as well as user-customizable modules. Taking the example of an image module, the module type describes the actual image module and provides metadata about the image module and where all the assets for the module are located. The user-customizable module, which comprises the user's data for a particular module, includes the image's URL, the crop dimensions, etc.

Description of General System Process

The following process or method steps are implemented in a computer system that effects provision of a developmental website and construction thereof by a user:

1) Associate registered user with default theme and page(s). When users sign up for a site, they are assigned a theme and they receive a page or pages for constructing their website.

2) Retrieve pre-stored information for trees and associated modules for the regions associated to the theme. The user's first step is to go into the development platform. To allow the user to construct the developmental webpages on the development platform, the server renders a developmental webpage containing the theme information and placeholders for the associated regions. On the client side, the client asks the server for the trees that correspond to those regions associated to the theme.

3) Check to see if the module already exists within the developmental webpage. Prior to querying the server for the assets associated to a particular module, the system checks to see if the same module already exists within the website thus making the assets locally available.

4) If module is locally available, make a copy of the pre-existing assets.

5) If the module is not locally available, retrieve appropriate assets associated to the module from web server. Some of these assets are in files while others are in the database. The system reaches out and fetches all the necessary assets for each module. The assets are CSS, Javascript, html, and images required for the modules.

6) Assemble pre-stored information for trees and associated modules for the regions associated to the theme in conjunction with pre-stored information for the assets and the assets themselves. As an example, an asset would be an image. Prestored information for the asset would be the image's URL.

7) Display pre-stored information for trees and associated modules for the regions associated to the theme through the client, i.e., browser, to the user. Prior to this step, the entire development platform is blank. Therefore, the web browser recursively builds out the trees. The browser walks down each tree and builds out each modules is comprises.

8) Receive user's indication of editing action to developmental webpage. This step occurs when the user edits a particular page within the developmental website.

9) Check module coordinates while a user is dragging a module onto the developmental webpage and if module is on a droppable, i.e., usable, space, display an indicator. In this case, the indicator is a blue line or box that shows where the module will be inserted if the user releases the mouse and drops the module into the developmental website.

10) Manipulate the tree into which the module was dropped after the user inserts the module into the developmental website.

11) Repeat steps 3 through 5.

12) Render the module in the proper location.

13) Associate user interactions, i.e., edits, with modules by having the module mark itself as dirty 14) Every two seconds (or other predetermined interval), go through each tree and check to see if the tree is dirty (i.e., whether it has been altered); additionally, check for dirty modules.

15) If any trees or modules are dirty, save them in the save queue.

16) Mark saved items as clean.

17) Duplicate the module's data structure in the browser to the database. Modules have a similar data structure in the browser and in the database so that changes in the browser can be monitored and then saved in the database.

18) Receive user's indication to publish the developmental website.

19) Duplicate the majority of the modules including the published page and site modules.

20) Bundle up all the modules into the tree and then bundle up all of the trees for the page into the published page module. In essence, a snapshot of the site at that particular moment is being stored. When an internet browser goes to view the site, they will see this snapshot.

Additional Process Notations

Module Resizing: When a user moves a module into a new space that that requires more or less space, the module dynamically refits itself into the new space.

Editing a Module: Each module expresses/exposes its own controls. Image modules expose controls for modifying an image, and text modules exposes text editing features. However, modules can utilize common controls from within the platform such as toolbars or dialog windows. Each module type is responsible for its own editing functionality.

Undo/Redo: Trees are responsible for marking themselves as dirty, and a tree will only be marked dirty if its structure has changed. Changes to the structure include column resizing, module insertion and deletion, or column insertion and deletion. Trees are not marked dirty when a user edits a module within the tree. For example, if a user edits an image, the tree containing that image module is not marked dirty because the tree's structure did not change. In this particular case, the module would be dirty.

Trees have pointers to modules, and the module has the module ID as well as the content for the module. The content for the module can include a map or a JSON object of any type of content the module wants to expose. In the case of an image, the stored information would include a URL ID as well as panning and cropping percentages, which are fields in a database entry (i.e., records in the database).

The database is updated at the end of the predetermined interval only if something has been changed. Any time a tree is manipulated, e.g., a module is added/removed/resized or a column is added/resized, that the method for both doing and undoing the operation is pushed onto the undo stack. When the user selects undo, the "how the manipulation can be undone" portion is retrieved. When the user selects redo, the "how it was done" portion is retrieved.

Modules utilize the same stack, but rather than pushing out an undo or a redo as with the tree, they simply push out a snapshot of the module data as it existed at the expiration of the previous tracking timer. If a user selects undo and the previous operation was a module operation, the system will describe the snapshot and rerender based on that snapshot.

Layouts: Upon receiving a user's indication to select a new layout, the dialog box displaying the layout options is displayed, and the current layout is highlighted. Upon receiving user's selection of a new layout, the layout is changed in the page model and the system then determines which regions are new and which regions are no longer there relative to the previous model. For example, if a user goes from a layout that comprises a header and a body to a layout that comprises a header, body, and sidebar, the sidebar is new so an empty tree is created and associated with the new sidebar region. On the other hand, if the user had gone the other way and the sidebar had gotten dropped, the tree remains and is still associated with a sidebar, but when the page is rendered the sidebar will not be displayed as the selected layout does not require a sidebar.

All modules are likewise updated to have the proper horizontal dimension based on the new layout. Each tree is recursively evaluated in order to recalculate the appropriate widths for the modules and columns associated with the tree. Module and column widths are stored as percentages, and these percentages are used as the basis for the for the width calculations.

Themes: When a user navigates to the "theme picker", a preview of the developmental website utilizing that theme is rendered and displayed. If the user selects a different theme, a new preview is rendered and displayed. When the user actually selects a theme to use in the developmental website, the theme ID is modified in the site data structure. Further, once a user selects a particular them, the system checks to see if the layout from the previous theme still exists. If it does not, the system utilizes a heuristic to choose the next closest layout and refit the content accordingly.

Image Manipulation

The method for displaying the user controls associated with manipulating images in the developmental website is implemented in HTML, CSS, and Javascript. Resize controls positioned on the corners of an image allow a user to resize an image. Crop controls positioned on the edges of an image allow a user to crop an image. Zoom controls are positioned below the image and allow a user to enlarge or shrink an image.

The image HTML element is contained within another HTML element referenced herein as the "crop container". The crop container is set to "overflow: hidden" in CSS. This setting ensures that even if the image extends beyond the crop container boundaries, the image will be clipped or cropped such that it will appear confined to the crop container. The image within the crop container maintains it's original aspect ratio throughout all user interactions.

Referring to FIG. 8C and FIG. 9B, when a user clicks and drags a crop control handle (822a, 822c, 822e) from an edge of the image (left, right, top, or bottom), the crop container is resized accordingly. The image size within the crop container does not change. There can be a minimum width and height beyond which a user is unable to further crop the image. If a user drags a crop control handle beyond the bounds of the contained image, the user can "pull" more of the image from the opposite end of the crop container by adjusting the X or Y position of the image element. When there is no more image to pull from either edge, the user is no longer able to pull from those edges (so as to avoid white space between the edge of the crop.

A subsequent implementation could incorporate image zoom that would allow a user to drag the crop handle even further. When the user reaches the boundary of both the current edge they are dragging and the opposite edge, the contained image would grow accordingly in both width and height and continue filling the containing crop container element.

The resize handles (822b, 822d) are located on the corners of the crop container. When a user drags a resize handle, the width and height of the image element are increased or decreased (depending on the direction of the drag) in proportion to the image's original aspect ratio. The width and height of the crop container are concurrently increased or decreased by the same amount as the image elements. The result is that the display shows the same area of the image, but the cropped image appears larger. As with cropping, there can be a minimum width and height such that the user is unable to resize beyond those thresholds. The maximum width and height can also be restricted. In the present application, the dimensions are limited such that the image element cannot be stretched beyond the original width or height of the source image.

When a user pans the image by dragging the actual image element within the crop container, the image element's X and Y position are changed accordingly. The user is unable to pan the image such that there would be white-space between the edge of the image and the edge of the crop container.

When a user zooms in or out on an image using the zoom control 820 (see FIG. 8C or FIG. 9B), the system selects a focal point to zoom into and allows the user to zoom in and out at that point. Typically, the focal point is the center of the image's viewable area, but it does not have to be. When the user zooms out, the system decreases the image element's width and height. On the other had, when the user zooms in, the system increases the image element's width and height. Further, the system adjusts the X and Y position of the image element accordingly to ensure that the zoom in or out is from the center of the image. Zooming is restricted such that the image element's width and height will never increase beyond the source image's original width and height. Zooming is also restricted such that the image element will not be so small that it leaves white space between the edges of the image element and the crop container.

Each of the controls discussed above can be shown, hidden, and/or enabled/disabled in any combination. For example, the system could be configured to allow a pre-defined space for an image which would allow panning and zooming but not cropping or resizing.

Dock and Ghosting

The developmental website is contained within an Iframe HTML element on an HTML page. The outer HTML page will be referenced herein as the "chrome page" and the inner Iframe page will be referenced as the "inner page". The dock HTML elements are positioned on the chrome page such that they overlap the bottom of the Iframe that contains the developmental website. The dock HTML elements are styled using CSS such that the background is transparent and any space not occupied by the dock itself or the items on the dock is transparent, thus allowing a user to see more of the developmental website behind the dock elements.

Each dock item on the dock is a collection of HTML elements contained within an HTML element referenced herein as the "dock item container". When a user drags a dock item off of the dock, the system hides the dock item container from the user via CSS by setting "display: none". Additionally, the system creates a "ghost" HTML element, which is a representation of the selected dock item, that follows the user's mouse movements. The "ghost" element is visually identical to the item selected from the dock with some transparency added to aid usability; however, the ghost can be visually different if necessary.

When a user drags an item off the dock, the other dock items are positioned lower such that they appear to sink into the dock. This effect is achieved by setting a higher top position on the HTML element that contains all of the dock items. When the drag action is complete, either successfully or unsuccessfully, the dock items appear to slide back up to their original position. This effect is achieved by setting a lower top position in CSS on the HTML element that contains all of the dock items. The same effect could also be achieved with margins or bottom positions instead of top positions if necessary. The system uses an animation rather than having the position jump instantaneously to smooth this visual process of the transition.

There are two potential outcomes to a user drag operation. If the drag/drop was successful, the user dropped the element over an acceptable point in the developmental website. If the drag was unsuccessful, the user dropped the element over an unacceptable point in the developmental website. In the case of a successful drop, the ghost element disappears or optionally animates to show that it was "dropped" into the proper place on the developmental website. The ghost element is then removed and the original dock item container is displayed in its original location on the dock. In the case of an unsuccessful drop, the ghost element animates back toward its original location on the dock, which now appears to be empty. Once the ghost is in place, the dock item container is again displayed with the ghost element removed.

Page Navigation Links (Content Item Selection Controls)

Referring to FIG. 11, each of the navigation links (e.g., 1105a, 1105b, 1105c, 1105d) of the website (including the developmental website) is a collection of HTML elements contained within an LI (list item) HTML element. Each of the LI elements are contained within a UL (unordered list) HTML element (or another valid HTML element that may contain LI elements). The complete navigation UL containing all navigation links may appear zero or more times on any given page of the website.

The platform also supports subnavigation wherein particular navigation links can be "nested" beneath other navigation links. In this case, the "nested" navigation links are placed in another UL HTML element that is contained within the parent link's LI element. This "nesting" can continue as many times as the system allows. Currently, the system allows a maximum depth of three, which means first-level navigation links at the top-level, second-level navigation links within the first-level, and third-level navigation links within the second-level.

The depth of navigation displayed to a user is dependent on the theme. Each theme uses CSS and/or JavaScript to hide or display each depth of navigation. For example, themes may be configured to hide anything below top-level navigation and only display the second-level links beneath that navigation item when the user hovers their mouse pointer (or other pointing device such as a finger-based gesture on a mobile device) over the corresponding first-level navigation item.

Each theme also may define whether or not the navigation LI elements are able to wrap vertically. For example, some themes support a wrapped scheme where navigation links are displayed in multiple rows. Other themes may support a scheme wherein navigation links are displayed vertically such that each row contains exactly one navigation link. If a scheme is configured such that navigation links are not able to wrap, it is possible that certain links would not fit in the allowable area and would otherwise extend beyond the containing HTML element. In such cases, the system uses JavaScript to perform a series of steps to prevent the user from noticing the navigation link wrapping. The process is as follows:

1) If the top-level navigation UL element's width is greater than the width of it's parent HTML element, add a navigation item with a descriptive label, e.g., "More" (1115), and create a UL within said navigation item to contain any excess navigation items and then proceed to 3A; otherwise go to step 2.

2) If the last navigation link LI element's Y position is greater than the first navigation link LI element's Y position on the page, add a navigation item with a descriptive label, e.g., "More", and create a UL within said navigation item to contain any excess navigation items and then proceed to 3B; otherwise, stop.

3A) Loop through all navigation link LI elements, beginning with the first. If the top-level navigation element's width is greater than the width of it's parent HTML element, move the current navigation link to the beginning of the UL within the "More" navigation item; repeat this step as necessary.

3B) Loop through all navigation link LI elements, beginning with the last. If the current element's Y position is greater than the Y position of the first navigation link LI element, move the current navigation link to the beginning of the UL within the "More" navigation item; repeat this step as necessary.

Included below for reference is the JavaScript code described in process steps 1-3B for page navigation links as described above:

```
*****
(begin code)
function(jQuery){
if(typeof(jQuery) === 'undefined') jQuery =
$;
$ = jQuery;
if($('body').hasClass('webs-allow-nav-wrap'))
return false;
${'ul.webs-nav').each(function( ){
var nav = $(this),
items = nav.children('li');
if(!items.length > 0 ||
    (items.css('display') == 'block' &&
items.first( ).css('float') == 'none')) return
false;
var firstX =
    items.eq(0).position( ).left,
top = items.eq(0).position( ).top +
Math.min(items.eq(0).height( ), 10),
addMore = function( ){
var more = $('<li class="webs-5 nav-more has-children"><a
href="#" onclick="return
false;"><span class="title">More</span><span
class="after"></span></a><ul></ul></li>');
nav.append(more);
return more.find('ul');
},
addToMore = function(item, test){
var item = items.eq(i);
if(!item.hasClass('webs
home')) { // Never put "Home" in the more dropdown
if(test(item)) {
var lvl3item =
item.find('ul ul'); // Themes can't support the extra
level,
```

-continued

```
    so move lvl3 up into lvl2
        if(lvl3item.length >
0)
lvl3item.children('li').prependTo(lvl3item.pa
rents('ul'));
    item.prependTo(more);
    return true;
    }
    return false;
        }
};
var maxWidth = nav.parent( ).width( );
if(nav.width( ) > maxWidth) {
// Nav overflows
var more = addMore( );
for(var i=items.length-
1;nav.width( ) > maxWidth && i>1;i--) {
5addToMore(items.eq(i),
function( ){return true;});
}
} else if(items.eq(items.length-
1).position( ).top > top) {
// Nav wraps
var more = addMore( );
var keepgoing = true;
for(var i=items.length-1;i>1;i--) {
var item = items.eq(i);
    keepgoing = false;
if(addToMore(item, function( ){
return nav.position( ).top > top; })) {
} else {
break;
    }
}
}
});
}
(end code)
*****
```

Content (e.g. Image) Resizing

Each module ("content container") within a developmental website may include code associated with it that is invoked when the width of a module's containing element ("content container") increases. The width of the containing element car occur either by direct user interaction (e.g., if the user resizes the column containing the module) or by changes to the webpage's layout or theme. Since layout regions may change width in different layouts and themes, it is necessary to refit all modules upon user selection of a new theme or layout. In order to accomplish this resizing, modules may include code for augmenting data. For example, a module may include code wherein the module's data is augmented in response to an augmenting of the width of the containing element. For more generic modules that do not include such data augmenting code, default code is implemented to augment the data. For example, in the case of au image module, the code determines if the containing width is greater than or equal to the current width plus the width of any surrounding frame. If the containing width is greater, the system does nothing. If the containing width is less, the system sets the width of the image to the containing width minus the width of any surrounding frame. In addition, the system accordingly sets the height such that the aspect ratio of the image is unchanged.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or e) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

The invention claimed is:

1. A method of editing a digital video image, comprising:
identifying a rendered digital image having aspects, the aspects defining translation of a raw image to a rendered image;
invoking an edit function for modifying at least one of the aspects, the edit function simultaneously performing a corresponding modification to aspects responsive to other edit functions; and
rendering the modified digital image such that the corresponding aspects maintain an undistorted appearance of the rendered digital image, the undistorted appearance maintaining an aspect ratio and pixilation of the raw image for at least a rendered portion of the raw image, such that simultaneous modification of corresponding horizontal and vertical aspects avoids disproportionate pixelation resulting from a horizontal appearance being scaled differently than a vertical appearance.

2. The method of claim 1 wherein the edit functions modify aspects of an image such that each edit function affects aspects for which a subset of the aspects are affected by one of the other edit functions.

3. The method of claim 2 wherein a resize control defines the horizontal size and vertical size proportionally such that the aspect ratio is maintained and scale is modified.

4. The method of claim 2 wherein a zoom control affects scale while maintaining horizontal size and vertical size.

5. The method of claim 2 wherein a horizontal cropping control affects the horizontal rendering area defining the horizontal portion of the raw image for rendering, and modifies the horizontal size proportionately while maintaining the vertical size and scale aspects.

6. The method of claim 2 wherein a vertical cropping control affects the vertical rendering area defining the vertical portion of the raw image for rendering, and modifies the vertical size proportionately while maintaining the horizontal size and scale aspects.

7. The method of claim 2 wherein the horizontal and vertical rendering area define a frame through which at least a portion of the raw image is visible.

8. The method of claim 1 further comprising:
invoking a plurality of edit functions, each of the edit functions affecting at least one aspect;
applying a first edit function of the plurality of edit functions, the first edit function modifying at least one of the aspects affected by a second edit function of the plurality of edit functions.

9. The method of claim 1 further comprising:
defining a plurality of the edit functions, the edit functions mutually dependent such that a first edit function modifies an aspect that is also modified by a second edit function of the plurality of edit functions.

10. The method of claim 2 wherein the aspects include scale, horizontal size, vertical size, horizontal rendering area, vertical rendering area, the horizontal size affecting the horizontal width of the rendered image while maintaining the vertical distance, the vertical size affecting the vertical height of the rendered image while maintaining the horizontal distance, the scale affecting pixelation of the rendered image while maintaining horizontal and vertical distance, the horizontal rendering area defining a horizontal range of a rendered portion of the raw image, and the vertical rendering area defining a vertical range of a rendered portion of the raw image.

11. The method of claim 10 wherein the edit functions include resize, crop, pan and zoom.

12. The method of claim 1, wherein the edit functions include interactive sizing functions responsive to user input for modifying dimensions of the image container region, the dimensions including horizontal and vertical controls for adjusting aspects of horizontal and vertical size, further comprising proportionally modifying the horizontal and vertical dimensions for maintaining the aspect ratio in response to a received user input for modifying one of the horizontal and vertical dimensions.

13. A computer program product having computer program code encoded as instructions on a non-transitory computer readable storage medium that, when executed by a processor, causes the processor to perform a method of editing a digital video image, comprising:
identifying a rendered digital image having aspects, the aspects defining translation of a raw image to a rendered image;
invoking an edit function for modifying at least one of the aspects, the edit function simultaneously performing a corresponding modification to aspects responsive to other edit functions; and
rendering the modified digital image such that the corresponding aspects maintain an undistorted appearance of the rendered digital image, the undistorted appearance maintaining an aspect ratio and pixelation of the raw image for at least a rendered portion of the raw image, such that simultaneous modification of corresponding horizontal and vertical aspects avoids disproportionate pixelation resulting from a horizontal appearance being scaled differently than a vertical appearance.

* * * * *